United States Patent [19]
Brenski et al.

[11] 3,906,163
[45] Sept. 16, 1975

[54] PERIPHERAL CONTROL UNIT FOR A COMMUNICATION SWITCHING SYSTEM

[75] Inventors: Edwin F. Brenski, Clarendon Hills; Jan Draayer, Wheaton; Nigel J. E. Reynolds, Elk Grove Village; Frank A. Risky, Cicero, all of Ill.

[73] Assignee: GTE Automatic Electric Laboratories Incorporated, Northlake, Ill.

[22] Filed: Sept. 14, 1973

[21] Appl. No.: 397,456

[52] U.S. Cl. .......................... 179/18 ES; 340/172.5
[51] Int. Cl.² H04M 3/00; G06F 13/00; G06F 11/00
[58] Field of Search .............. 179/18 ES; 340/172.5

[56] References Cited

UNITED STATES PATENTS

| | | | |
|---|---|---|---|
| 3,408,632 | 10/1968 | Hauck | 340/172.5 |
| 3,517,123 | 6/1970 | Harr | 179/18 ES |
| 3,548,382 | 12/1970 | Lichty | 340/172.5 |
| 3,564,149 | 2/1971 | Funk | 179/18 ES |
| 3,593,302 | 7/1971 | Saito | 340/172.5 |
| 3,626,108 | 12/1971 | Oswald | 179/18 ES |
| 3,639,909 | 2/1972 | Hauck | 340/172.5 |
| 3,675,209 | 7/1972 | Trost | 340/172.5 |
| 3,693,161 | 9/1972 | Price | 340/172.5 |
| 3,775,565 | 11/1973 | Rutkowski | 179/18 ES |
| R27,285 | 2/1972 | Dreyer | 340/172.5 |

*Primary Examiner*—Gareth D. Shaw
*Assistant Examiner*—James D. Thomas
*Attorney, Agent, or Firm*—John T. Winburn

[57] ABSTRACT

A peripheral control unit for use in a communication switching system, which serves as an interface between a central processor unit and telephony and switching equipment of the system includes a plurality of control matrices each comprised of a plurality of bistable control devices which are connected to control points of the system, a plurality of sensing matrices each comprised of a plurality of sensing devices which are connected to sensing points of the system, and a peripheral controller for enabling access of a group of control devices or sensing devices of a given matrix in response to an instruction provided by the central processor to selectively change the states of predetermined control devices or to read out the conditions of sense points connected to the selected sensing devices.

15 Claims, 49 Drawing Figures

DATA BUS & RETURN BUS INSIDE PU (PUN)

WORD SELECT LINES & WRITE LINES IN PU (PUN)

IMPLEMENTATION OF A WORD SELECT LINE (CWS 407 SHOWN)

IMPLEMENTATION OF RB BUS LINE (RB.B12 SHOWN)

MATRIX RESPONSE LEVELS INSIDE PU (PUN)

CONTROL MATRIX BLOCK DIAGRAM

SENSE MATRIX POINT OPERATION

WORD DRIVER / CABLE RECEIVER CIRCUIT

COLUMN AMPLIFIER / CABLE DRIVER CIRCUIT

CHECK BIT

WORD DRIVER CARD ASSIGNMENT

PERIPHERAL CONTROL BLOCK DIAGRAM

ADDRESS REGISTER CIRCUIT

DATA REGISTER CIRCUIT

CONTROL DECODER BLOCK DIAGRAM

MATRIX ACCESS CIRCUIT

MATRIX ACCESS CIRCUIT

MATRIX ACCESS CIRCUIT

MATRIC ACCESS CIRCUIT

MATRIX ACCESS CIRCUIT

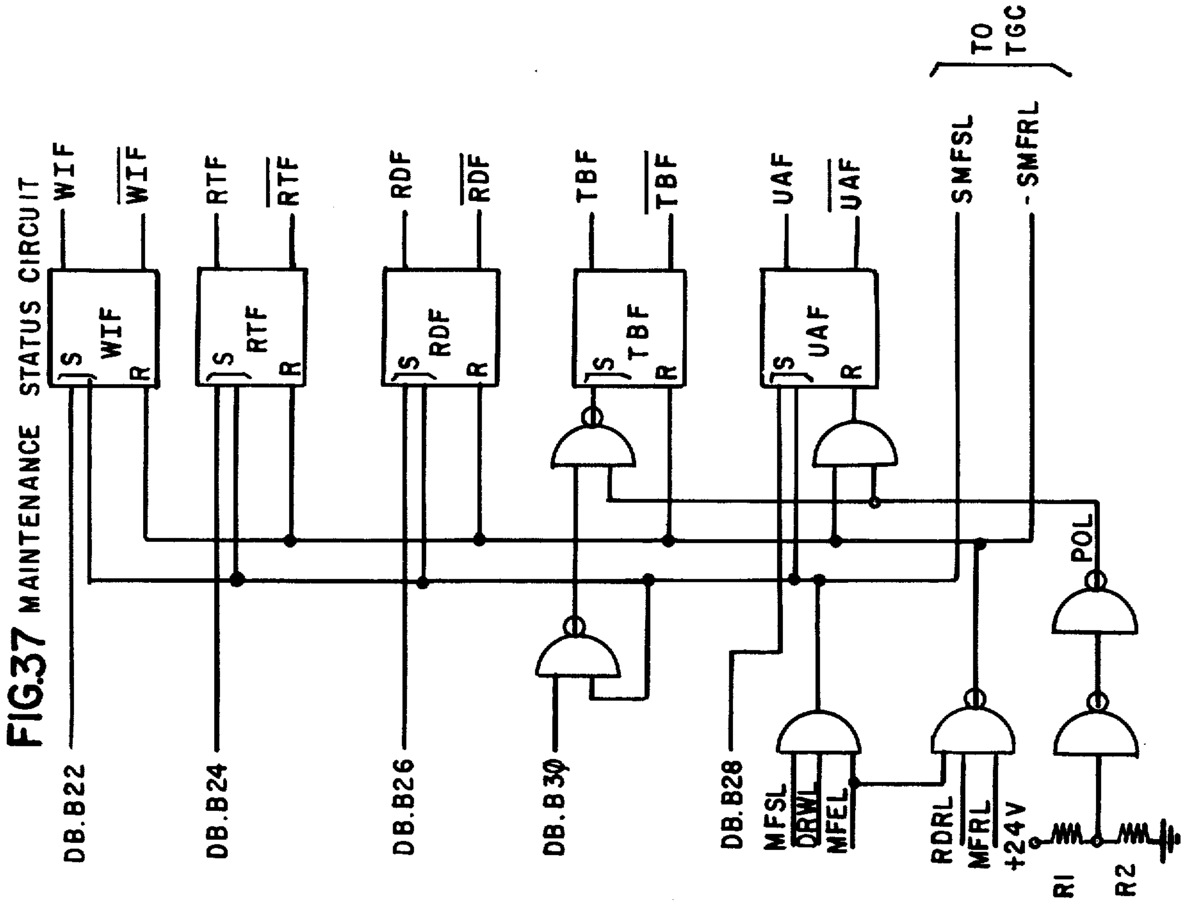
FIG.37 MAINTENANCE STATUS CIRCUIT
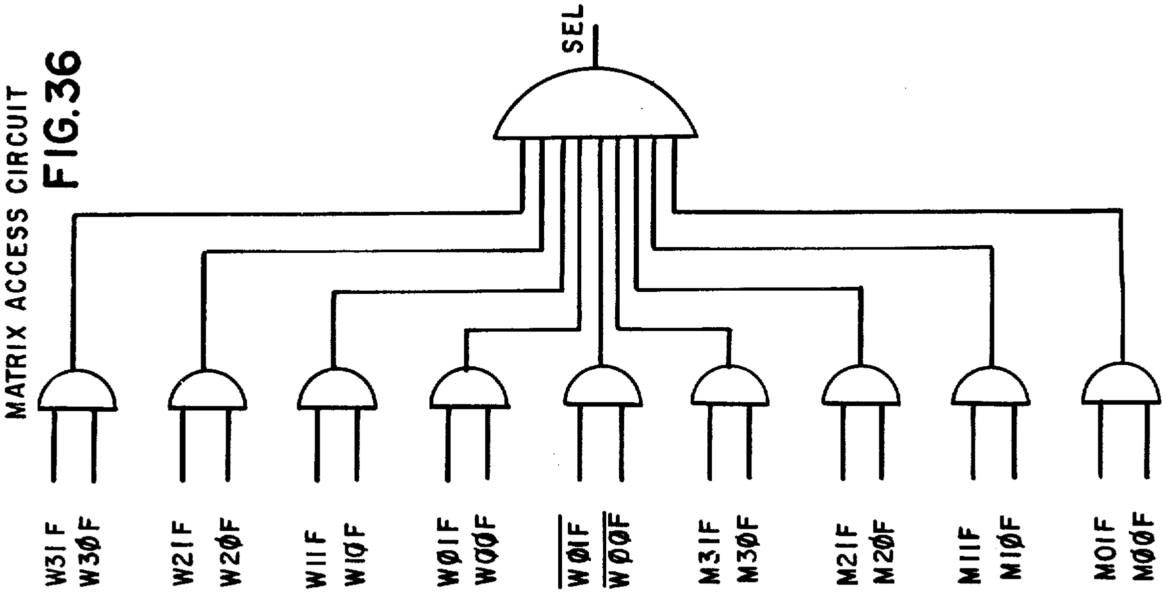
MATRIX ACCESS CIRCUIT FIG.36

FIG. 39
TIMING GENERATOR CIRCUIT
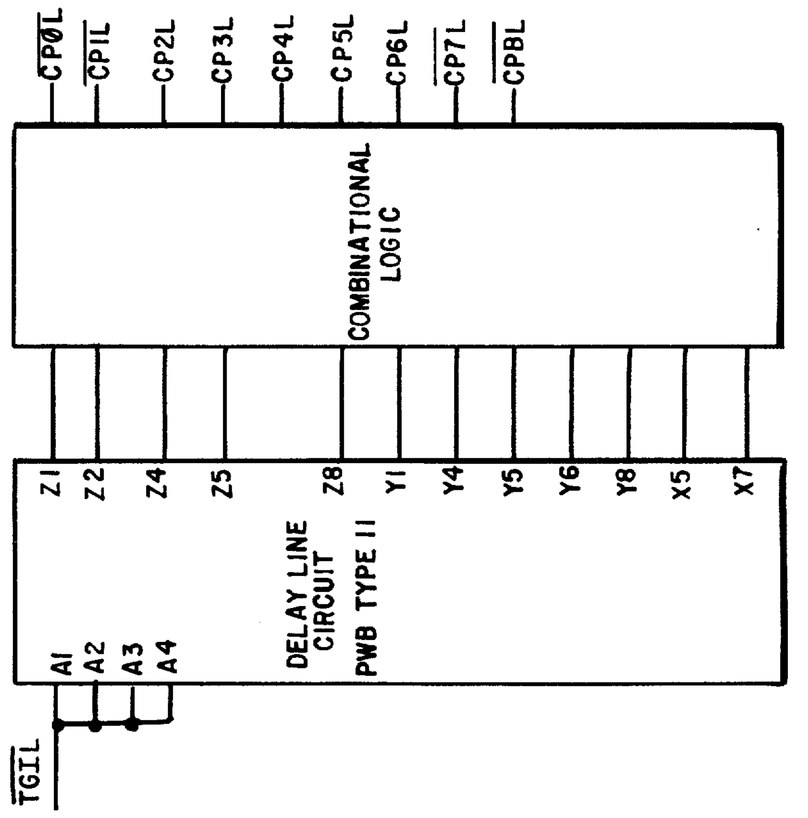
TIMING GENERATOR CIRCUIT FIG. 38
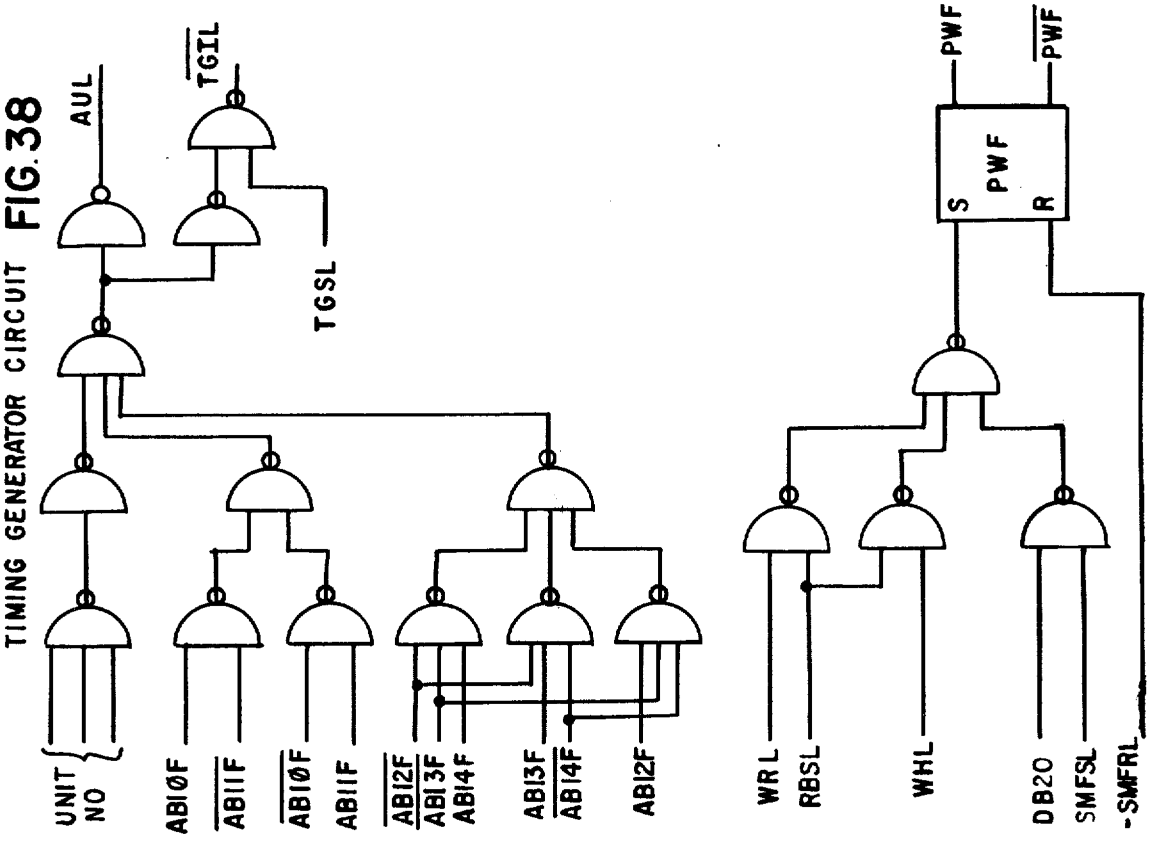

TIMING GENERATOR OUTPUT LEVELS

PATENTED SEP 16 1975

SHEET 26

PERIPHERAL CONTROL UNIT FOR A COMMUNICATION SWITCHING SYSTEM

BACKGROUND OF THE INVENTION

1. Field of the Invention

This invention relates to communication switching systems employing common control, and/or particularly, to a peripheral control unit for use in such systems to interface a central processor unit and control circuits of the system.

2. Description of the Prior Art

Communication switching systems, such as telephone switching systems, generally include traffic offices which provide operator assistance for various customer services, such as person-to-person, station-to-station, or collect calls, and the like, billing functions, and call routing procedures. To provide all operator services more efficiently and more economically than is possible with present methods, electronic, stored program control systems have been developed to serve all traffic requiring operator assistance. One such system, referred to as a traffic service position system (TSPS) is described in a series of articles, entitled "TSPS No. 1" in the Bell System Technical Journal Vol. 49, No. 19, December 1970, pages 2417–2731.

The system employs a central processor unit which provides control instructions over an interface circuit for telephoning and switching equipment of the system. The interface circuit may also provide sense points for permitting the station of various circuits and devices of the system to be returned to the central processor unit. In such systems, a large number of circuits must be controlled and scanned in relatively short times to enable the system to operate efficiently. In the TSPS system referenced above, the central processor unit must provide a separate instruction for each control or sensing operation required.

It would be desirable to provide a communication switching system employing common control apparatus wherein a plurality of control or sensing functions can be provided in response to a single instruction of the central processor unit of the common control apparatus.

SUMMARY OF THE INVENTION

It is an object of the present invention to provide a peripheral control unit means for use in a communication switching system employing common control apparatus which permits a plurality of control or sensing functions to be provided in response to a single instruction of a central processor means of the common control apparatus.

In an exemplary embodiment, the peripheral control unit means, which serves as an interface between a central processor means and telephony and switching equipment of the communication switching system, includes a plurality of matrices of input and output points, the input or sense points being connected to circuits or apparatus to be monitored and the output or control points being connected to circuits or apparatus to be controlled. Certain matrices, referred to as a control matrix, may be comprised of a plurality of control points which are disposed in the matrix to form a plurality of multi bit control words, with different bits of each control word corresponding to different control points.

Certain other matrices, referred to as sense matrices may be comprised of a plurality of sense points which are disposed in the matrix to form a plurality of multi bit sense words, with different bits of each sense word corresponding to different sense points.

The control and sense matrices are accessed by an associated peripheral controller means which includes word select means, write means, and read means, enabling a given word of a select control matrix to be written into or a given word of a control or sense matrix to be read out in response to an instruction provided by the central processor means. The use of control and sense matrices enables a plurality of control or sense points which comprise a given word to be accessed in response to a single instruction provided by the central processor means. Thus, the status of a plurality of sense points and thus the condition of apparatus monitored by such sense points can be determined by a single read instruction provided by the central processor means. Similarly the state of one or more of a plurality of control points which comprise a given word can be altered, effecting a plurality of operations in response to a single write instruction provided by the central processor means.

The peripheral control unit means is operable as a random access read/write memory wherein the control and sense matrices store data representing the status of control and sense points which are extended to telephony and switching apparatus of the system, and the peripheral controller means provides access to such data via read/write circuit means of the peripheral controller means in response to instructions provided by the central processor means.

In accordance with a feature of the invention, the status of the control points can be read out to check the instructions indicated by the states of the control points. Thus, the common control instructions which are stored in the control matrices can be reconstructed.

Moreover, the peripheral controller means includes means responsive to each write instruction to determine that one and only one word of any matrix has been addressed. Also, means are provided to enable faulty words to be written to zero through a re-write operation which follows each normal write operation. Furthermore, a pulse width checking means monitors the width of various control pulses of the peripheral controller means, such as write pulses, and provides an output whenever the width of the write pulses exceeds a predetermined value so as to prevent cable driver circuits driven by such pulses from being damaged by exceeding their rated duty cycles.

A further feature of the peripheral controller means is the provision of reset disable means which is operable when the peripheral controller means is initialized and power is applied to the circuits of the peripheral controller means, to enable trouble indicating circuit means to be set in the proper condition so as not to indicate a diagnostic fault which would initiate diagnostic routining of the peripheral controller means.

In accordance with yet another feature of the invention, each sense matrix comprises a plurality of sense elements which are normally conditioned to provide an output signal to indicate a false condition for equipment connected to such sense points to facilitate the detection of faults in the sense matrix.

The various diagnostic outputs referred to above as well as other diagnostic outputs may be scanned by the central processor means under the control of peripheral controller diagnostic software which also enables various logic circuits of the peripheral control unit means to be exercised.

CROSS-REFERENCES TO RELATED APPLICATIONS AND PUBLICATIONS

The system in which the present invention is incorporated is disclosed in an article entitled "Improved Efficiency in Toll Handling With TSPS (Traffic Service Position System¼" by W. D. Wilson in "Automatic Electric Technical Journal," Vol. 12, No. 7, dated July, 1971. The common control equipment for the system in which the arrangement of the present invention is incorporated is in U.S. Pat. No. 3,818,455, entitled "Control Complex for TSPS Telephone System" by E. F. Brenski et al, Chang, et al, "Timing Monitor Circuit for Central Data Processor of Digital Communications System," U.S. Pat. No. 3,810,121; Schulte, et al, "Maintenance Access Circuit for Central Processor of Digital Communication System," U.S. Pat. No. 3,806,887; Wilber, et al, "System for Reconfiguring Central Processor and Instruction Storage Combinations," U.S. Pat. No. 3,828,321; Buhrke, et al, "Timing Monitor Circuit for Central Data Processor of Digital Communication System," Ser. No. 393,543 filed Aug. 31, 1973; Schulte, et al, "Program Timing Circuitry for Central Data Processor of Digital Communication System," Ser. No. 393,542, filed Aug. 31, 1973; Mele, et al, "Configuration Control Circuit for Control and Maintenance Complex of Digital Communication System," Ser. No. 397,452, filed Sept. 14, 1973; Wilber, et al, "Malfunction Monitor Circuit for Central Data Processor of Digital Communication System," Ser. No. 397,567, filed Sept. 14, 1973; Rice, et al, "Interrupt Control Circuit for Central Data Processor of Digital Communication System," U.S. Pat. No. 3,838,223, Wilber, et al, "System Recovery Program System for Communication System," Ser. No. 397,543 filed Sept. 14, 1973.

The trunk highway arrangement is disclosed in United States patent application Ser. No. 397,545, filed concurrently with the present application, entitled "Trunk Circuit Control Arrangement for a Communication Switching System," by B. R. Wunlyck et al, hereinafter referred to as the TRUNK HIGHWAY application. The network audio path test arrangement is disclosed in U.S. Pat. application, Ser. No. 397,549, filed concurrently with the present application, entitled "Method and Apparatus for Testing Network Crosspoint Paths," by J. G. Van Bosse et al, hereinafter referred to as the AUDIO TEST application. The network control arrangement is disclosed in United States patent application, Ser. No. 397,453, filed concurrently with the present application, and entitled "Communication Switching System Network Control Arrangement," by G. R. Athas et al, hereinafter referred to as the Network Control application.

DESCRIPTION OF THE DRAWINGS

FIGS. 31–36 show portions of a matrix access circuit of the peripheral controller;

FIG. 37 is a representation of a maintenance status circuit of the peripheral controller;

FIGS. 38 and 39 are a schematic representation of a timing generator circuit of the peripheral controller;

DESCRIPTION OF A PREFERRED EMBODIMENT
General System Description

Figure 1:
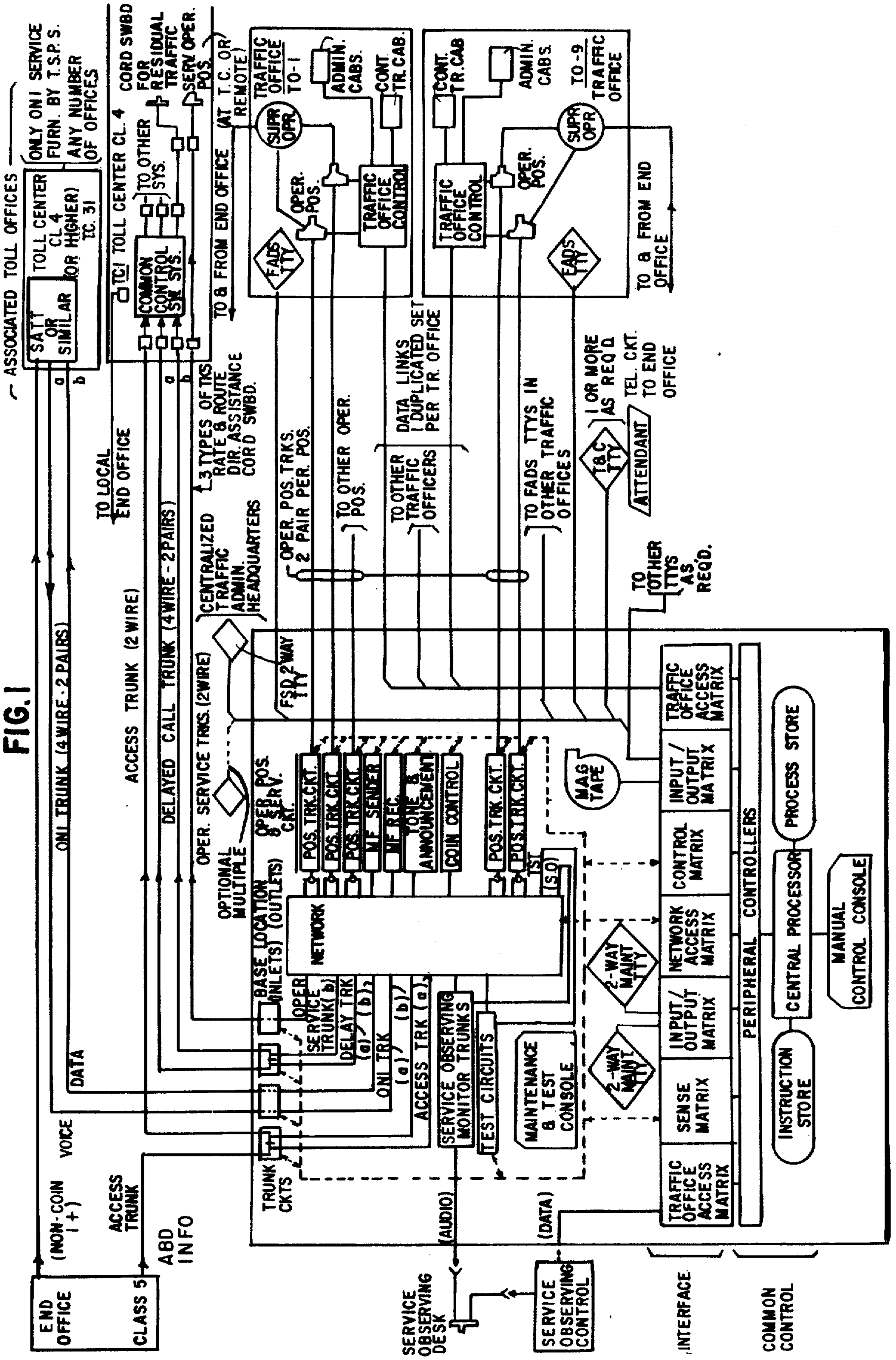
FIG. 1 is a block diagram of a system including a switching network which incorporates the peripheral control unit provided by the present invention.

Referring now to FIG. 1, the system in which the present invention is incorporated is a traffic service position system (TSPS), which permits and induces more customer dialing of toll calls and to automate the processing of those calls as far as is feasible. The TSPS system is adapted to provide operator assistance and other services for class 5 end offices attempting calls to associated toll offices. Expanded Direct Distance Dialing (EDDD) permits dialing of nearly all toll calls not presently handled by DDD. The TSPS system generally comprises a single base location and a group of traffic offices TO-1 through TO-9 which are distributed in advantageous locations and which may or may not be located remotely relative to the base location. The base location generally comprises a group of trunk circuits connectable between end office and toll offices under the control (broken lines) of a stored-program common control via an interface, and a network arrangement for interconnecting the access trunk circuits with a group of position trunk circuits connected to operator positions of the traffic offices and with a group of service circuits serving as multi-frequency senders, multi-frequency receivers, tone and announcement circuits and coin control circuits. As shown in the drawings, the common control interface includes various different sense and control point matrix circuits for sensing different signals in the system and for temporarily storing information. Teletypewriters are provided for maintenance purposes and for time and charges information. The common control is disclosed in said COMMON CONTROL patent application. The base location further includes test circuits operative under the control of a maintenance and test console, and a service observing monitor trunks under the control of a service observing desk which has an audio connection to the service observing monitor trunks and has a data link to the traffic office access matrix via a service observing control circuit for testing the network.

The traffic offices each include operator position consoles connected to a traffic office control arrangement, and connected to a supervisory operator positions, which are coupled to the end offices. The traffic control arrangement are also connected to administrative and controlled traffic cabinets. A force administration and traffic engineering data system including a teletypewriter is connected to the input/output matrix of the interface arrangement. The trunk circuits are relay circuits for providing the TSPS system with an information and control point on the trunk between the class 5 office and the class four office. A delay call trunk is available to operators with two legs or conductors into the class four office. An ONI (Operator Number Identification) trunk provides a link with other systems such as a Strowger Automatic Toll Ticketting System SATT, for the purpose of allowing the TSPS system operator to secure and enter the calling number in those systems. The stored program control central processor unit CPU of the system utilizes an instruction store memory sub-system associated with the CPU in which is stored "permanent" information, such as call processing instructions, translation data, and diagnostic routines. A process store memory sub-system associated with the CPU stores temporary information accumulated during call processing. The peripheral controller enables the CPU to communicate with the matrices, such as the network access matrix so that the CPU obtains current information about the system and conveys information thereto.

The traffic office is a complex which includes up to 62 operator positions, arrangements for administrative, supervisory and training functions, and control equipment for these units. The positions in a TSPS may be grouped into as many as 9 traffic offices, each of which may be located at a different site within 50 miles of the base installation. The service circuits may be temporarily associated with trunks in order to provide specific functions. Included in this category are receivers, for obtaining called and calling numbers, senders, for extending calls into the toll office, and tone and announcement circuits for passing audio information to the trunk. Service circuits operate under control of the unit CPU.

The network is an array of crosspoint devices reed relays arranged to permit the temporary association of trunks with positions and service circuits.

A magnetic tape sub-system provides an output of system data for further processing off-line. Principal data are call records, provided for purposes of customer billing. The time and charges reporting equipment provides customers with an immediate report of the elapsed time and the charges incurred on specific toll calls.

The Force Administration and Traffic Engineering Data Systems FADS provides information on a timely basis for administering the Traffic Offices, and information for off-line processing pertinent to equipment engineering.

Via access trunks from local offices, customers may dial their own person, collect, notify, credit card and bill to third number calls from non-coin and coin telephones.

The connection to the called number is set up when the operator is bridged onto the call, thus improving the speed of service. Normally, by the time the operator has determined how assistance may be given the calling customer, the called telephone will have answered. The operator then only need determine that the proper person is reached, or that a collect call is accepted. If the call is to be billed to a third number or is a credit card call, the operator records the billing numbers by keying them into the system thus avoiding the need for preparing a ticket.

These same types of calls may also be made from coin telephones, as well as station send paid calls.

The operator receives visual display, in most cases, of the amount of money due and supervises its collection. Once conversation starts, the operator is released from the connection. Notification of the end of the initial period and collection of overtime charges are made by an operator who is available when it is time to perform these functions. The equipment associated with the TSP system does all the remembering and calculations required.

The advantages of automated handling may be extended to those calls in which the customer only dials 0, and waits for an operator to answer. In most cases, the operator is able to key the desired called number into the machine, and can be relieved of the task of timing and ticketing the call.

In these ways, operator work time per call is reduced, permitting fewer operators and positions to handle a given volume of traffic.

The system is arranged for up to 310 positions to function as a single team, with calls distributed on a rotational basis to staffed and idle positions. The large team permits efficient staffing over a wide range of offered call volume, including late night. However, the positions are physically arranged in groups of not more than 62 each. These groups may be located remotely from the base unit and from each other permitting advantageous selection of working conditions and labor markets.

The system encompasses the ability to serve many call types and may be associated with different kinds of connecting offices. The following is a brief description of a particular call in order to illustrate some of the techniques of call processing.

Calls entering the TSPS system via the access trunks are broadly categorized in accordance with the characteristics of the calling station (usually coin, non-coin, hotel) and by the apparent intentions of the caller as evidenced by the manner in which the call was placed (1+, 0+, or 0−). A call from a coin station is assumed in which the user dials 0, followed by a 7 or 10 digit number which is repeated by dial pulse to the TSPS system.

Each access trunk is associated with input detector points that exhibit the on-hook or off-hook status from the local (class 5) office, and from the toll office. The latter is of significance only on active calls. These points are repetitively scanned at short intervals by the CPU, and on each scan, the "present" state is compared with the state at the "last look," which is a record maintained in the process store. When a particular trunk is seized by the end office, in response to the 0 dialed by the customer, the mismatch of the present state with the last look defines the origination to the CPU. By consulting stored information associated with that trunk, a determination is made that the called number will be transmitted by dial pulse. For this case, the scan is provided at intervals short enough to ensure that each new state is observed at lease once; thus, the succession of on-hook, off-hook transitions that constitute a dial pulse train are detected, counted and recorded in the process store. Inter-digital pauses are noted by timing. When the total number of digits received constitutes the address of a valid destination, the calling number is needed. Assuming that the originating office can furnish this via automatic number identification (ANI), the CPU selects an idle MF receiver and instructs the network control to set a path between the trunk and that receiver. When this has been accomplished, an output generator point associated with the trunk is set, which causes off-hook to be returned to the local office as a signal to transmit the calling number via MF. This is received and transferred, one digit at a time, to the process store. After the calling number is complete, the network control is instructed to take down the connection to the MF receiver.

Since a coin call placed on an "0+" basis is assumed and the originating and terminating points are now known, memory is then checked to determine if this call can be automatically rated. Assuming this is the case, the charges for the initial period, including tax are calculated at the person rate.

The call is next assigned to an available position and the appropriate network connection is established by the network control as directed by the CPU. Simultaneously, data in the process store is transmitted to the control complex at the required traffic office, causing specific lamp signals to be activated at the selected TSP. For the assumed case, these lamps include a digital display of the calculated charges and time of the initial period, and a "class of call" lamp designated COIN, 0+. The call appears on one of the 3 loops on the position, which is also indicated by a lamp signal. The operator is alerted by an order tone of the receipt of a call, following which the voice path to the subscriber is automatically completed.

After the position is connected to the trunk through the network, a second network connection is automatically established between the trunk and an idle sender. The trunk provides for two simultaneous network connections, one to the "local" side and the other to the "toll" side.

The sender immediately begins to outpulse under control of the CPU. Depending upon the requirements of the toll office, the signalling mode may be DP or MF, or a combination thereof. The call is, therefore, being advanced toward its destination while the operator is determining how assistance may be given this call. If the call is person sent paid, as inferred from the manner in which it was placed, the operator supervises the collection of coins and verifies that the desired party has been reached.

If, however, the customer wishes to use a credit number on a person basis, the proper type of billing indication is keyed, which is registered in the process store and which causes the display to be cleared. The ten digit credit card number is obtained and keyed into the process store. These operations may over lap the return of ring-back tone from the called office, since the sender has been functioning independently of the operator's keying actions. When the desired party is obtained, the operator authorizes the start of timing and retires from the call.

The call is now "floating," supervised only by the CPU. All call data is in the process store and time is being accumulated; no timing or ticket writing functions have been performed by the operator.

When on-hook is detected from the calling party, time accumulation is suspended and 2.2 second timeout is initiated, if the on-hook persists after the timeout, the call is considered terminated. Call data is passed from the process store to the tabulator system to be recorded for off-line processing. Output generator points associated with the trunk are reset by the CPU to cause on-hook to be indicated to both the local and toll offices, which in turn releases all switched connections. The trunk is now available for another call.

If an off-hook condition is again detected from the originating subscriber during the 2.2 second timeout for disconnect, a flash recall is recognized and the call is again assigned to a position. This is (probably) not the position that was assigned originally; however, any call details needed by the new operator are brought up automatically or are available upon request via the digit display.

If special circumstances warrant, the operator may hold a call and prepare a manual ticket. In other special circumstances, the TSPS operator may pass a call to cord board for manual handling.

If the call in the above example had been placed from a non-coin station, the operations would be similar except that no charge would be computed prior to the initial entry, and the class of call lamp would indicate NON-COIN, 0+.

PERIPHERAL UNIT COMPLEX-GENERAL DESCRIPTION

Figure 2:
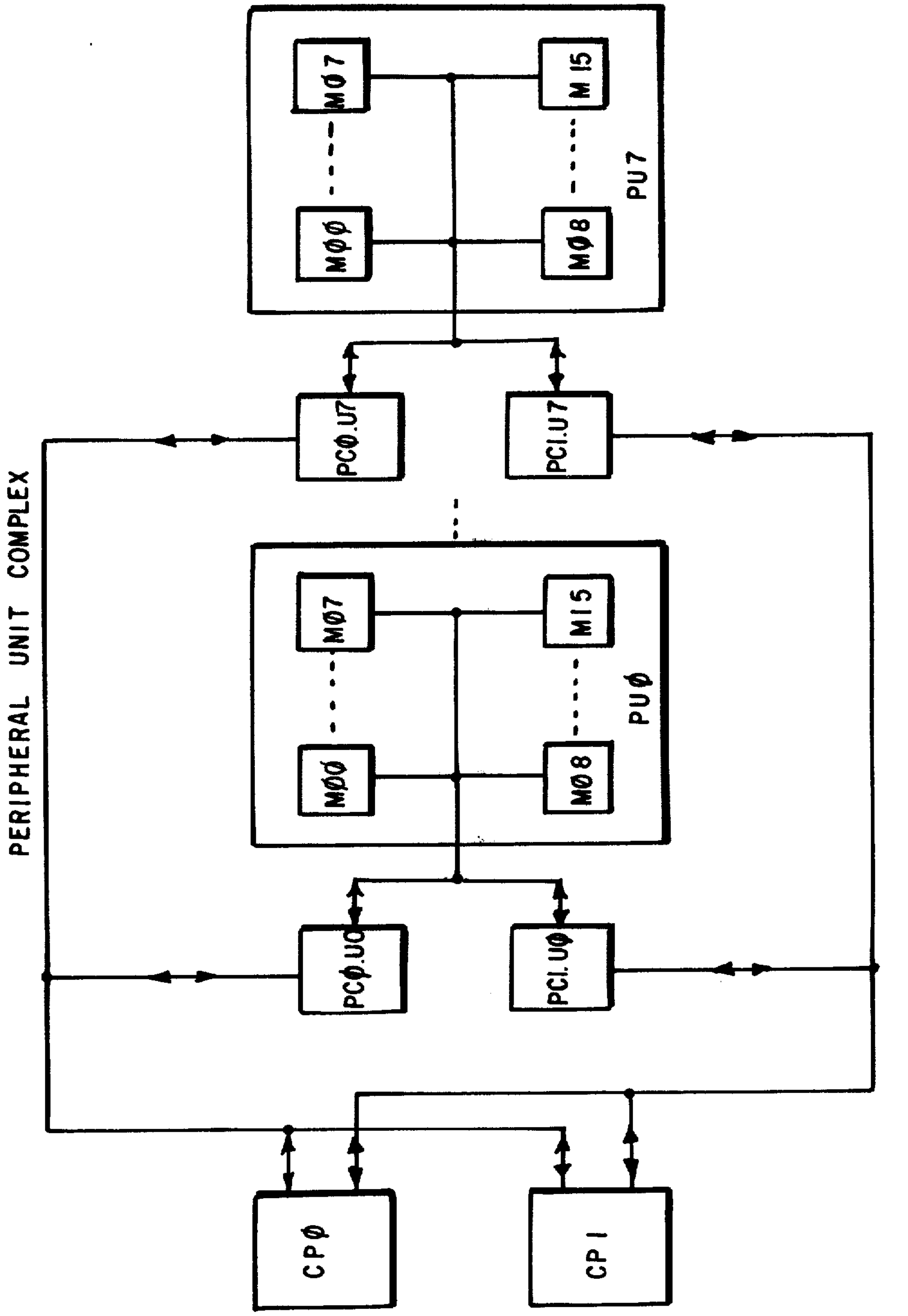
FIG. 2 is a block diagram of the peripheral unit complex.

Referring to FIGS. 1 and 2, the Peripheral Unit Complex PU serves as the interface between the central processor unit CP and the telephony and switching equipment to extend control commands provided by the central processor unit to the equipment and to monitor the status of the equipment and provide sense outputs to the central processor unit. As shown in FIG. 2, the peripheral control unit complex includes a plurality of peripheral units PU0-PU7, each having an associated pair of peripheral controllers PC0.U0, PC1.U0 - PC0.U7, PC1.U7. Each pair of peripheral controllers interface an associated peripheral unit, such as peripheral unit PU0, with the duplicated central processor units CP0, CP1.

Each peripheral unit includes a plurality of matrices M00-M15 each of which provides a plurality of input or output points to control or sense points of the telephony or switching equipment. One type of matrix COM, shown in FIG. 9, includes a plurality of control elements arranged in matrix form, which are selectively addressable in groups by the central processor unit over the associated peripheral controllers. The control elements provide control logic level or relay-contact outputs for operating circuits or relays of the telephony or switching equipment.

Figure 24:
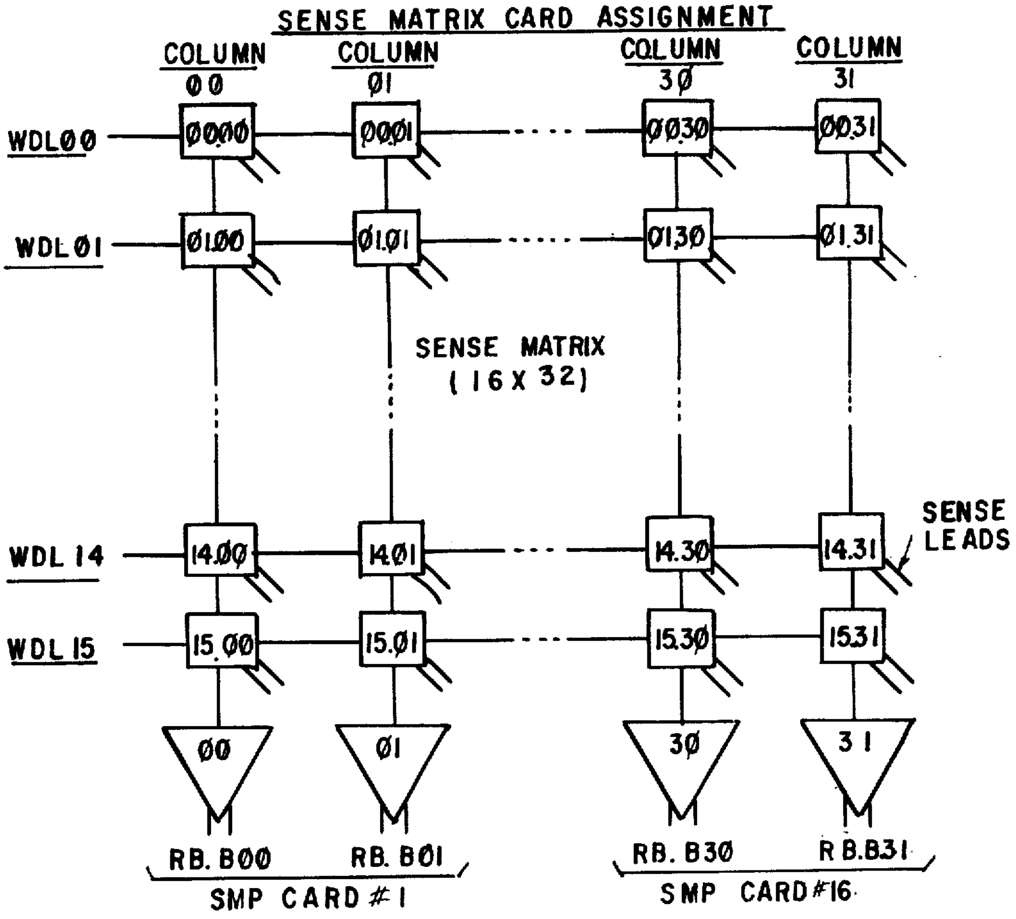
FIG. 24 shows the assignment of a sense matrix card outputs to return buses.

A second type of matrix SEM, shown in FIG. 24, includes a plurality of sense elements, arranged in matrix form, which are selectively addressable in groups by the central processor unit over the associated peripheral controllers, to provide output indicating the status of logic circuits or relays, for example, which are connected to the sense points. A third type of matrix a hybrid matrix HYM includes both control and sense elements.

In an exemplary embodiment, each control sense or hybrid matrix includes sixteen (or fewer) groups or words of 32 elements (bit positions) each. The central processor unit provides a 32 bit control word to a selected peripheral controller which enables parallel access of 32 control (or sense) elements of a matrix of the associated peripheral unit thereby permitting parallel access to 32 control or sense points of the TSPS system in response to a single instruction of the central processor unit. Thus, a single instruction provided by the central processor unit may effect a plurality of operations.

As can be seen in FIG. 1, one application of the control matrices is in the control of trunk circuits of the TSPS system. As is described in the TRUNK HIGHWAY application referenced above, each trunk circuit includes from two to five control relays which are selectively operable to configure the trunk circuit to various operating states. The control relays are connectable to a trunk control highway by way of a select relay which connects the control relays to outputs of an assigned word of a control matrix.

By writing bits of such control word, it is possible to energize one or more of the control relays for a given trunk circuit in one operation in response to a single instruction provided to the peripheral controller by the central processor unit.

The peripheral controller complex is basically operable as a random access memory wherein the control and sense elements of the matrices serve as memory elements to store commands for outputs from the telephony and switching equipment. The peripheral controllers include read/write circuits which enable accessing of the matrix points to read out the conditions of the control or sense points or to change the state of the control points in response to instructions provided by the central processor unit. The control matrices store the conditions of all controlled points and the status of all monitored points of the TSPS system.

The peripheral unit complex also employs various self-checking features. For example, a Matrix Access Circuit MXC, shown in FIGS. 31–36 verifies that when the circuit is accessed, one and only one word of the 256 matrix words is addressed when a read or write instruction is provided. In addition, after each write instruction, faulty words are automatically set to all zero's by providing a second write instruction generated by the peripheral controller at the end of each read or write instruction. At this time, the data bus is all zeros so thus, in conjunction with the second write signal and a word select level stuck at one, sets the faulty word to all zeros. The peripheral controller also includes a pulse width checking flip flop PWF shown in FIG. 38 which monitors the widths of various control pulses such as the write pulse WRL and provides an output whenever the duration of such pulse exceeds a predetermined amount.

The sense matrix points generally monitor the status of relay contacts in the TSPS system. In the described embodiment, the sense points respond with an output signal when interrogated if an associated contact is in an open state. Thus, during periods of light traffic, most of the contacts are generally in an open contact state and maintenance routines run during slack times are better able to distinguish fault conditions in the sense matrices.

THE PERIPHERAL UNIT COMPLEX DETAILED DESCRIPTION

As shown in FIG. 2 the Peripheral Unit Complex is the interface between the central processor unit CP and the telephony and switching equipment. It fulfills two basic functions:

a. Allows the CP unit to sense the status of inputs to the TSPS from the outside world;

b. Allows the CP unit to control the telephony and switching equipment.

The PU Complex consists of up to eight Peripheral Units PU0 - PU7 and associated controllers.

Each PU unit contains up to sixteen Matrices, M00 - M15. When it is necessary to identify a Matrix with respect to the entire PU Complex, its designation is prefixed by PU(PUN), where PUN, ranging from 0 through 7, identifies the PU.

EXAMPLE: PU0.M03 designates M.3 of PU.

Each PU unit is controlled by a pair of Peripheral Controllers. At any time only one controller of a pair is lower case active, which means it is actually in control of the associated Matrices M.

Peripheral Controllers in a pair are designated as:
PC0.U(PUN)
PCI.U(PUN) and

EXAMPLE:

PC0.U3 and PCI.U3 control the Matrices in PU3.

This method of designating Peripheral Controllers was dictated by the Central Processor designers.

All "copy 0" Peripheral Controllers communicate with Unit CP on bus system PC0.BS, and all "copy 1" Peripheral Controllers use bus system PC1.BS.

THE MATRICES IN A PU

These matrices are arrays of 16 (or fewer) words of 32 points each. We first define three types of points:

a. Sense Matrix Points SMP: Points that monitor the outside world. These points can be interrogated (read) by CP unit but cannot be controlled (write) by it. A SMP point can monitor relay contact states, SUHL logic levels, or HTL logic levels.

b. Control Matrix Points CMP: Points that are controlled exclusively by CP unit. They can also be interrogated (read) by the unit CP.

c. Dual Access Matrix Points DAMP: Points that can be controlled from two sources, one source being CP unit, the other source being a non-CP unit hardware device. Can be read by Unit CP. The matrices are defined as the following Matrix types:

a. Sense Matrix SEM: Consists of 16 (or fewer) words, each word having 32 SMP's and are used to monitor relay contacts.

b. Control Matrix COM. Consists of 16 (or fewer) words, each word having 32 CMP points.

c. Hybrid Matrix HYM. Contains a mixture of SMP points, CMP points and/or DAMP points, arranged in 16 or fewer words. A given MAtrix may contain different types of matrix points on a word basis. So far, the following types of HYM matrices have been defined:

c1. Traffic Office Access Matrix TOM. Accesses data links to TO's and SO's.

c2. Input/Output Access Matrix IOM. Accesses Magnetic Tapes and TTY's.

c3. Network Access Matrix NAM. Accesses Network switching equipment and Hold-Relay groups. A PU unit includes Matrices belonging to one or more of the classifications defined above. For example, PU3 may be arranged as follows:

PU3.M00 - 03 are SEM matrices
.M04 - 07 are COM matrices
.M08 - 10 are IOM matrices
.M11 - 12 are NAM matrices
.M13 - 15 are spares Assignments of Matrices to a pair of PC controllers are likely to be made differently in each installation. The PU Complex has a theoretical maximum capacity of:

8 PU units and therefore of

8 × 16 = 128 matrices total, regardless of distribution of Matrix types.

During maintenance routines, CMP points and DAMP points may have their states temporarily changed for periods of up to 32 microseconds. The hardware being driven by CMP points or DAMP points must therefore be designed so that it is not affected by short changes of state.

COMMUNICATIONS WITHIN A PERIPHERAL UNIT

Communications between the pair of PC controllers and the various Matrices in a PU unit are on a A.C. cable driver/receiver basis, using pulses of one microsecond duration.

Since SEM matrices can only be "read out" by unit CP, they do not need all the facilities required by COM and HYM matrices which can both be "read out" and "written in."

Figure 4:
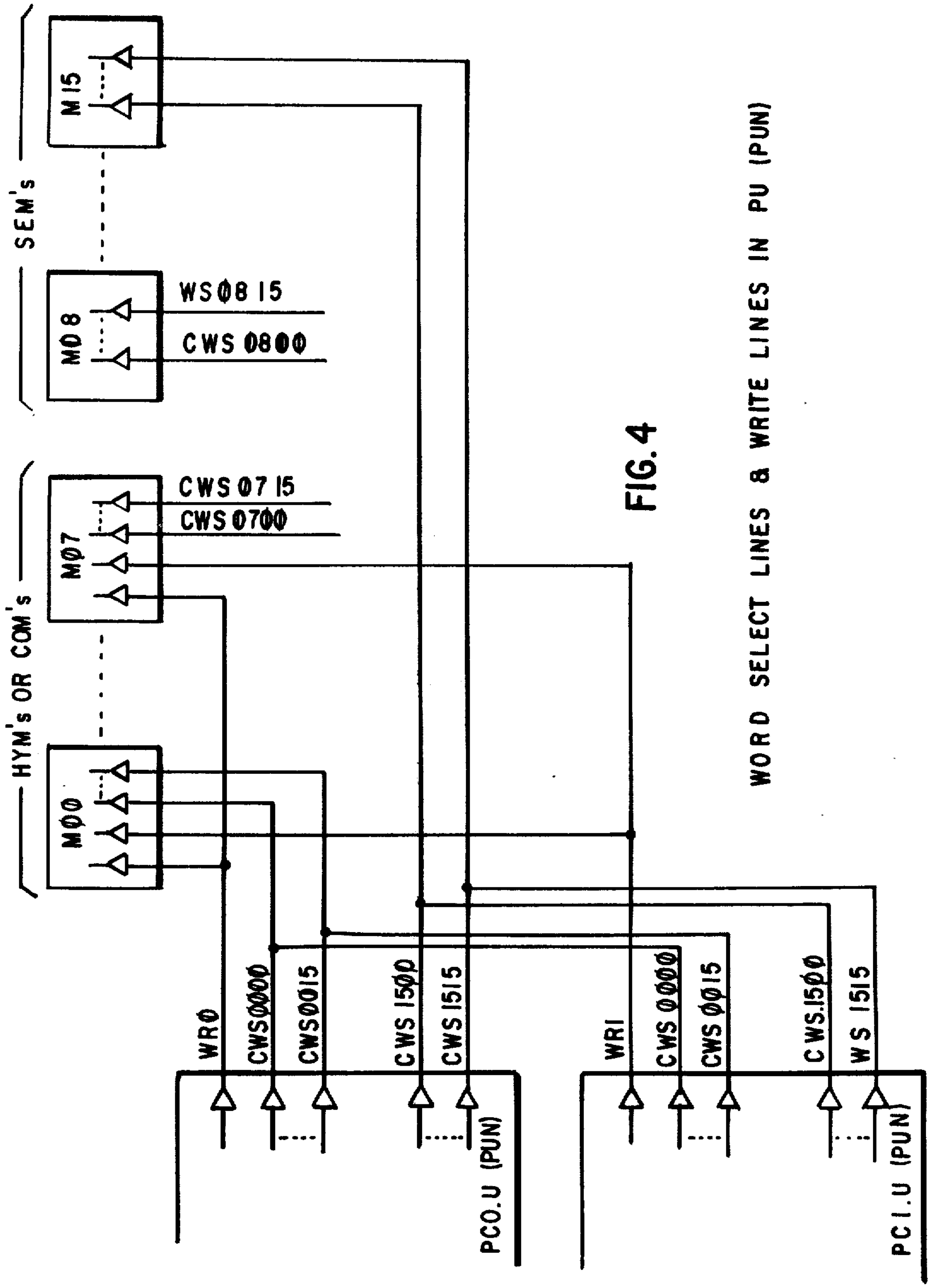
FIG. 4 shows select lines and write lines for a peripheral controller.
Figure 5:
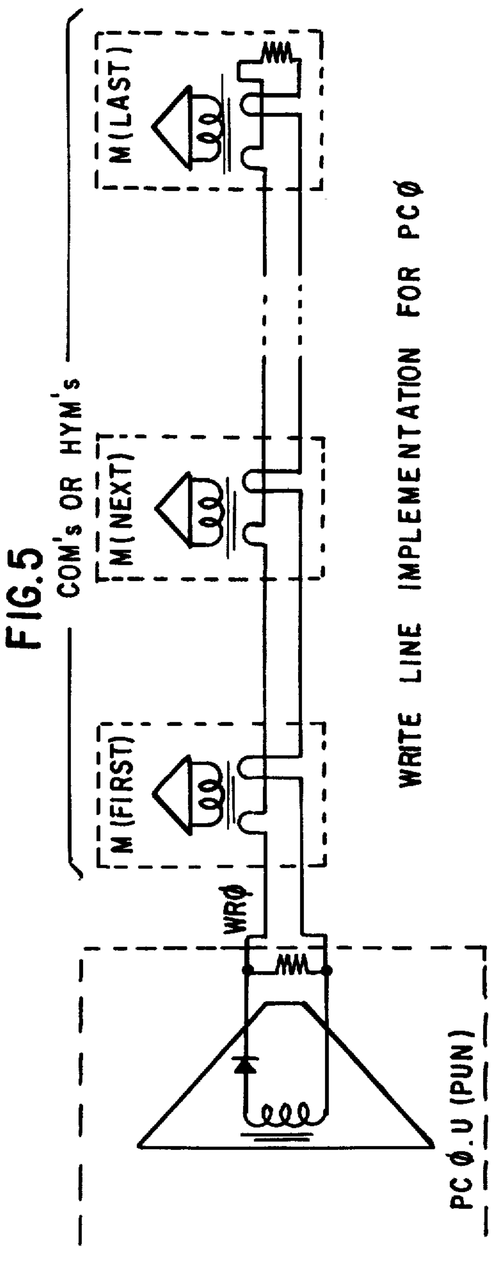
FIG. 5 is a schematic circuit representation of the implementation of write lines for a peripheral controller.

In FIGS. 4 and 5, there is arbitrarily selected an example where:

M00 through M07 are COM or HYM matrices
M08 through M15 are SEM matrices

The communication facilities consist of:

a. Data Bus DB (see FIG. 3)

Consists of positions DB.B00-31. It is accessed by cable drivers in both PC copies and leads to groups of cable receivers in each HYM and each COM in the PU unit. Output levels of these receivers are designated DL00-31. The Data Bus carries data to be written into COM or HYM matrices.

b. Return Bus RB (see FIG. 3)

Consists of positions RB.B00-31. It is accessed by groups of cable drivers in each Matrix of a PU unit, regardless of type, and leads to cable receivers in each PC copy. RB.B00-31 carries the data words (32 bits) that are read out of the Matrices.

c. Write Lines (see FIG. 4)

This is the only duplicated facility inside a PU. WR0 leads from PC0 to a cable receiver in each HYM and each COM; WR1 leads from PC1 to another receiver in each of these Matrices. It carries the "write" command to these Matrices.

d. Word Select Lines (see FIG. 4)

Each Matrix contains (a maximum of) 16 words and has (a minimum of) 16 Word Select Cable receivers by which a particular word in a Matrix is accessed. (Outputs of these receivers in a Matrix are designated as WSL00-15).

Each PC controller has sixteen groups of sixteen unit cable drivers for selecting individual words in the PU unit. Outputs of the two corresponding drivers (one in each PC copy) are paralleled and feed one cable receiver in a Matrix.

The Controller Word-Select lines CWS are designated:

CWS 0000–0015, word select lines for M 00, through

Figure 8:
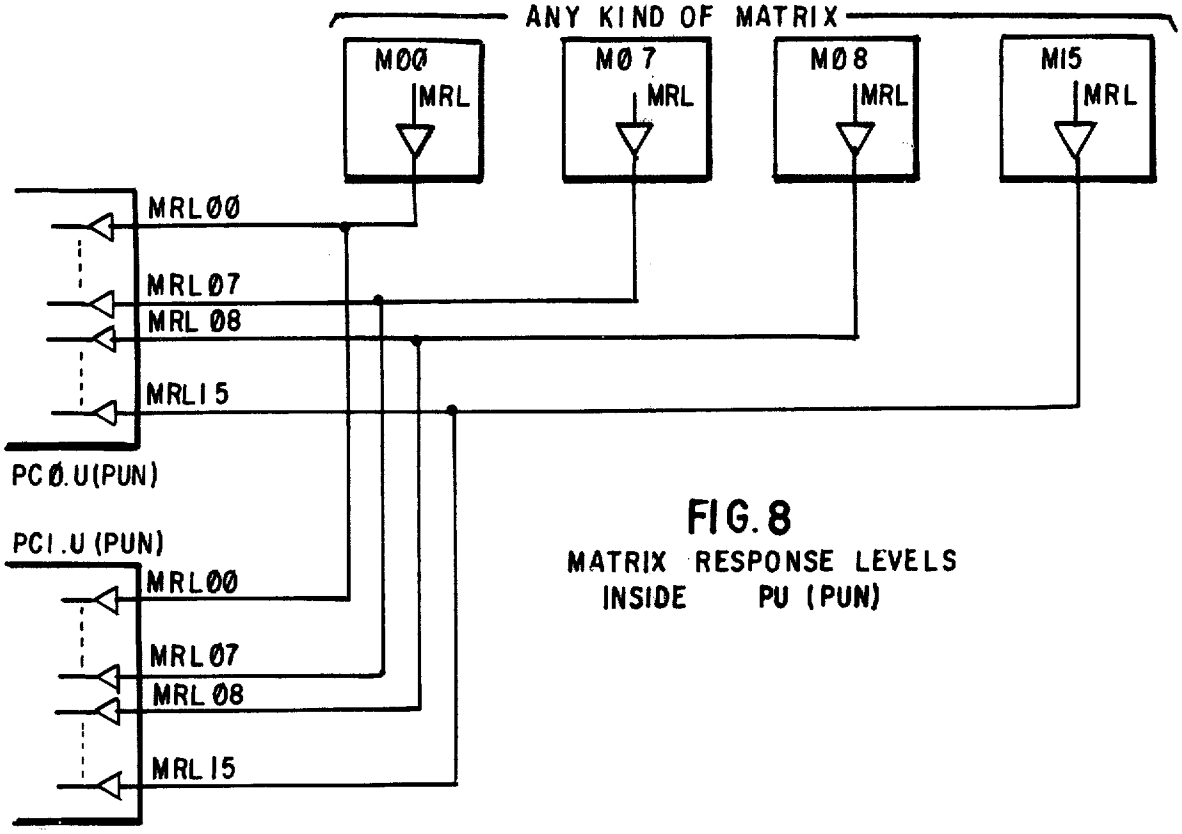
FIG. 8 is a schematic circuit representation of a matrix response level return circuit.

CWS 1500–1515, word select lines for M 15.

e. Matrix Response Lines (see FIG. 8)

Each Matrix contains one cable driver for its MR1 output, which acknowledges every access of this matrix by PC controller. Each PC controller contains a group of 16 cable receivers; MRL00-15, each of which receives the MRL signal from the correspondingly numbered matrix.

As shown in FIG. 5, a Write Line is driven by one cable driver. It passes through receiver transformers on all implemented COM's and HYM's and is terminated at the last COM or HYM on the line.

Figure 6:
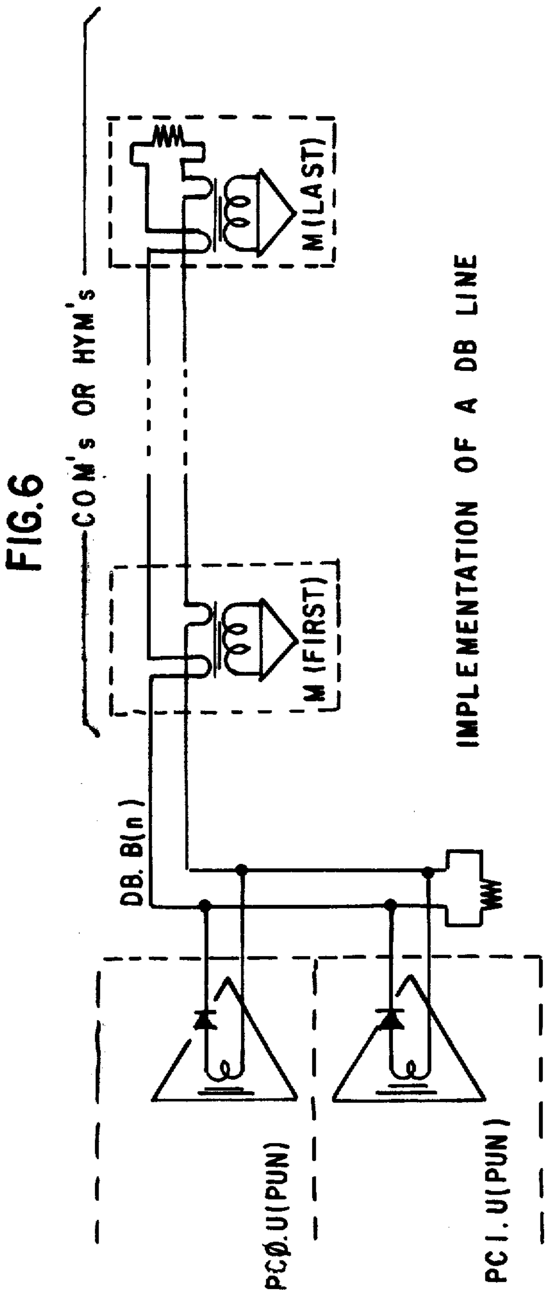
FIG. 6 is a schematic circuit representation of the implementation of data lines for a peripheral controller.
Figure 7A:
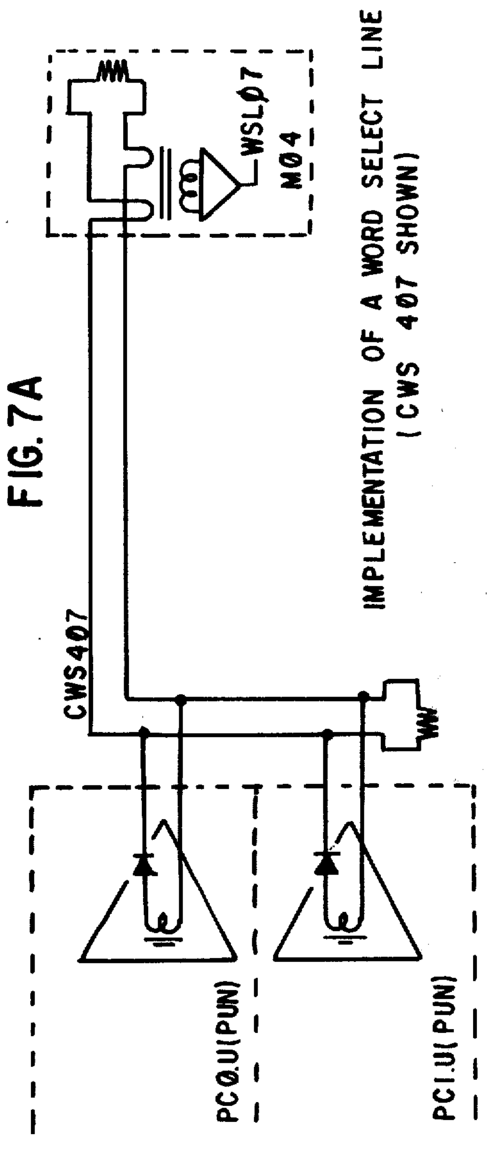
FIGS. 7A and 7B are schematic circuit representations of the implementations of word select and return lines, respectively, for a peripheral controller.
Figure 7B:
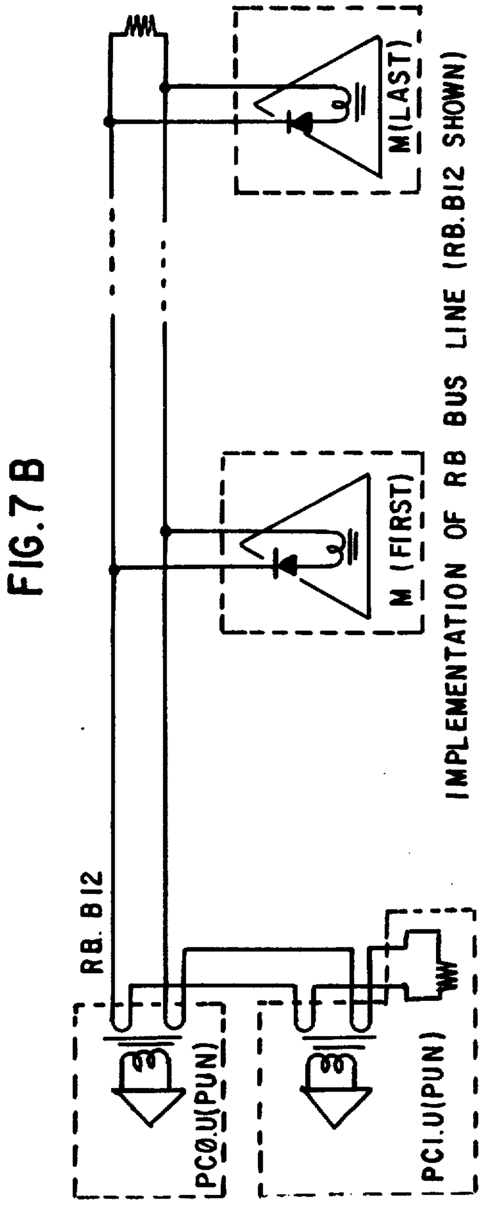

As shown in FIG. 6, a Data-Bus line is driven by a cable driver in each PC copy (parallel connection). It passes through a receiver transformer in each implemented COM and HYM matrices and is terminated at the last COM or HYM matrices of the line. As shown in FIG. 7A, a Word Select Line is driven by a driver in each PC copy (parallel connection). It leads to only one cable receiver when it is terminated. As shown in FIG. 7B, return Bus Lines are driven by cable-drivers in all implemented Matrices (parallel). They pass through cable receiver transformers of PC copies 0 and 1 and are terminated in either copy 0 or 1. There is a separate line from each Matrix in the PU unit, leading to receivers in PC0 and PC1. In other words each PC controller has a separate receiver for MRL of each Matrix.

COMMANDS AND RESPONSES WITHIN PU UNIT

Commands are sent by the Active PC copy to the SEM, COM, or HYM involved. Responses from these Matrices are received by both PC copies (provided that they are not in trouble). See also parts 4 and 5 of this specification. An accessed matrix always produces the Matrix Responses on its MR1 line, as follows:

a. Read Commands (all Matrix types)
   Active PC pulses CWS lines. The Matrix containing the accessed word places word contents on RB.B00–31. Both PC's accept the return data in their Data Register for retransmission to CP unit.

b. Write Commands
   Active Pc pulses addressed CWS line, and pulses its Write Line (WR0 if PC0 is active, WR1 is PC1 is active), and outpulses a data word (received from CP unit) on DB.B00–31. The PC controller ignores the data on RB.B00–31.

The reaction of a Matrix to a write command depends on the matrix type:

COM Contains Accessed Word
   COM matrix places the data in the flip-flops of the accessed word. It also places status of accessed word on RB.b00-31, which is ignored by the PC controllers.

SEM Contains Accessed Word
   Since a SEM matrix does not have "Write Line" inputs, it interprets the command as a "read." This does no harm since the PC controller ignores RB.B00-31, Accessed Word is a HYM.
   HYM's contain a mixture of SMP, CMP and/or DAMP words. Write commands have an effect only on CMP and DAMP flip-flops points. Again, status of accessed word is returned on RB, but ignored by PC controllers.

CONTROL MATRIX

Figure 9:
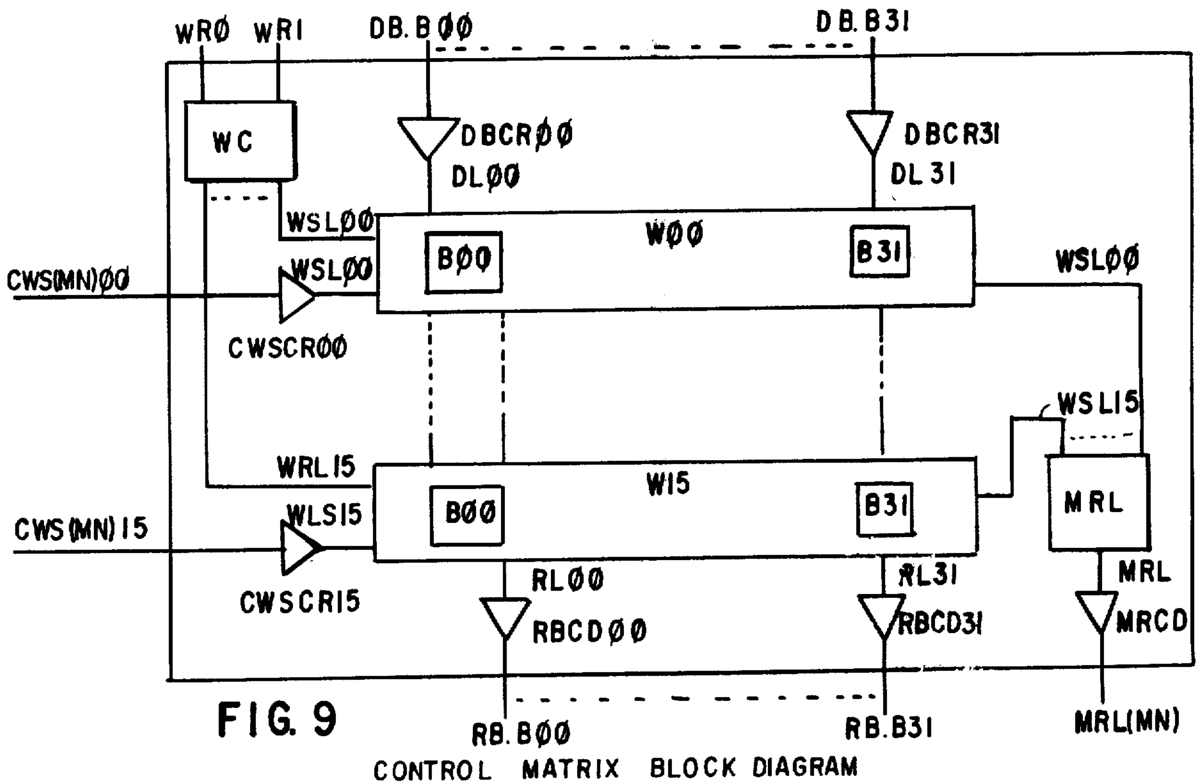
FIG. 9 is a block diagram of a control matrix for the system of FIG. 1.

Referring now to FIG. 9, the Control Matrix COM is a word oriented memory of 16 words, numbered W00 through W15. Each word is 32 bits in length, numbered B00 through B31. The individual bits of a COM word are called Control Matrix Points CMP. The output of a CMP point into the controlled equipment is either an electronic logic level or a relay contact. This is an implementation option, provided on a word basis.

Via the PC controllers, a COM is controlled and supervised by the CP unit on a word basis.

The two main functions a COM matrix performs are:

a. The Write Function
   All 32 CMP's in a word, addressed by the active PC Copy are set according to the data received on the Data Bus (DB).

b. The Read Function
   The status of all 32 CMP's in a word, addressed by the active PC, is non-destructively read out and placed on the Return Bus (RB) feeding into both PC's.

INTERFACE WITH THE PC CONTROLLERS

As shown in FIG. 9, there are sixteen Controller Word Select CWS leads from the PC copies, labeled CWS(MN)00 through CWS (MN)15, which terminate at the COM cable receivers. The designation MN is the Matrix Number. The output of the CWS cable receivers are Word Select Levels (WSL's), numbered WSL00 through WSL15 and are inputs to the respective COM words W00 through W15.

Two write leads, Write 0 (WR0) from PC0.U(UN) and Write 1 (WR1) from PC1.U(UN) terminate in the Write Control (WC) circuit. The WC circuit logically OR's the two WR functions and generates sixteen Write Level (WRL) leads, numbered WRL00 through WRL15, which terminate in the respective COM words, W00 through W15.

A 32 bit Data Bus (DB) from both PC's terminates at the COM in cable receivers. These bits are labeled DB.B00 through DB.B31. The outputs of the DB cable receivers are inputs to the respective bits of all COM words, i.e. DL(BN) is multed to W00.B(BN) through W15.B(BN).

Figures 10, 11A, 11B:
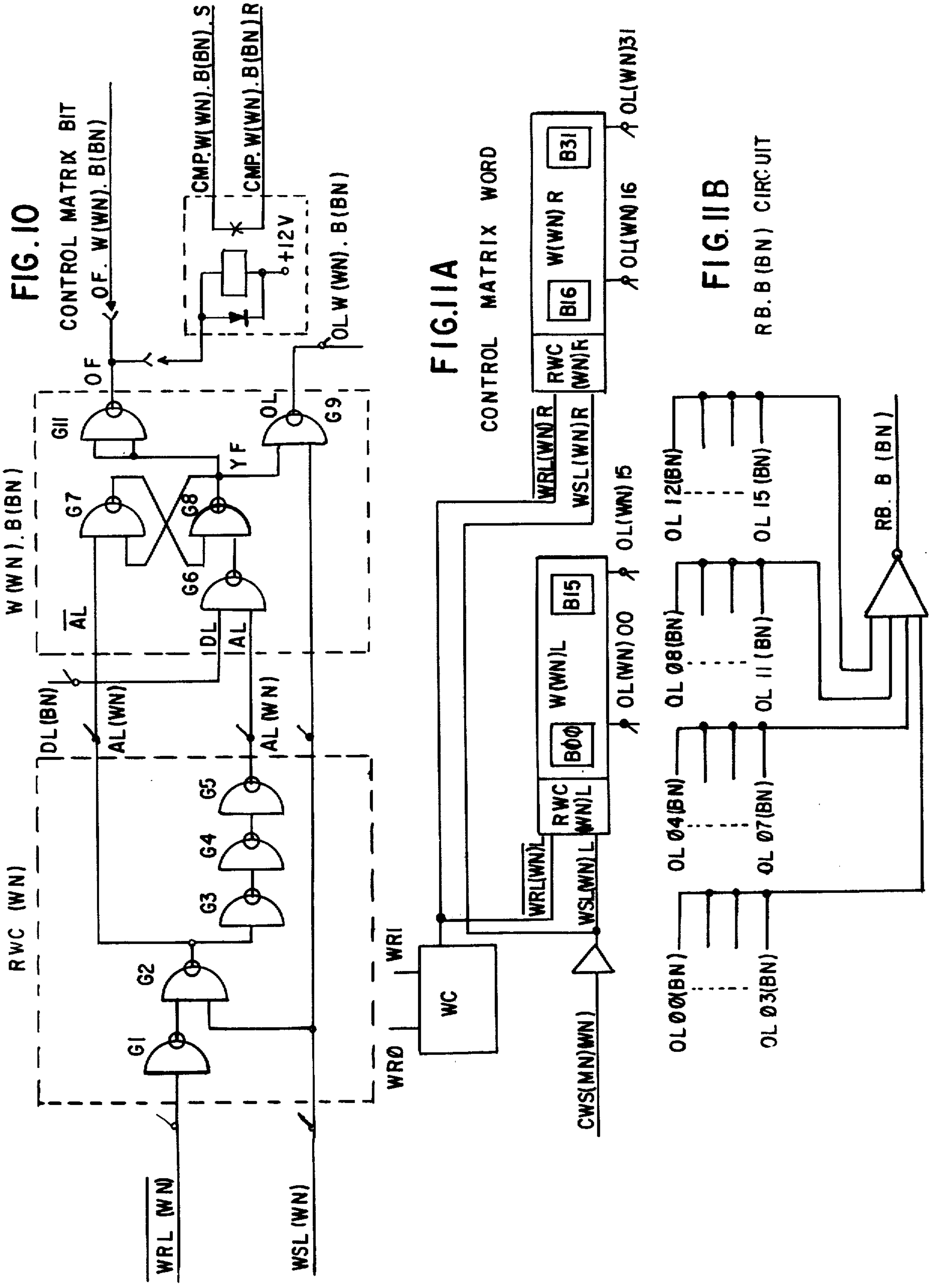
FIGS. 10 and 11A show write circuits for a control matrix.
FIG. 11B shows a return bus circuit for the control matrix to the peripheral controller.

As shown in FIG. 11B, a 32 bit Return Bus (RB) from the COM to both PC's is the only data input to the PC's from the COM. The RB bits are labeled RB.B00 through RB.B31. Any one RB bit, i.e. RB.B(BN), is generated by a 4 input cable driver which responds to a zero logic level on any of its four inputs. Each cable driver input consists of the "wired or" of the same bit Output Level (OL) of four consecutive COM words.

A particular RB bit, RB.B(BN), is generated by wiring OL00(BN) through OL03(BN) together, etc., to form the four inputs to the RB bit cable driver.

Logically, RB(BN) is the following function:

$$RB(BN) - OL00(BN) + OL01(BN) + \ldots$$
$$OL(WN)(BN) + \ldots OL15(BN)$$

RESPONSE LEVEL

Figures 14, 15:
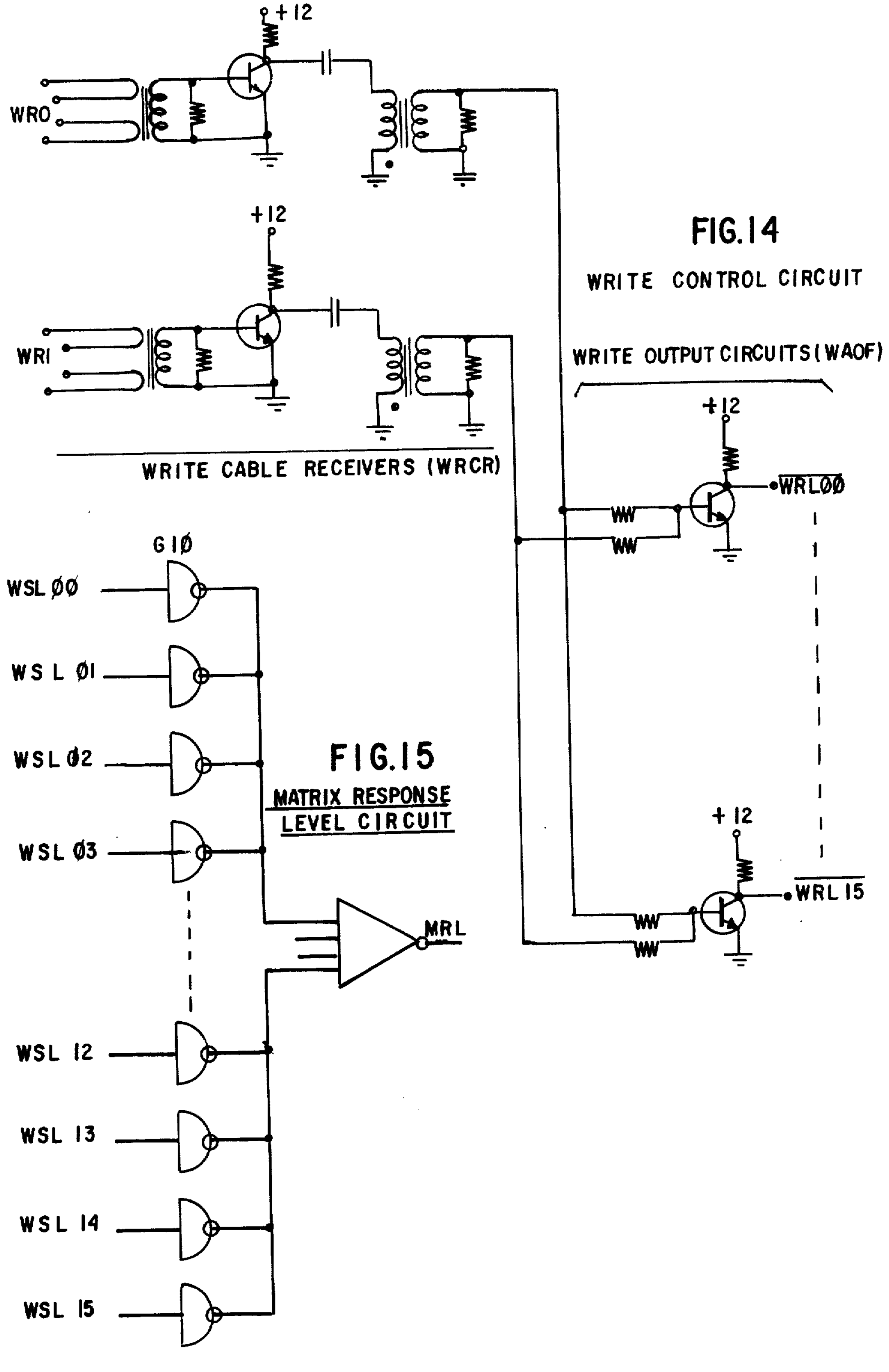
FIG. 14 is a schematic circuit representation of a a write control circuit of a peripheral controller.
FIG. 15 is a schematic circuit diagram for a matrix response level circuit of a peripheral controller.

As shown in FIG. 15, a part of the PC hardware check that insures only one word of the 256 addressable words in a PU was accessed, a Matrix Response Level (MRL) is required as an input to the PC's from all Matrices in the PU.

In the COM the MRL signal is generated by "ORing" the sixteen WSL signals and returning this signal via an AC cable driver to both PC's.

Logically, MRL is the following function:

$$MRL = WSL00 + WSL01 + \ldots\ldots\ldots WSL15$$

Therefore, any time any one of the sixteen words of the COM is accessed MRL becomes true for the duration of the WSL signal.

Figure 12:
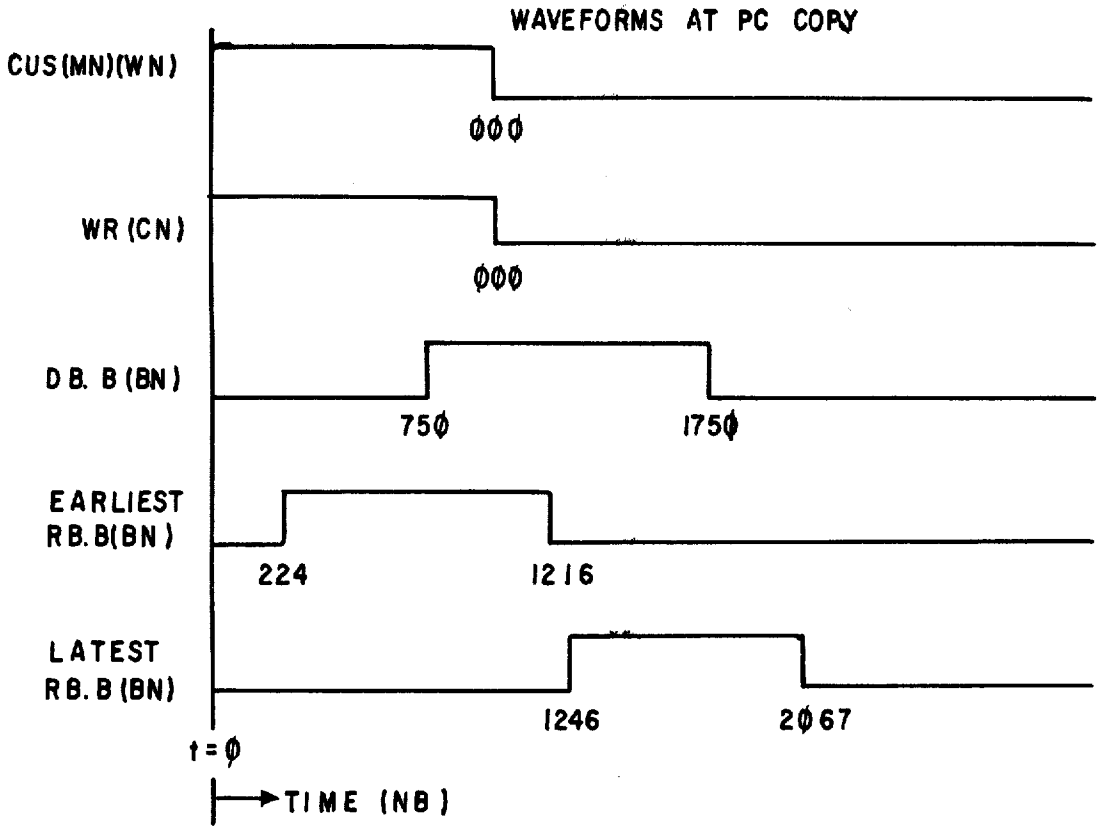
FIG. 12 is a timing chart showing the relationship of signals into and out of a control matrix.
Figure 13:
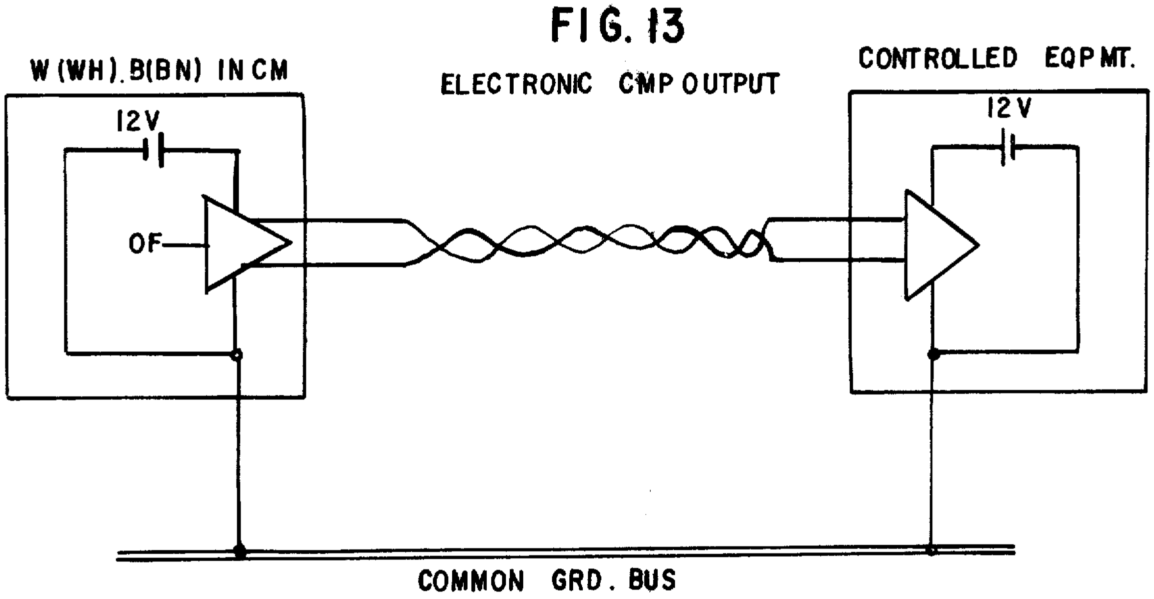
FIG. 13 illustrates the electronic output of a control matrix to controlled equipment.

As shown in FIG. 12, minimum and maximum worst case design analysis dictates the following requirements on signals into and out of the COM:

a. Cables between a COM and its PC's must be approximately equal in length, with a maximum length of 125 ft.

b. Pulse outputs of all CWS(MN)(WN) and both WR(CN) signals must be coincidental and of 1000 ns duration, referenced at the PC.

c. Pulse outputs of all DB.B(BN) signals must be delayed by 750 ns with respect to the CWS(MN)(WN) and WR(CN) signals and must be of 1000 ns duration.

d. Two cases of minimum and maximum appearance of the RB.B(BN) at the PC with respect to the occurrence of the CWS(MN)(WN) in the PC are:
  1. Earliest appearance delayed by approximately 220 ns with 990 ns duration.
  2. Latest appearance delayed by approximately 1240 ns with 820 ns duration.

INTERFACE WITH CONTROLLED EQUIPMENT

As shown in FIG. 10, the electromechanical CMP output will be a pair of leads labeled CMP.W(WN).B(BN).S (signal lead) and CMP. W(WN).B(BN).R (return lead). This pair of leads will be both sides of the 1A contact pair of a reed relay or a mercury wetted relay.

The reed relay or Correed used as the CMP output is No. KR-20021-11, 1A PC Correed. Option x in FIG. 2 illustrates the plug-in feature of the electromechanical CMP. The input to the Correed is the OF output level of the COM bit W(WN).B(BN). When the latch is in state 1, output OF = 0; and relay operated and contact closed.

In addition to the Correed CMP aforementioned, a sub-miniature mercury wetted relay CMP is available. This CMP can be used instead of the Correed CMP simply by plugging in a 44 board, MRCP instead of the 43 board, EMCP. The 44 board is available for use wherever a high usage CMP is required, eg MF Senders.

An electronic output level option is available from a CMP. This level is an HTL logic level and can be used only to drive other HTL circuits which are connected to a common HTL ground bus.

When a COM is located close to the electronic equipment controlled, i.e. in the same equipment rack, option *z* of FIG. 10 is used. In this case the output level OF.W(WN).B(BN) of the CMP is used directly.

When the electronic option is used, only output OF is available. OF is the complement of the state of the latch, l.e. when the latch is in the 1 state OF = 0.

During the execution of the WRITE Instruction, the electronic output level may have a transient spike impressed upon it due to the implementation of the control circuitry. These transients will occur as logic zero blips of.up to 1 s in duration impressed on a logic one level. Zero logic levels will contain no transients.

All bits of the COM words consist of memory elements implemented with HTL Nand Gates cross coupled in a latch circuit configuration. Inputs to a given latch are:

a. Accept Level - AL(WN)

b. Accept Not Level - $\overline{AL}$(WN)

c. Data Level - DL(BN)

Their Boolean relations as functions of WRL(WN) and WSL(WN) are:

$\mathrm{AL(WN)} = \overline{\mathrm{WSL(WN)} \cdot \overline{\mathrm{WRL(WN)}}}$ $\overline{\mathrm{AL}}\mathrm{(WN)} = \overline{\mathrm{WSL(WN)} \cdot \mathrm{WRL(WN)}}$ WRL(WN) is an output of the WC circuit shown in FIG. 14 whose inputs are WR0 and WR1. The relation for WRL(WN) is:

$$\mathrm{WRL(WN)} = \mathrm{WR0} + \mathrm{WR1}$$

The equations governing this latch are:

$Y_1 = X_1 X_2 + \overline{y}_2$ $Y_2 = X_1 + \overline{y}_1$

Where, $Y_2$ = OF, the output to the controlled equipment $Y_1$ = YF, the output to the RB $X_1$ = AL $X_2$ = DL The excitation map for this latch is given below:

| $Y_1 Y_2$ \ $X_1 X_2$ | 00 | 01 | 11 | 10 |
|---|---|---|---|---|
| 00 | 11 | 11 | 11 | 11 |
| 01 | (01) | (01) | 11 | (01) |
| 11 | 00 | 00 | (11) | 01 |
| 10 | (10) | (10) | 11 | 11 |
| | | $Y_1 Y_2$ | | |

The stable state (11) yields an output state where $Y_1$ and $Y_2$ are not complements of each other. Since the output is taken at $Y_2$, the controlled equipment will temporarily be switched in the off state ($Y_2$=1) when $Y_1$ is logically 1. This occurs when a 1 is written in a latch which is already in the 1 state.

The maximum time for this condition is 1 microsecond. The electromechanical CMP will filter this transient out, but the electronic output will transfer this transient to the controlled equipment.

The Read function of the COM for a particular RB.B(BN) is a combinational function of the WSL(WN) and YF levels as follows:

RB.B(BN) = [WSLØØ] [WØØ.B(BN).YF] + [WSLØ1] [WØ1.B(BN).YF] + .... [WSL(WN)] [W(WN).B(BN).YF] + ...... [WSL(15)] [W15.B (BN).YF]

In particular, when WSL09 = 1

RB.B(BN) = [WSL09] [W09.B(BN).YF]

COM CIRCUIT IMPLEMENTATION

All logic functions, except for the WC circuit which contains discrete components, are implemented with Sylvania High Threshold Logic (HTL) integrated circuits. All circuits in the COM operate at +12V DC supply level.

The +12V DC supply is a simplex, plug-in type, DC to DC inverter, whose input is −48 volts Office Battery.

All printed circuit card types in the COM must be replaceable with power "on" in the unit because a COM is a simplex piece of equipment, which must be at least partially operational at all times.

The assignment of the COM circuits to the printed circuit cards has been chosen to:

a. Make CMP output options available on a plug-in basis.

b. To allow operational, partially implemented COM's to exist.

c. Localize COM faults via diagnostic programs.

Seven printed circuit card types are required as follows:

| TYPE | FUNCTION |
|---|---|
| 18 | 4 Input HTL Nand Gate |
| 21 | HTL AC Cable Receiver |
| 20 | HTL AC Cable Driver |
| 42 | 16 Bit HTL Register |
| 43 | Electromechanical Control Point |
| 44 | Mercury Relay Control Point |
| 83 | Write Control (WC) Circuit |

As shown in FIG. 11A, card type 42 contains a Read/Write Control (RWC) circuit and 16 CMP's. Two of these cards are required to construct a COM word. A word consists of RWC(WN)L (left), RWC(WN)R (right), W(WN)L (left), and W(WN)R (right) circuits.

MAINTENANCE ASPECTS OF COM MATRIX

The COM has been designed so that the maximum effect of a single fault is either the loss of one word, or the loss of one bit in each word (i.e., a column of 16 bits). The only exception is a power failure which will put the COM completely out of service.

As the COM is not duplicated, a fault will cause the equipment controlled by the affected control point to malfunction until the fault is repaired. Fault detection will be accomplished by following a WPU instruction with a RPU instruction and matching the input with the output in the CP. The check will be on a routine basis.

The packaging of a COM has been arranged so that while faulty cards are replaced, up to eight half words may be mutilated, or the ability to read from or write into the matrix may be temporarily lost.

Important words which must not be mutilated or to which access must not be lost, will have to be duplicated in another COM.

Failures associated with relays or cable drivers at the outputs of individual control matrix points cannot be detected by routining the COM. Detection of these failures is the responsibility of the system which uses these outputs. Explicitly, output OF.W(WN).B(BN) will be checked by the COM routines, but outputs CMP.W(WN).B(BN).S and CMP.W(WN).B(BN).R will not, see FIG. 10.

As shown in FIG. 14, the write function in the COM is designed so that no failure can cause a permanent write signal to all sixteen words. Part of the write function is associated with PC0 and an identical part is associated with PC1. Thus a fault in either of these "duplicated" parts can be avoided by changing control copies of the PCU. Faults in the transistor outputs can only affect the writing of one word.

Referring to FIGS. 9 and 10, if a word select level WSL(WN) becomes stuck at 1, every time any other word is written, or read, the faulty word is also written, or read. The additional writing into the faulty word is not very significant as it affects only the faulty word. However, the additional reading of the faulty word will invalidate any other word that is read from the same COM unless the faulty word is all zeros.

Faulty words are automatically set to all zeros by providing a second write signal which is generated by the PC at the end of each RPU or WPU instruction. At this time the data bus is all zeros, so this in conjunction with the second write signal and the word select level stuck at one, will set the faulty word to all zeros.

As shown in FIG. 11, failure to read a particular bit of a COM word can be caused by either a Return Bus cable driver being faulty, an OL level from any of the sixteen COM words stuck at "zero," or a Data Bus cable receiver being faulty. Software is able to localize this fault only to one of eighteen possible faulty cards.

Diagnosis and routining of COM words with electromechanical control points will be simple due to the slow response time or the equipment being controlled. This allows any desired pattern to be written into, and read from the word, provided that the original pattern is restored before the equipment has time to respond. The same argument applies to words with electronic control points that eventually drive electromechanical equipment.

For "pure" electronic control points which cannot accept changes of state lasting tens of us, a different approach is required. The best solution is to follow all WPU instructions to these words with RPU instructions and to match the input with the output in the CP. An alternative solution is to provide a map in the PS of these words. This could then be compared against the pattern read from the COM word. However, in order to make the fault detection effective, the comparison must be made after each read.

The following Table 1 gives a list of all logic faults that can occur in the COM and the effect each fault will have when a WPU instruction is followed by an RPU instruction. Gate inputs stuck at 0 or 1 are identical to preceding gate outputs stuck at 0 or 1. The following paragraph will explain the abbreviations used in the table.

Gate designations are as labeled on FIGS. 9, 10, 14 and 15. Note that a DBCR(BN) has two outputs, upper (U) and lower (L). DL(BN)U drives words 00 – 07 and DL(BN)L drives words 08 – 15. Thus DL(UL) means both outputs, and DL(U+L) means either output of DBCR(BN). C and R are the read decoupling circuits (see F.3b). In the pattern column, W means "word," HW means "half word," B means "bit." The statement W = K means the word is constant, i.e. whatever pattern is written into the word, the read out pattern does not change. G10 are the gates driving MRCD.

The following Table 2 gives a list of all possible fault patterns, and the cards that must be changed in order to repair the fault once the fault pattern has been recognized.

TABLE 1

COM FAULT ANALYSIS

| Fault No. | Gate | No. of Gates | Output Stuck at | Fault Pattern | Words Affected |
|---|---|---|---|---|---|
| F1 | WRCR | 2 | 0 | W = K | All |
| F2 | WRCR | | 1 | Impossible | — |
| F3 | WROP | 16 | 0 | * | 1 |
| F4 | WROP | | 1 | W = 0 | 1 |
| F5 | CWSCR | 16 | 0 | W = 0, MRL = 0 | 1 |
| F6 | CWSCR | | 1 | W = 0, MRL = 0 | 1 |
| F7 | G1 | 32 | 0 | HW = K | HW |
| F8 | G1 | | 1 | * | HW |
| F9 | G2 | 32 | 0 | HW = 0 | HW |
| F10 | G2 | | 1 | HW = K | HW |
| F11 | G3 | 32 | 0 | HW = 0 | HW |
| F12 | G3 | | 1 | ** | HW |
| F13 | G4 | 32 | 0 | ** | HW |
| F14 | G4 | | 1 | HW = 0 | HW |
| F15 | G5 | 32 | 0 | HW = 0 | HW |
| F16 | G5 | | 1 | ** | HW |
| F17 | DL(UL) | 32 | 0 | B = 0 | All HW |
| F18 | DL(UL) | | 1 | B = 1 | All HW |
| F19 | DL(U+L) | 32 | 0 | B = 0 | 8HW |
| F20 | DL(U+L) | | 1 | B = 1 | 8HW |
| F21 | G6*** | 512 | 0 | B = 1 | HW |
| F22 | G6 | | 1 | B = 0 | HW |
| F23 | G7 | 512 | 0 | B = 1 | HW |
| F24 | G7 | | 1 | B = 0 | HW |
| F25 | G8 | 512 | 0 | B = 0 | HW |
| F26 | G8 | | 1 | B = 1 | HW |
| F27 | G9 | 512 | 0 | B = 0 | All HW |
| F28 | G9 | | 1 | B = 0 | HW |
| F29 | RBCD | 32 | 0 | B = 0 | All HW |
| F30 | RBCD | | 1 | B = 0 | All HW |
| F31 | G10 | 16 | 0 | MRL = 0 | All |
| F32 | G10 | | 1 | MRL = 0 | 1 |
| F33 | MRCD | 1 | 0 | MRL = 0 | All |
| F34 | MRCD | | 1 | MRL = 0 | All |

*The faulty half word will read out normally, but after being read out it will change to all zeros. Detected by special routine.

**The faulty half word will accept any 1's on the data bus at any time. Detected by special routine.

***If the AL input to G6 becomes open circuit, the associated flip-flop will accept a 1 from the data bus at any time. Detected by special routine.

The faulty half word will read out normally, but after being read out it will change to all zeros. Detected by special routine.

The faulty half word will accept any 1's on the data bus at any time. Detected by special routine.

If the AL input to G6 becomes open circuit, the associated fli-flop will accept a 1 from the data bus at any time. Detected by special routine.

TABLE 2

COM FAULT PATTERNS

| PATTERN NUMBER | FAULT PATTERN | WORDS AF-FECTED | FAULT NUMBER GIVING PATTERN | CARDS CHANGED |
|---|---|---|---|---|
| FP1 * | W = K | All | F1 | 83 |
| FP2 * | W = 0 | 1 | F4 | 83, 42 × 2 |
| FP3 | HW = K | HW | F7, F10 | 42 |
| FP4 | HW = 0 | HW | F9, F11, F14, F15 | 42 |
| FP5 | B = 0 | HW | F22, F24, F25, F28 | 42, 43/44 |
| FP6 | B = 0 | 8HW | F19 | 21, 42 × 8 |
| FP& * | B = 0 | All HW | F17, F29, F30, F27 | 20, 21, 42×10 |
| FP8 | B = 1 | HW | F21, F23, F26 | 42, 43/44 |
| FP9 | B = 1 | 8HW | F20 | 21, 42 × 8 |
| FP10 * | B = 1 | All HW | F18 | 21 |
| FP11 * | W=0,MRL=0 | 1 | F5, F6 | 21, 42 × 2 |
| FP12 | MRL = 0 | 1 | F32 | 17, 21 |
| FP13 * | MRL = 0 | All | F31, F33, F34 | 17, 20 |

* FP1, FP2, FP8, FP11, FP12 and FP14 could be due to a fault in the PC(CN). Copies will be changed to tiebreak between PC(CN) and the COM for these fault patterns.

FP1, FP2, FP8, FP11, FP12 and FP14 could be due to a fault in the PC(CN). Copies will be changed to tie-break between PC(CN) and the COM for these fault patterns.

SENSE MATRIX

Figure 16:
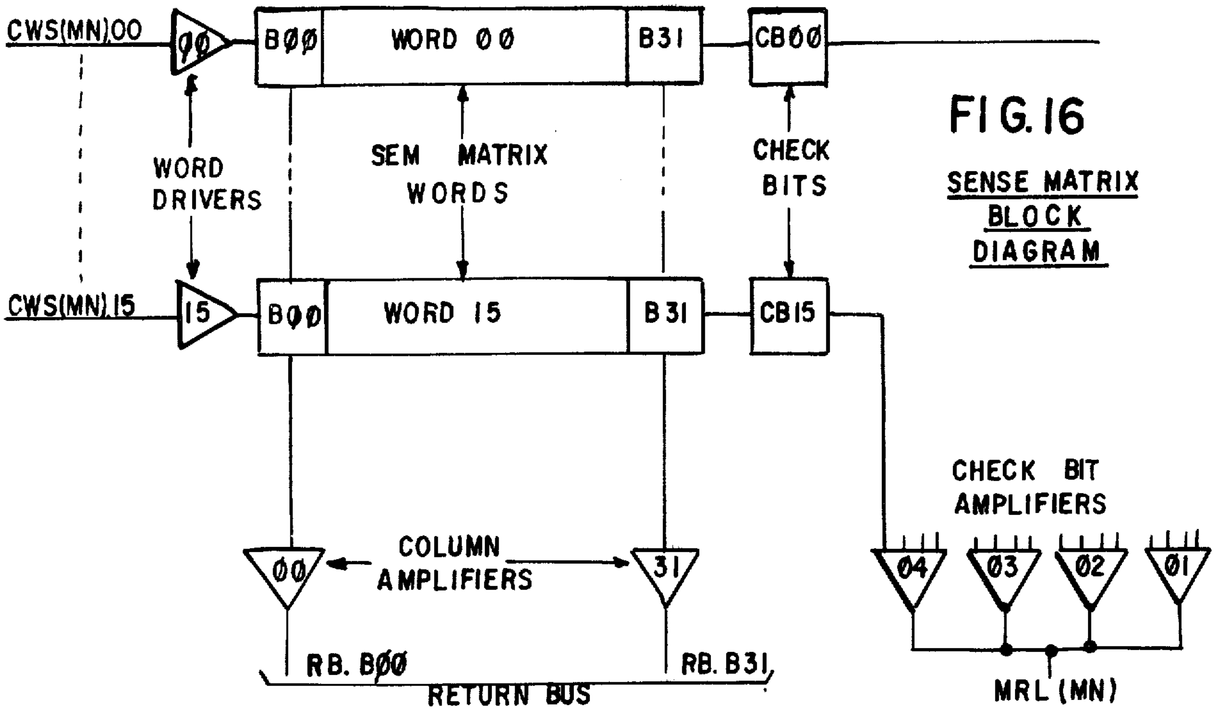
FIG. 16 is a block diagram of the sense matrix.

Referring now to FIG. 16, the Sense Matrix SEM functions as an input interface between the electromechanical equipment in a TSPS office and the Central Processor CP. Specifically, the SEM monitors the states of electromechanical equipment via metallic contacts supplied by the monitored equipment. And, acts as an interface between the slow speed, high power, electromechanical equipment and the fast speed, low power, logic circuitry of the CP.

A SEM is a word oriented matrix composed of 16 words of 32 bits per word, giving a total matrix capability of 512 bits (16 × 32). Word numbering ranges from 00 to 15 and bit numbering from 00 to 31.

A bit in a SEM is called a Sense Matrix Point (SMP). Each SMP is composed of 2 resistors, a capacitor, and a diode. (See FIG. 17). Each SMP is connected via a twisted pair of wires to a floating contact pair. The contact pair being a part of the supervised electromechanical equipment.

Figure 18:
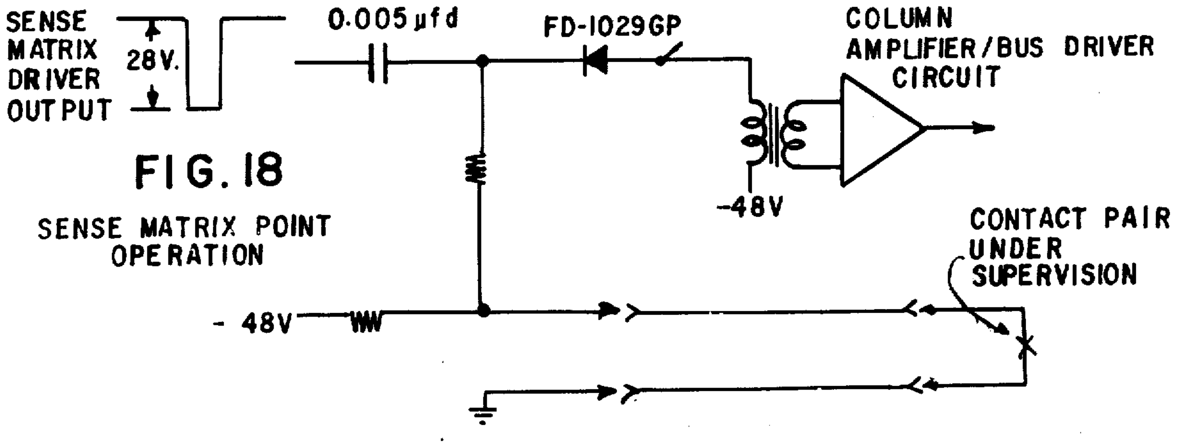
Figure 19:
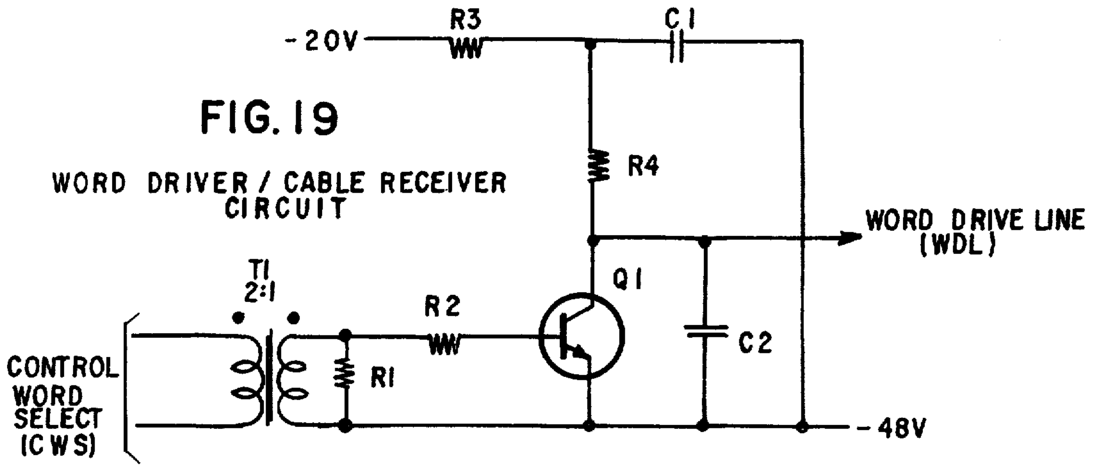
FIGS. 19–21 are schematic circuit representations of word driver, column amplifier circuits and a check bit line associated with a sense matrix.

SMP's points function as follows with reference to FIG. 18. If the contact pair connected to a SMP is open circuited, the SMP capacitor charges to a −48 volt potential. Then when a Sense Matrix Driver interrogates that SMP, the driver pulse can propagate through the SMP and activate the Column Amplifier. This is possible because the SMP diode has a −48 volt potential applied to both its anode and cathode. If the contact pair connected to a SMP is short circuited, the SMP capacitor charges to ground potential. In this case, the driver pulse is inhibited from propagating through the SMP to the Column Amplifier. This is caused by the −48 volt reverse bias present on the SMP diode. Thus we see how the contact pair controls the output of a SMP by changing the bias voltage on the SMP capacitor.

The interrogation of a SEM word by the CP is accomplished via a Peripheral Controller (PC). A PC decodes the binary address sent by the CP, which defines the matrix number and matrix word, and does the actual interrogating of the SEM word. The SEM word is interrogated by pulsing one out of 16 Word Select leads of a SEM. Each Word Select lead is associated with a word of the SEM. The data read from the SEM word spills out in parallel form and is placed in the PC's Data Register. The data contained in the PC's Data Register is then transmitted back to the CP.

When using data obtained from a SEM, note that a logical "ONE" level corresponds to an open relay contact state. Conversely a logical "ZERO" level corresponds to a closed contact state.

In addition to the electromechanical SMP described above, there exists an electronic SMP. This electronic SMP is used to supervise electronic equipment. The electronic SMP differs from the electromechanical SMP in that logic gates are used to implement the electronic SMP. In this case logic levels are supervised rather than metallic contacts.

Presently the electronic SMP's are only used in Hybrid Matrices (HYM's) as either a Traffic Office Access Matrix (TOM), an Input/Output Access Matrix (IOM), or a Network Access Matrix (NAM). A description of these HYM's can be found in their respective specifications.

As shown in FIG. 16, there are 16 Controller Word Select (CWS) leads from the PC copies, labeled CWS(MN)00 through CWS(MN)15, which terminate at the SEM Word Drivers. (See FIG. 4). The designation MN is Matrix Number. The output of the Word Drivers are Word Drive Levels (WDL's), numbered WDL00 through WDL15 and are inputs to the SEM words W00 through W15.

Figure 20:
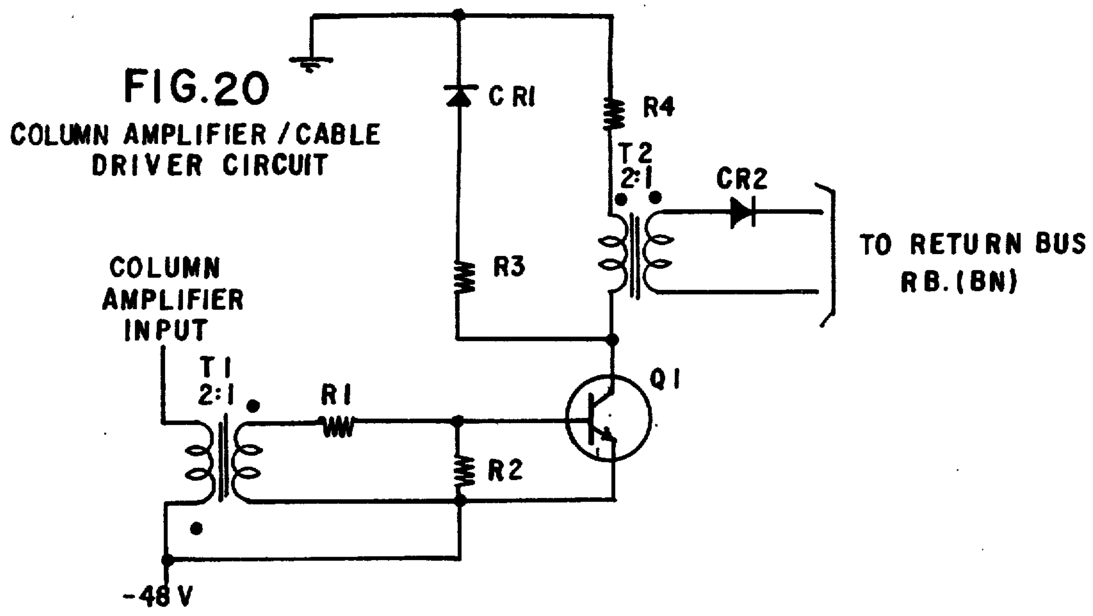

The SEM sends 32 bits of data via the Return Bus (RB) to the PC's. This bus has 32 bits labeled RB.B00 through RB.B31. The data bits are placed on the RB by Column Amplifiers (CA's). (See FIG. 20). A CA ac- -cepts data from all 16 words for a particular bit position via a diode "OR" gate and drives the RB. The RB data lasts for the duration of the WDL signal (one microsecond). The WDL signal pulse width is a function of the CWS pulse width.

To insure that a SEM Word Driver was activated by a CWS signal and also to perform a PC hardware check that only one word of the 256 possible word address was addressed, a Matrix Response Level (MRL) is generated by the SEM.

Figure 21:
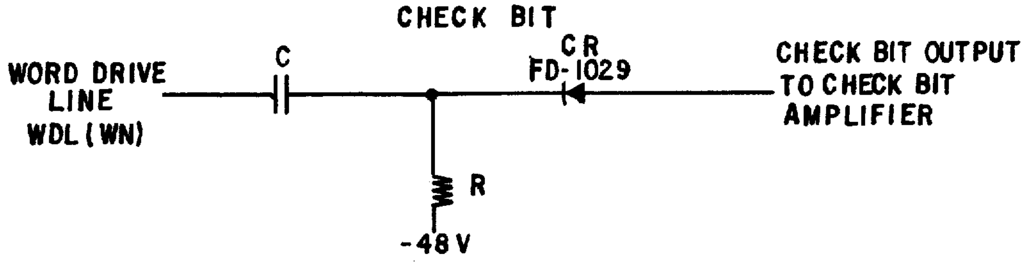

Referring to FIG. 21, the MRL signal is generated by "ORing" the outputs of Check Bits and driving Check Bit Amplifiers. The Check Bits (CB) are similar to SMP's except that their outputs only depend upon the presence of a WDL signal.

Figure 22:
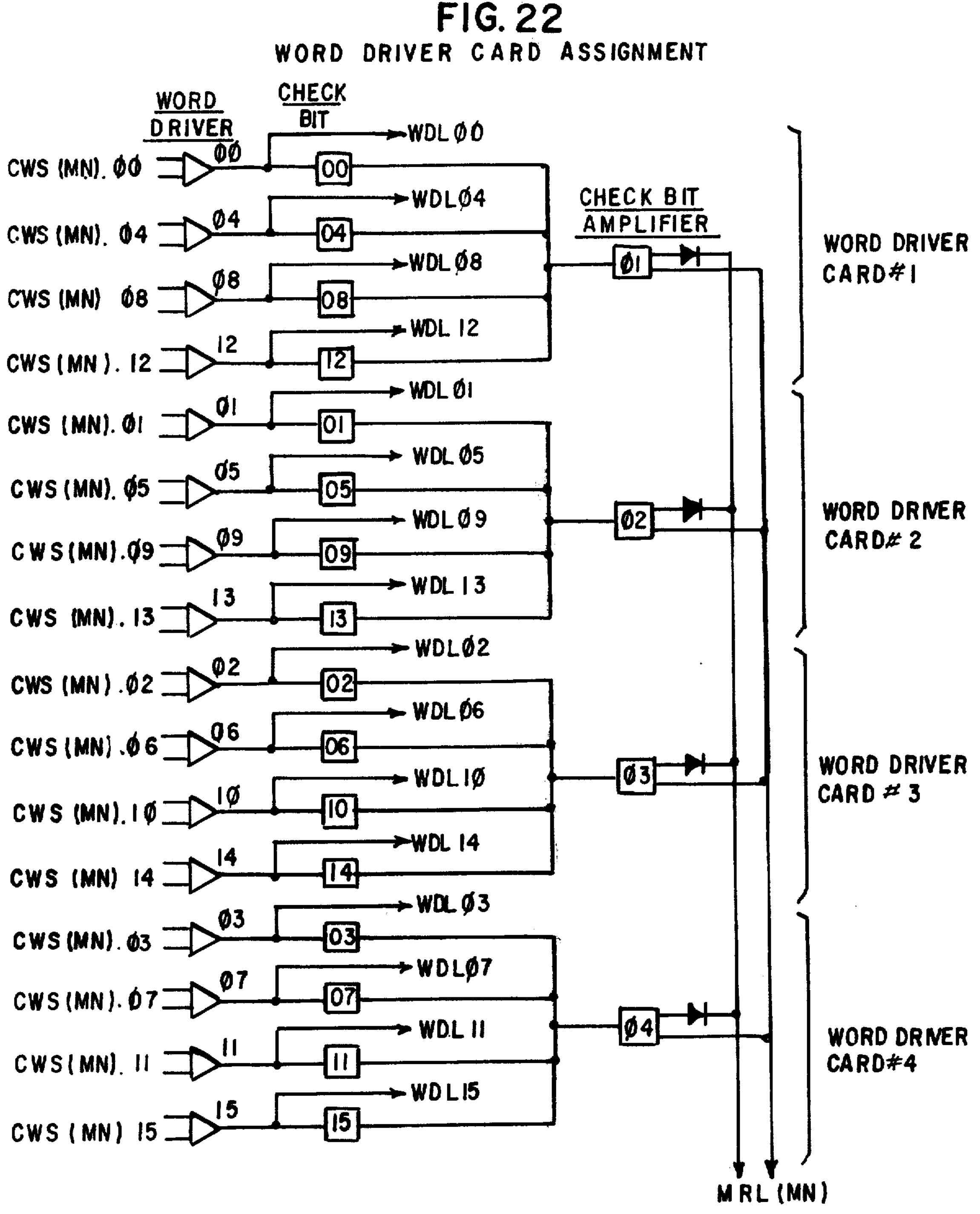
FIG. 22 shows the assignments of word driver circuits for the sense matrices.

Referring to FIG. 22, in order to minimize the effect of a failure of the MRL, four Word Drivers and their CB's are associated with one CB amplifier. The four CB Amplifiers, required for a 16 word SEM have their outputs diode "ORed" on the MRL AC bus return leads to the PC's. An MRL circuit failure can cause the loss of only 4 words (¼) of the SEM.

Logically, the MRL is an "OR" function of all the 16 WDL's. The MRL pulse duration of the CWS signals.

Figure 23:
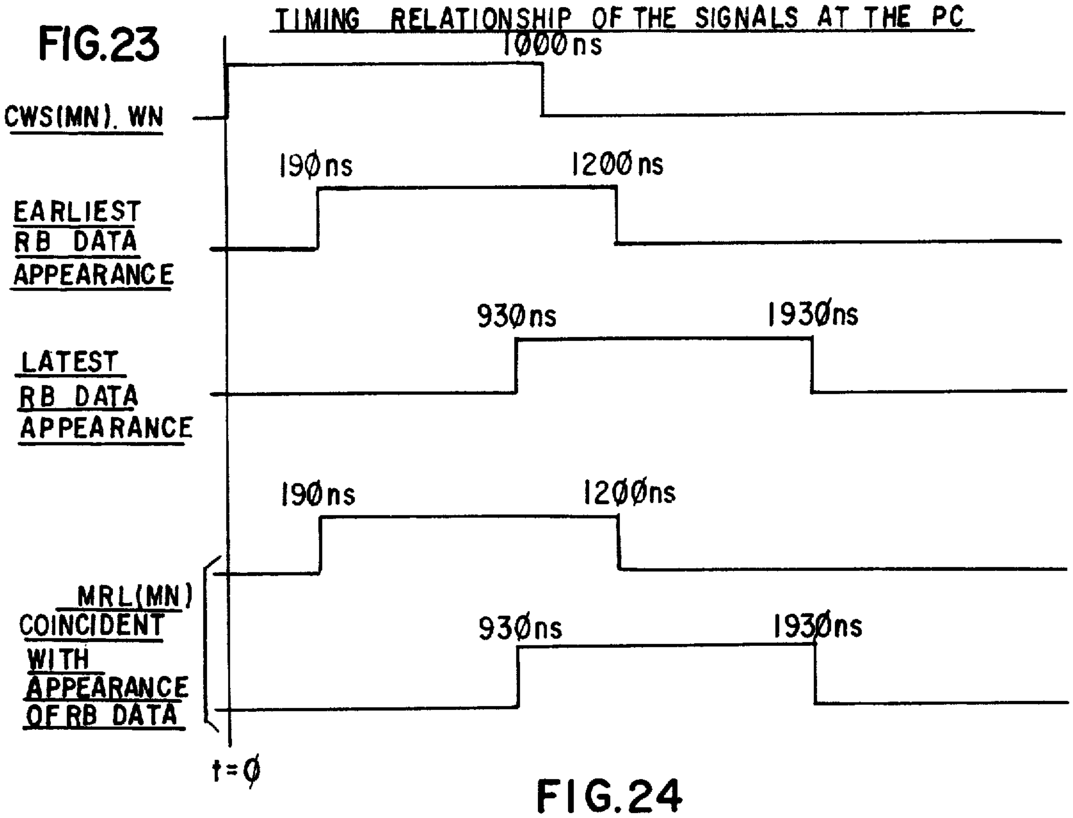
FIG. 23 is a timing chart showing the relationships of signals at the peripheral controller.

Referring to FIG. 23, the timing relationship between the CWS signal and the RB(BN) signals at the PC's is dependent upon (1) the cabling distance between the SEM and the PC's (2) the AC cable driver and receiver delays and (3) the SEM circuit delays.

Worst case cable delays are based on the minimum (10 feet) and the maximum (125 feet) cabling between the PC's and the SEM. AC Cable Driver delays are 36 ns minimum and 80 ns maximum. AC Cable Receiver delays are 30 ns minimum and 54 ns maximum. SEM circuit delays are 100 ns minimum and 300 ns maximum.

The earliest appearance of the RB data is 196 ns at the output of the PC's AC Cable receivers referenced to the CWS signal at the input to the PC's AC Cable driver. Similarly referenced, the latest appearance of the RB data is 934 ns.

There exists a SMP circuit limitation on the minimum repetitive interrogation (Read Out) period for a given SEM word of 64 ns. This limitation exists due to the SMP capacitor RC recovery time. An exception to this rule is that two consecutive interrogations (read instructions), spaced 12 ns apart in time is permissible.

Figure 17:
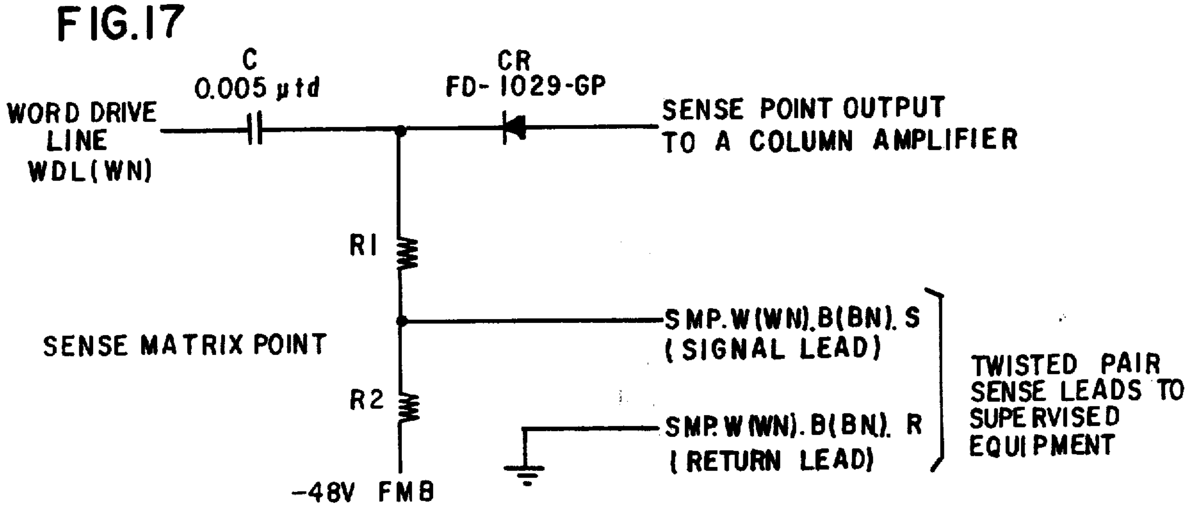
FIGS. 17 and 18 show schematic circuit representations of the interface between a sense matrix and supervised equipment.

Referring to FIG. 17, associated with each SMP is a set of twisted pair sense leads designated SMP.W(WN).B(BN).S (signal lead) and SMP.W(WN).B(BN).R (return lead). Twisted pair wiring is used to minimize the introduction of noise into an SEM via the sense leads and to eliminate multiple ground loops.

These SMP sense leads are wired to a set of relay contacts supplied by and electrically isolated from the supervised equipment. The relay contacts must be capabale of handling 5 milliamperes of current at 48 volts (0.24 VA).

A SMP performs a logical inversion of the relay contact states. Because of this fact, the following should be kept in mind when writing a program.. When a SMP is read out, an open relay contact state (logical "ZERO") will correspond to a logical "ONE" signal from the SMP. Conversely, a closed contact (logical "ONE") will correspond to a logical "ZERO" signal from the SMP.

The limitation on the maximum cabling length between a supervised contact and a SMP is purely arbitrary. Increasing cable lengths only cause a longer delay in sensing changes in contact states.

All circuits in the SEM are implemented with discrete component circuitry in the preferred form of the present invention. Three different package types are used in implementing the SEM. They are (1) Package Type 37, SMP Circuits, (2) Package Type 38, SEM Battery Filter and Regulator, and (3) Package Type 39 SEM Driver and Check Bit Amplifier.

Package type 37 printed wiring card (PWC) physically implements 32 SMP's and two CA's. (See FIG. 5). The 32 SMP's are implemented on a column basis in two groups of 16 SMP's. Each group of 16 SMP's form a SEM column which connects to one of the two CA's located on the card. Each SMP in a group of 16 is assigned to one of the 16 words of the SEM. With this packaging arrangement 16 package type 37 PWC's are needed to fully implement a SEM. (See FIG. 9).

Package type 38 PWC implements circuitry needed to filter the −48 volt Main Battery and provide a regulated −20 volt potential. The −20 volt potential is required by the package type 39 SEM Driver circuits. One package type 38 is required for each SEM.

Package type 39 implements four SEM Driver circuits (See FIG. 4), four CB's (See FIG. 6), and one CB amplifier. Four package type 39 PWC's are required to fully implement a SEM. (See FIG. 7).

The 21 PWC's needed to implement a complete SEM are located in one electronic file. A back plane ground and two horizontal bus strips are used to distribute −48 volt and −20 volt power.

PWC's are mounted on double 0.450 inch card slot spacing. An exception is package type 38 which requires 3 card slot spaces.

SMP outputs are wired from the SEM file to a terminal block file located directly above the SEM file. The terminal block file mounts 83 pin terminal blocks. Each SEM word is assigned to one of 16 terminal blocks.

MAINTENANCE ASPECTS OF SMP MATRIX

SMP points respond with an output signal when interrogated while sensing an open metallic contact state. This was a design feature incorporated in the SMP.

From maintenance considerations it is more desirable to have a SMP respond with an output signal when the contact being monitored is an open contact state. During periods of light traffic, contacts will then more probably be in the open contact state. Maintenance routines run during slack times will then be better able to distinguish column bit faults.

Another feature of the SMP design chosen for the SEM, is its ability to determine faulty column "ORing" diodes, Open column diodes are easily detected because of the conspicuous absence of output signals for that bit position. Conversely, shorted column diodes cause a SMP to continuously respond with output signals. These column diode faults are independent of the state of the contact being sensed by the SMP.

Column diode faults have no effect upon the other SMP's in a colum. Therefore a faulty diode only causes a bit error.

A need for checking on the validity of data received in response to a read SEM instruction was deemed necessary in order to keep a current check on the operation of a SEM. Incorporated into the design of the SEM for this purpose is a Matrix Return Level(MRL).

The MRL signal is generated in the SEM and is sent to the PC's on a separate pair of leads dedicated to a given SEM. A MRL response indicates that one word of a given matrix has been accessed. This information in conjunction with a check in the PC's that only one Control Word Select AC driver card has been activated, insures that only one word of the 256 possible matrix words has been interrogated.

Other than the failure of the simple power to the SEM, the complete loss of a SEM is minimized by power decoupling networks incorporated on each PWC. Losses occurring on a printed wiring card basis (loss of one card) can result in the loss of four words of the SEM (loss of four drivers) or the loss of two SMP columns (loss of two column amplifiers).

Failures of single components in the remaining SEm circuitry can cause at maximum, either the loss of a SEM word or column.

Since SMP's are primarily under the influence of unpredictable contact states, the prediction of a SEM response is impossible. Only in special cases will it be possible to predict a SMP response because of some manual control or intervention.

Detection of faults in the SEM will therefore depend completely upon periodic maintenance routining. Return data and MRL signal responses will be analysed to determine when faults occur.

Since it is highly improbable that all contacts of a given SEM or even a given SEM word are closed (Logical "ZERO" output), the presence of all "ZEROS" indicates that a failure is probable.

Faulty matrix response patterns will enable a software diagnostic maintenance program to isolate a fault to a specific printed wiring card. Further isolation of a failure below a card level is unnecessary since the card must be replaced anyway.

Table 1 lists the nine possible fault patterns which can occur in an SEM. Each fault, assuming that only single faults will occur, has a recognizable fault pattern associated with it. Note that faults which occur on a package type 37 can occur on any one of 16 cards. While faults on package type 39 can occur on any of four cards. Package type 38 only appears once in an SEM and therefore affects only one card.

Isolating a given fault for package types 37 and 38 depends upon which bit position or word was affected.

PERIPHERAL CONTROL UNIT (PCU)

Figure 25:
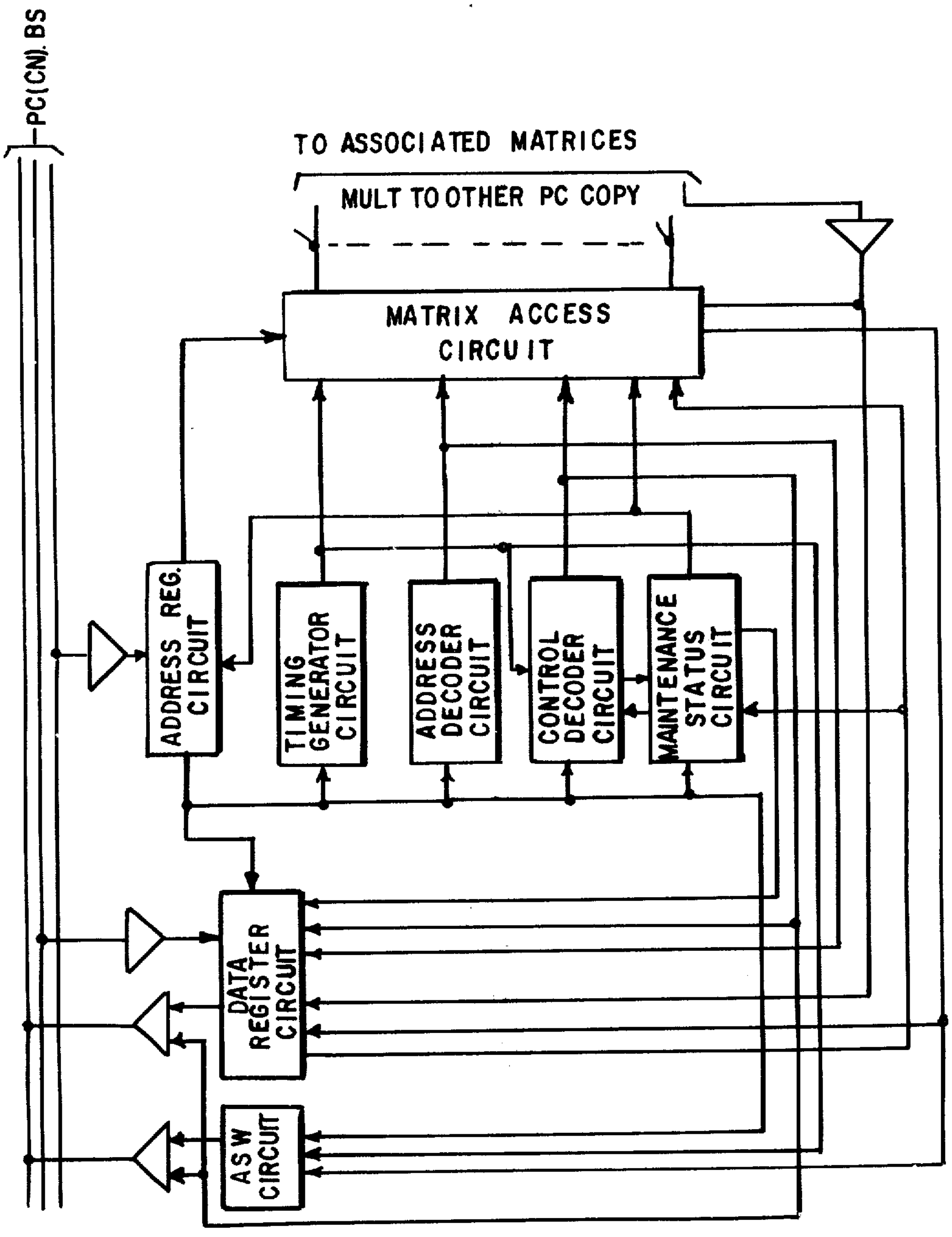
FIG. 25 is a block diagram of a peripheral controller.

Referring to FIG. 2, one pair of Peripheral Controllers PC0 and PC1) is associated with each Peripheral Unit PU0 ). Each Peripheral controller (PC) communicates with the Central Processor (CP) over its own Peripheral Control Bus. Controller PC0 communicates via PC0.BS and Controller PC1 communicates via PC1.BS (FIG. 25).

Within a Peripheral Unit, both Peripheral Controllers PC0 or PC1 are capable of the following functions:

a. Identify its own address.

b. Store the address and data sent over the bus PC(CN).BS.

c. Decode the address field of the instruction.

d. Decode the operation field of the instruction.

e. Return the address "echo" to the CP over its bus PC(CN).RB.

f. Access the Matrix specified in the address.

g. Acess its own internal hardware.

h. Store data received from an acessed Matrix.

i. Send the stored data from an accessed Matrix back to the CP over its bus PC(CN).RB.

Return the state of accessed controller PC hardware back to the CP over its bus PC(CN).RB.

k. Write data stored in its data register into an accessed Control Matrix or Hybrid Matrix.

1. Write data into its internal hardware.

m. Return a data "echo" over its PC(CN).RB on write instructions.

n. Make checks on its own operations, and if passed, return an all Seems Well (ASW) Signal with address "echo," data, or data "echo."

o. Controls its ability of accessing its Matrices by monitoring the state of its Active Unit flip-flop UAF.

p. Monitors its trouble flip-flop TBF, and, if set, ceases all communication with the CP and its Matrices under Normal mode instructions.

Independent of the state of its active unit flip-flop UAF, both Controllers PC20, PC1 perform all of the previously mentioned functions, with the exception that only the copy whose flip-flop UAF is set, i.e. UAF = 1 can access its Matrices to either write into Matrix or read out a word in a Matrix. The data read out will be loaded into both PC copies; therefore, the flip-flop UAF in a Controller PC determines only if that copy will address its Matrices and does not impair its internal functions.

PERIPHERAL CONTROL CIRCUITS

In order to perform its previously stated functions a PC consists of an Address Register Circuit ARC, and Address Decoder Circuit ADC, a Dara Register Circuit DRC, a Control Decoder Circuit CDC, a Matrix Access Circuit MXC, a Maintenance Status Circuit MSC, and All Seems Well Circuit ASW and a Timing Generator Circuit TGC.

The Address Decoder Circuit decodes the four Matrix No. Bits, PC(CN).ARB24-B27, and the four Word No. Bits, PC(CN).AR.B28-B31, stored in the Address Register into one out of sixteen Matrix Select Levels, (MSL00-MSL15), and one of sixteen Word Select Levels, (WSL00WSL15).

The Data Register Circuit DRC controls the time and the source of data that will be loaded in the Data Register (PC(CN).DR). The sources from which data originate to be loaded into the register DR are:

a. CP on "Write" instructions.

b. The Matrices on "Read" instructions.

The time at which the register Dr is loaded is dependent upon the source of data and is related to the time at which the address appeared on the bus PC(CN).AB.

The peripheral Control Data Register PC(CN).DR is a 32 bit register that accepts data from the Data Bus and stores this data until another request from the CP changes the contents of the Data Register. The Data Register DRC always contains the data from the most recent instruction executed by the PC. The outputs of the Register DRC are used to return information over the bus PC(CN).RB or to change the state of a writable Matrix word.

The register DRC also determines the time and the source of data which is to be placed on the bus PC(CN).RB. In addition, the All Seems Well (ASW)

signal, PC(CN).RB.B32, is also placed upon the Return Bus simultaneously.

The sources of the data to be placed on the Return Bus are:

a. The contents of the Data Register DRC.

b. The contents of the Address Register ARC.

c. The unit number decoder output of the Timing Generator Circuit TGC.

d. The state of addressed PC hardware.

The second ASW signal is generated only if the wired circuit checks of the Matrix Access Circuit MXC show a normal circuit operation.

The control Decoder Circuit CDC decodes the contents of the Address Register operation field into distinct, timed control levels which are inputs to the Register DRC, Matrix Access Circuit MXC, and the Maintenance Status Circuit MSC. Each control level, in turn, activates a particular function in these circuits. Inputs used in conjunction with the contents of the Register ARC in generating these control levels are the state of the flip-flop UAF and TBF and timing levels from the Timing Generator Circuit TGC and a timing level from the Register ARC.

When an instruction is received to read or write a word, the Matrix Access Circuit MXC outpulses the required levels to the Matrix words. In addition, by monitoring its AC cable drivers, verifies that only one of 256 words was addressed. This verification is used to generate the ASW level placed on the bus PC(CN).RB in the follow through cycle, upon execution of Normal mode instructions.

The Maintenance Status Circuit MSC consists of five Maintenance flip-flops which are required for diagnostic purposes, for determining the Active Standby status, and for removing a faulty copy from service. In addition, the circuit MSC contains the logic necessary for setting and resetting these flip-flops via bus PC(CN).DB.

The Timing Generator Circuit TGC provides the timing sequence for all operations within the controller PC and provides strobes for address and data to the processor CP and between the Matrices and controller PC. The generator TGC generates nine sequential clock pulse levels (CP0L-CP8L of varying durations with an overall period 5.5 μs. The generator TGC is triggered when the unit number in the register AR is that of the addressed unit and B10 and B11, and B12B14 of the register AR are in the correct one out of two and one out of three codes.

The hardware of the Peripheral Control Units will be implemented with SUHL integrated circuits. The following PWB types are to be used:

| Type Number | Description |
|---|---|
| 01 | 2 Input Nand |
| 02 | 4 Input Nand |
| 04 | 4 Input Nand Driver |
| 08 | S-R Flip-Flop |
| 11 | Miscellaneous Timer |
| 12 | AC Bus Driver |
| 13 | AC Bus Driver |
| 14 | AC Bus Receiver |
| 15 | AC Bus Receiver |
| 30 | Address Delay Line |
| 22 | Data Register |
| 49 | Miscellaneous Circuits |

Power supplies for the unit PCU may consist of both +5V and +24V DC to DC converter types.

THE ADDRESS REGISTER CIRCUIT (ARC) - DETAILED DESCRIPTION

The function of the Address Register Circuit ARC is to load every address appearing on the bus PC(CN).AB into its PC(CN).AR (Address Register). The appearance of a "one" in PC(CN).AB.B09, indicates an address is present on the address bus; therefore, B09 becoming true activates the circuit ARC which loads the address into its register AR. Once an address is loaded it remains in the register until another address appears on the bus, and the cycle repeats.

Figure 26:
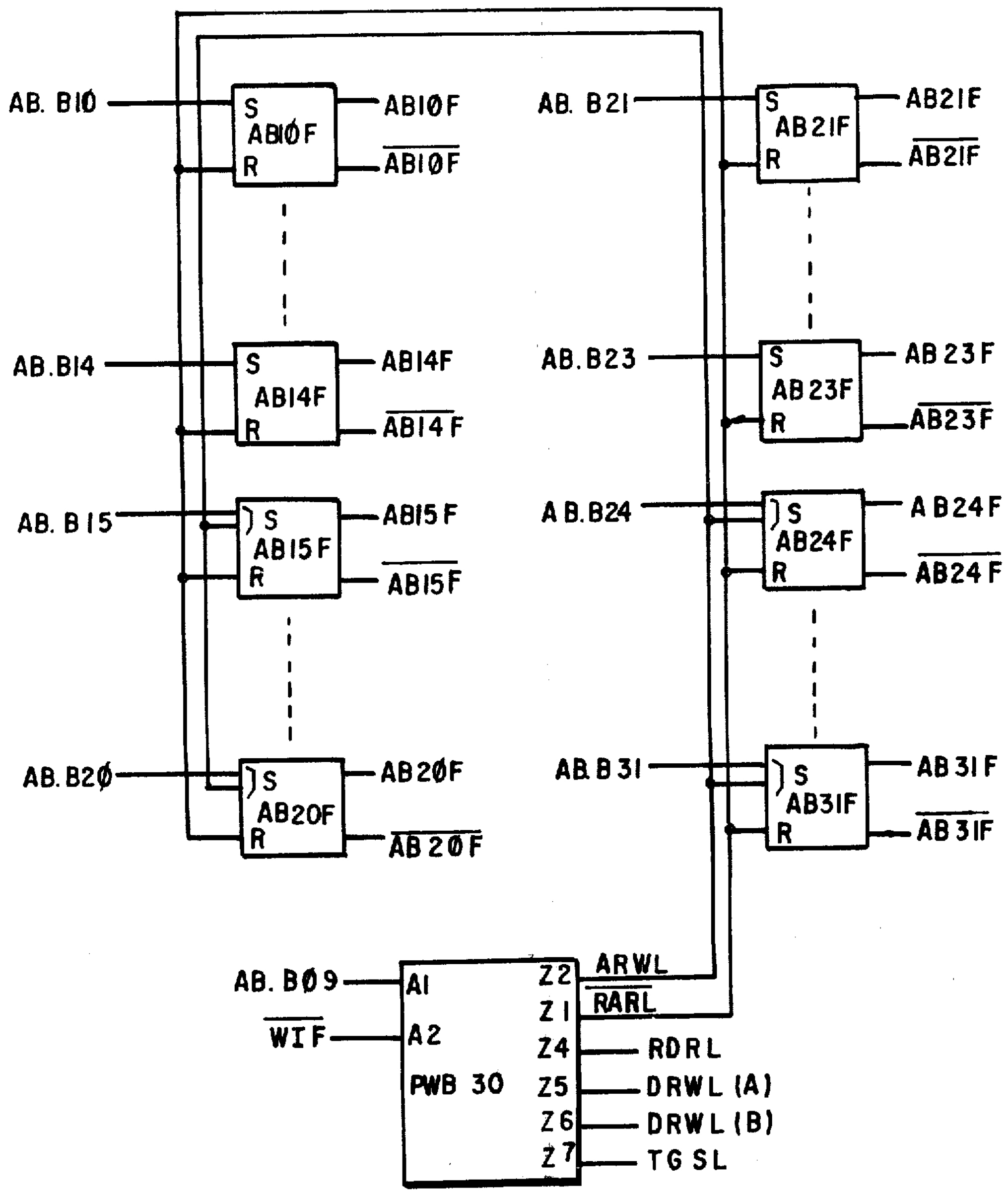
FIG. 26 is a block diagram of an address register circuit of the peripheral controller of FIG. 25.

Referring to FIG. 26, the register ARC consists of two components, which are the address delay line, PWB type 30, and the 22 but S-R Flip-Flop address register (AB10F-AB31F).

The address delay line has two inputs A1 and A2 and seven outputs Z1 through Z7. The input to A1 is the DO signal, B09 of the address bus. A logic "one" at input A1 starts a sequential generation of outputs on Z1 through Z7. Output Z1 is a "zero" going pulse of 112 ns (nom.) duration occurring 60 ns (nom.) after the appearance of A1. Output Z1 is used to reset all of the AR flip-flops. Output Z2 is the Address Register Window Level (ARWL) which is a logic "one" pulse immediately following output Z1 with 212 ns (nom.) duration. Output Z2 is used as an address window to AB15F-AB20f and AB24F-AB31F of the register AR to provide noise immunity from the address bus by allowing these flip-flops to be set only during the 212 ns window interval. As a means of checking the operation of the window, i.e. output Z2 is not always "one"; input A2 is used to inhibit the output Z2. When input A2 is at "zero" logic level, output Z2 will always remain at "zero" also. An address loaded from the bus under this condition will contain all "zeros" in bits 15 through 20 and 24 through 31 of the AR, verifying that a stuck at "one" fault on output Z2 does not exist.

Outputs Z4 and Z5 are Reset Data Register Level (RDRL) and Data Register Window Level (DRWL), respectively. These outputs are used to reset and provide a window to the data register. Since data transmitted to the PC copy is delayed 500 ns(nom) from the address, outputs Z4 and Z5 are delayed 500 ns (nom.) from Z1 and Z2 respectively. Input A2 being "zero" also inhibits the data window outputs Z5 and Z6, as a means of checking the stuck at "one" fault of the data window.

The address register AR consists of 22 S-R Flip-Flops implemented with PWB's, type 08. Logic "zero" levels at the Reset (R) inputs reset the flip-flops. For bits 10-14 and 21-23 of the register AR, a single logic "one" input sets the flip-flops. Bits 12-20 and 24-31 require that both inputs be "one" to set the flip-flops.

Both the true and complement outputs of the AR flip-flops are brought out to be used as inputs to the other circuits of the controller PC. These outputs are AB10f and AB10f through AB 31F and AB31F.

THE ADDRESS DECODER CIRCUIT (ADC) - DETAILED DESCRIPTION

The function of the Address Decoder Circuit ADC is to decode Bits 24-27 of the address register ARC into one out of 16 logic levels and to decode Bits 28-31 into one out of 16 logic levels. The 32 output levels are used in the Matrix Access Circuit MXC to select one of 256 Matrix words or are relayed back to the CP via the bus PC(CN).RB as a means of verification of the circuits ADC operation.

Figure 27:
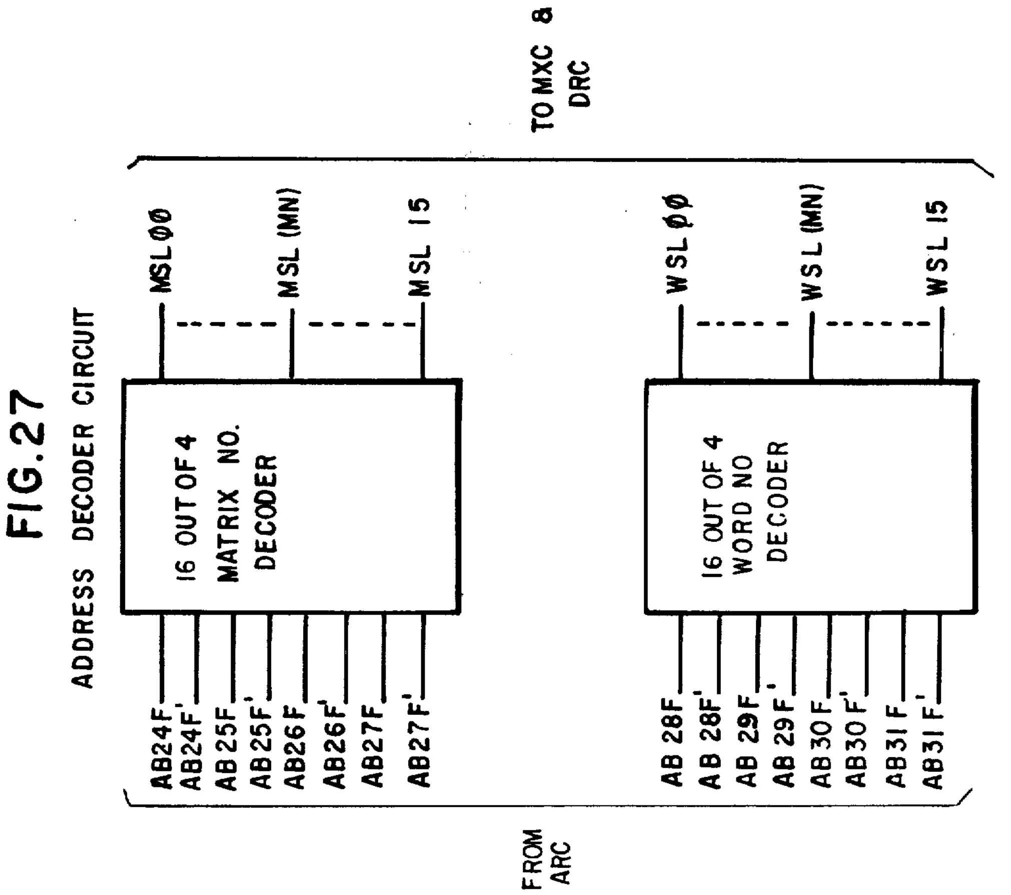
FIG. 27 is a block diagram of an address decoder circuit of the peripheral controller.

Referring to FIG. 27, the inputs to the circuit ADC are both the true and complement outputs of the Address Register Circuit ARC. The circuit ADC is strictly a level circuit employing conventional combination logic to perform its function. The 32 output levels are grouped into two groups of sixteen each.

One group is named Matrix-Select Levels (MSL) and are numbered MSL00, MSL01, . . . . . ., WSL15. These leads are used to select which word in a given Matrix will be accessed by the circuit MXC.

THE DATA REGISTER AND ALL SEEMS WELL CIRCUITS (DRC) - DETAILED DESCRIPTION

The function of the Data Register Circuit DRC is to act as a 32 bit input and output for data between CP and Matrices and for data from the Matrices and the CP. The circuit DRC also acts as an output port from the register AR, the circuits ADC, MXC, and MSC to the Return Bus (PC(CN).RB).

The All Seems Well Circuit ASWC generates two signals during the two BOT instruction cycle. The first All Seems Well signal verifies that the receipt of the address was in the proper code. The second signal verifies that the monitored circuits in the controller PC have functioned properly. The All Seems Well signal always accompanies the data placed on the Return Bus by the register circuit DRC.

Figure 28:
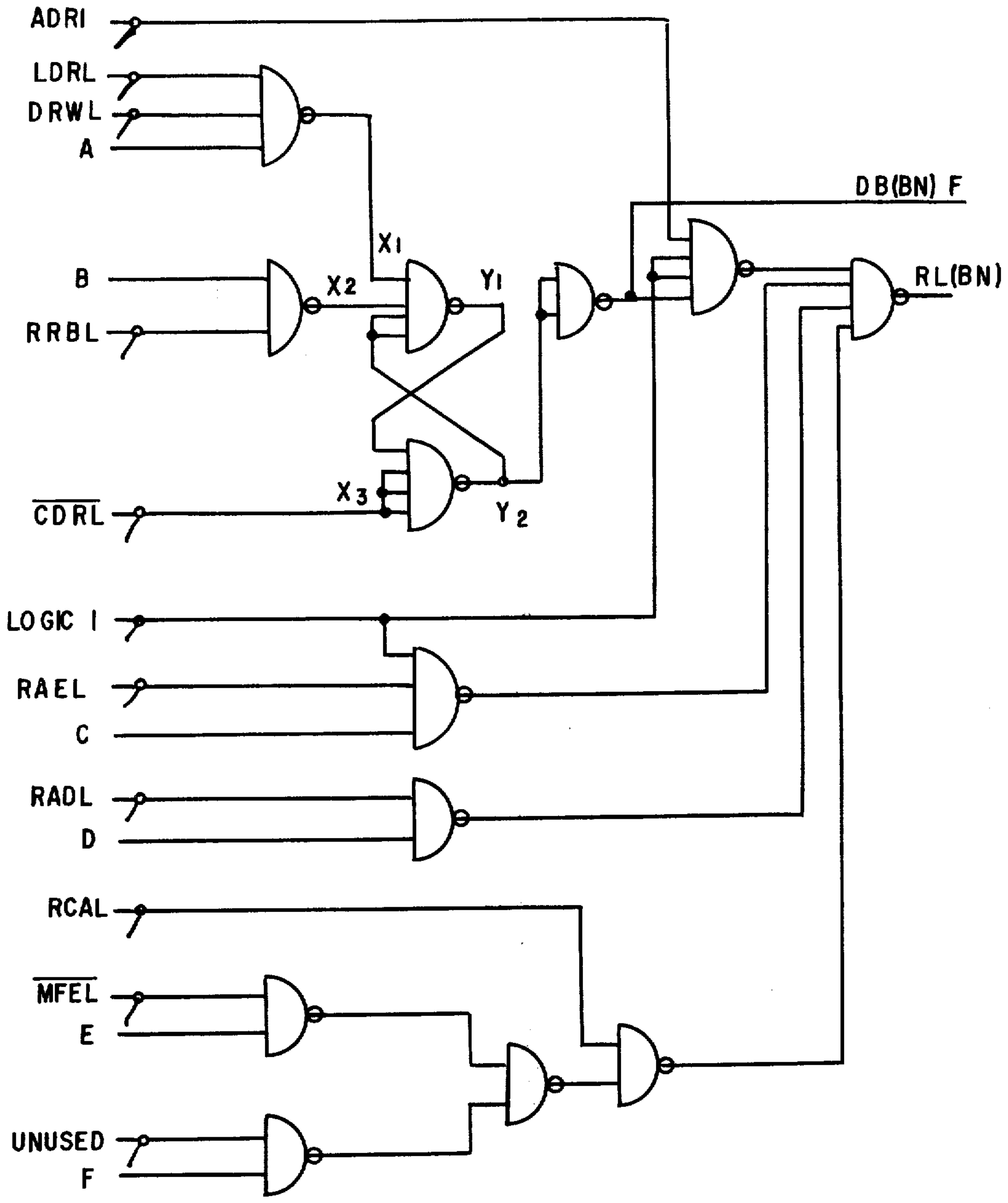
FIG. 28 is a schematic representation of a data register circuit of the peripheral controller.

Referring to FIG. 28, the inputs to the Data Register Circuit DRC are of two types:

a. Control levels which are multiplied to all 32 bit positions of the register.

b. Data levels which feed individual bit positions of the register.

Under normal conditions, i.e. the flip-flop TBF being reset, the control levels are:

a. CDRL (Clear Data Register Level) - Normally 0; the register resets when CDRL = 1.

b. RRBL (Read Return Bus Level) - When RRBL = 1, the register accepts the return data from the Matrices (points B).

c. LDRL (Load Data Register Level) - When LDRL = 1, the register should accept data from the data bus (points A) subject to strobe by DRWL.

d. DRWL (Data Register Window Level) - This pulse occurs in response to any "DO" signal on PC.AB.

e. ADRL (Address Data Register Level) - When ADRL =1, the contents of the register DR are gated out onto lead RL (inputs to cable drivers of return bus).

f. RAEL (Return Address Echo Level) -When RAEL =1, the address "echo," which appears on points C, (FIG. 29) is gated onto lead RL.

g. RADL (Read Address Decoder Level) - When RADL = 1, the contents of the address decoder, appearing on points D, (FIG. 29) and gated onto lead RL.

h. RCAL (Read Control Address Level) - RCAL = 1 during Control mode Read instructions.

i. MFEL (Maintenance Flip-Flop Enable Level) - Normally =0. Equals 1 when address field contains (W) mod = 3 or 5. When RCAL· MFEL = 1, the status of flip-flops in MSC, MXC, and TGC, appearing on points E, are gated onto lead RL.

The data level inputs to the register DRC are the outputs of the PC(CN).DB cable receivers, DB.B00-DB.B31, the outputs of the return bus from the Matrices, (FIG. 41) termed Peripheral Unit Return Bus (PU.RB.B00-B31), and internal PC hardware states.

The internal PC hardware states are data to be placed on the PC(CN).RB and consist of:

a. Contents of the register AR of the circuit ARC.

b. Unit Responding Level (Plug-in option per PC copy).

c. MSL00-MSL15 outputs of the circuit ADC.

d. WSL00-WSL15 outputs of the circuit ADC.

e. The check circuit flip-flop states of the circuit MXC.

f. The state of the maintenance flip-flops of the circuit MSC. The Data Register Circuit inputs are listed in Table III.

TABLE III

DATA REGISTER CIRCUIT INPUTS

| BN | A | B | C | D | E | F |
|---|---|---|---|---|---|---|
| 00 | PC.DB.B00 | PU.RB.B00 | AB16F | MSL00 | M30F | 0 |
| 01 | B01 | B01 | AB17F | MSL01 | M20F | 0 |
| 02 | B02 | B02 | AB18F | MSL02 | M10F | 0 |
| 03 | B03 | B03 | AB19F | MSL03 | M00F | 0 |
| 04 | B04 | B04 | AB20F | MSL04 | W30F | 0 |
| 05 | B05 | B05 | AB21F | MSL05 | W20F | 0 |
| 06 | B06 | B06 | AB22F | MSL06 | W10F | 0 |
| 07 | B07 | B07 | AB23F | MSL07 | W00F | 0 |
| 08 | B08 | B08 | AB24F | MSL08 | M31F | 0 |
| 09 | B09 | B09 | AB25F | MSL09 | M21F | 0 |
| 10 | B10 | B10 | AB26F | MSL10 | M11F | 0 |
| 11 | B11 | B11 | AB27F | MSL11 | M01F | 0 |
| 12 | B12 | B12 | AB28F | MSL12 | W31F | 0 |
| 13 | B13 | B13 | AB29F | MSL13 | W21F | 0 |
| 14 | B14 | B14 | AB30F | MSL14 | W11F | 0 |
| 15 | B15 | B15 | AB31F | MSL15 | W01F | 0 |
| 16 | B16 | B16 | AB12F | WSL00 | 1 | 0 |
| 17 | B17 | B17 | AB13F | WSL01 | 1 | 0 |
| 18 | B18 | B18 | AB14F | WSL02 | 1 | 0 |
| 19 | B19 | B19 | U0L | WSL03 | 1 | 0 |
| 20 | B20 | B20 | U1L | WSL04 | PWF | 0 |
| 21 | B21 | B21 | U2L | WSL05 | PWF | 0 |
| 22 | B22 | B22 | U3L | WSL06 | WIF | 0 |
| 23 | B23 | B23 | U4L | WSL07 | WIF | 0 |
| 24 | B24 | B24 | U5L | WSL08 | RTF | 0 |
| 25 | B25 | B25 | U6L | WSL09 | RTF | 0 |
| 26 | B26 | B26 | U7L | WSL10 | RDF | 0 |
| 27 | B27 | B27 | AB10F | WSL11 | RDF | 0 |
| 28 | B28 | B28 | AB11F | WSL12 | UAF | 0 |
| 29 | B29 | B29 | 1 | WSL13 | UAF | 0 |
| 30 | B30 | B30 | 1 | WSL14 | TBF | 0 |
| 31 | B31 | B31 | 1 | WSL15 | TBF | 0 |

The outputs of the Data Register Circuit DRC consist of data in two groups of 32 bits each. One set, the outputs of the flip-flops of the register DR, termed DB00F through DB31F, are the data to be written into a Matrix Word. These outputs feed the circuit MXC exclusively.

The other set of outputs of the circuit DRC are used as inputs to the PC(CN).RB cable drivers as shown in TABLE III. Both data in the register DR and the internal hardware states are loaded onto the PC(CN).RB via these 32 DRC outputs termed Return Levels (RL00-RL31). Note that the RB cable drivers are gated on twice during each instruction cycle: RBSL = CPIL + CP7L.

The Boolean equations for any one bit of the 32 bit DR, DB(BN)F, where BN = Bit Number, are that of a S-R Flip-Flop:

$$Y_1 = \overline{X}_1 + \overline{X}_2 + \overline{y}_2$$

$$Y_2 = \overline{X}_3 + \overline{y}_1$$

where:

$$X_1 = \overline{LDRL \cdot DRWL \cdot A}$$

$$X_2 = \overline{RRBL \cdot B}$$

$$X_3 = CDRL$$

$$Y_2 = \overline{DB(BN)F}$$

From the equations it is apparent that any DR bit number (BN) can be set to the state determined by A or B given in the TABLE III. Also, the DR bit will be reset when CDRL equals logic "zero." The Boolean relation for any one Return Level RL(BN) is a combinational function of its input variables as follows:

$$RL(BN) = (ADRL.DB(BN)F) + (RAEL.C) + (RADL \cdot D) + (RCAL \cdot MFEL \cdot E)$$

From the above equations, data is loaded onto the PC(CN).RB from the following four sources:

a. The contents of the register DR (Inputs A and B).
b. The contents of the register AR (Input C).
c. The decoded address from the circuit ADC (Input D).
d. The state of the maintenance flips of the circuit MSC, the check circuit flip-flops of circuit MXC and the PWF of the circuit TGC (Input E).

Both functions of the circuit DRC, loading the register DR and loading data onto the return bus, are timed operations, the source of the timing levels being the Timing Generator Circuit TGC and the Address Register Circuit ARC.

The register DR can be loaded during two different timing levels from two distinct sources. When data from the PC(CN).DB is to be loaded into the register DR, the action occurs during the Data Register Window Level (DRWL) interval generated in the circuit ARC. Data from the Matrices are loaded during the interval when RRBL is "one," i.e. during the CP5L timing level output of the timing generator TGC. The register DR is always reset during the RDRL interval generated in the circuit ARC regardless of which source is to load the register DR.

Information strobed out of the controllers PC onto the bus RB occurs during the CP1L and CP7L timing level outpus of the circuit TGC. During CP1L the only data placed on the bus RB is the contents of the register AR, which is the address "echo" sent back to the CP. During CP7L any one of the four sets of data may be strobed onto the bus RB, i.e. the contents of the register AR, the contents of the register DR, the decoded address of the circuit ADC, or the maintenance and check flip-flop's states.

ALL SEEMS WELL CIRCUIT ASWC

Figure 29:
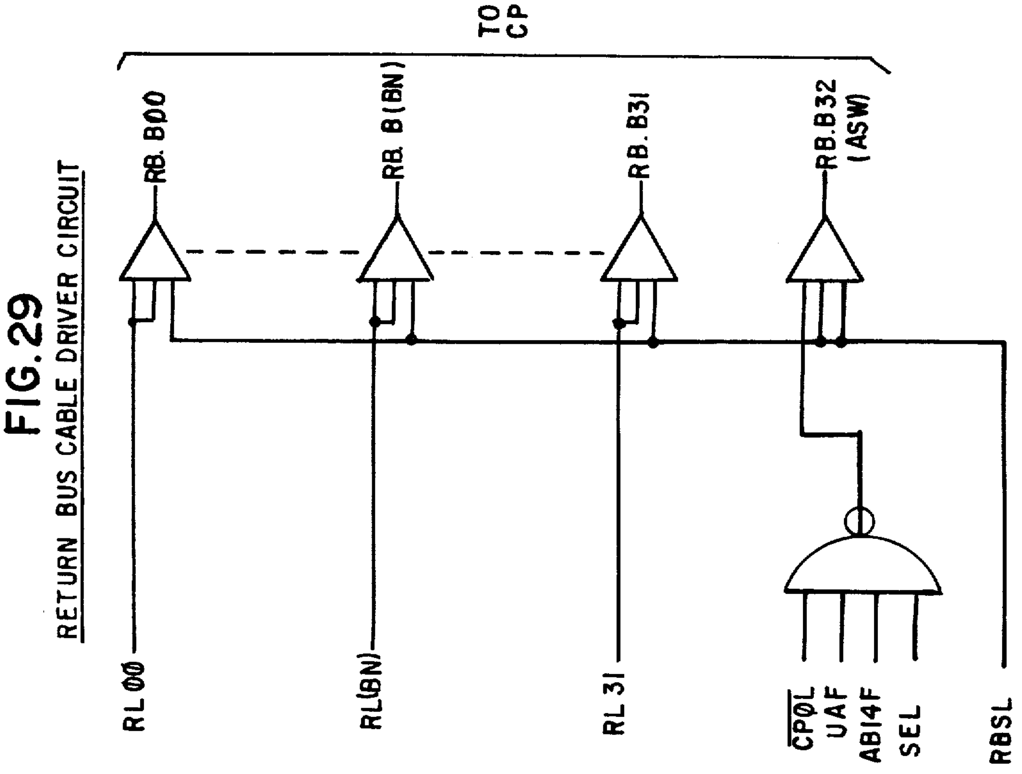
FIG. 29 is a schematic circuit of a return bus cable driver circuit.

Referring to FIG. 29, the function of the All Seems Well Circuit is to generate the All Seems Well signal (ASW), PC(CN).RB.B32, required by the CP. It is included with the circuit DRC because it always accompanies the data strobed out of the circuit DRC.

Two ASW signals are required for checking purposes by the CP. The first occurs during Cp1L and accompanies the address "echo+ to the CP. The presence of this first signal indicates that specific fields of the address in the register AR are in the correct code. The requirements of this predetermined code are:

a. Read/Write Control, bits 10 and 11, are in a one out of two code.
b. Mode control, bits 12–14, are in a one out of three code.
c. Unit Number, bits 21–23, equals the unit number of the PC (a wiring option in each PC).

The above requirements must also be met to start the Timing Generator; therefore, a generator TGC output, in particular CP0L, is used as the first ASW.

THe second ASW occurs during CP7L and contains further information only when Matrices are involved, i.e. Normal mode instructions. Under these conditions, the ASW being "one" indicates that one and only one word out of 256 matrix words was acessed by the circuit MXC. An output from the circuit MXC, Select Error Level (SEL) being logically "one", indicates a failure to select only one word. SEL being equal to 1 inhibits the second ASW.

The Boolean equation governing the ASW signal is:

$$ASW = PC(CN).RB.B32 = RBSL(CP\emptyset L + \overline{UAF} + \overline{AB14F} + \overline{SEL})$$

From the equation, the signal ASW always occurs during CP0L, for Special and Control Mode instructions the signal ASW always occurs during CP7L, and for Normal mode instructions, when UAF = 1, occurs only when the 1 out of 256 checks of the circuit MXC is passed.

THE CONTROL DECODER CIRCUIT CDC - DETAILED DESCRIPTION

The function of the Control Decoder Circuit CDC is to generate control levels which are used in the circuits DRC, MXC, and MSC in the execution of an instruction. The six instructions of the PU Instruction Set are decoded by the decoder CDC into one control level or a sequential series of control levels. These levels activate the required circuits in the PC that must function in order to execute the requested instruction.

The decoder CDC also generates the strobe pulse RBSL for data from the register DRC which is to be sent to the CP via the bus PC(CN).RB. This strobe pulse is generated for all six instructions, regardless of the instruction type.

Figure 30:
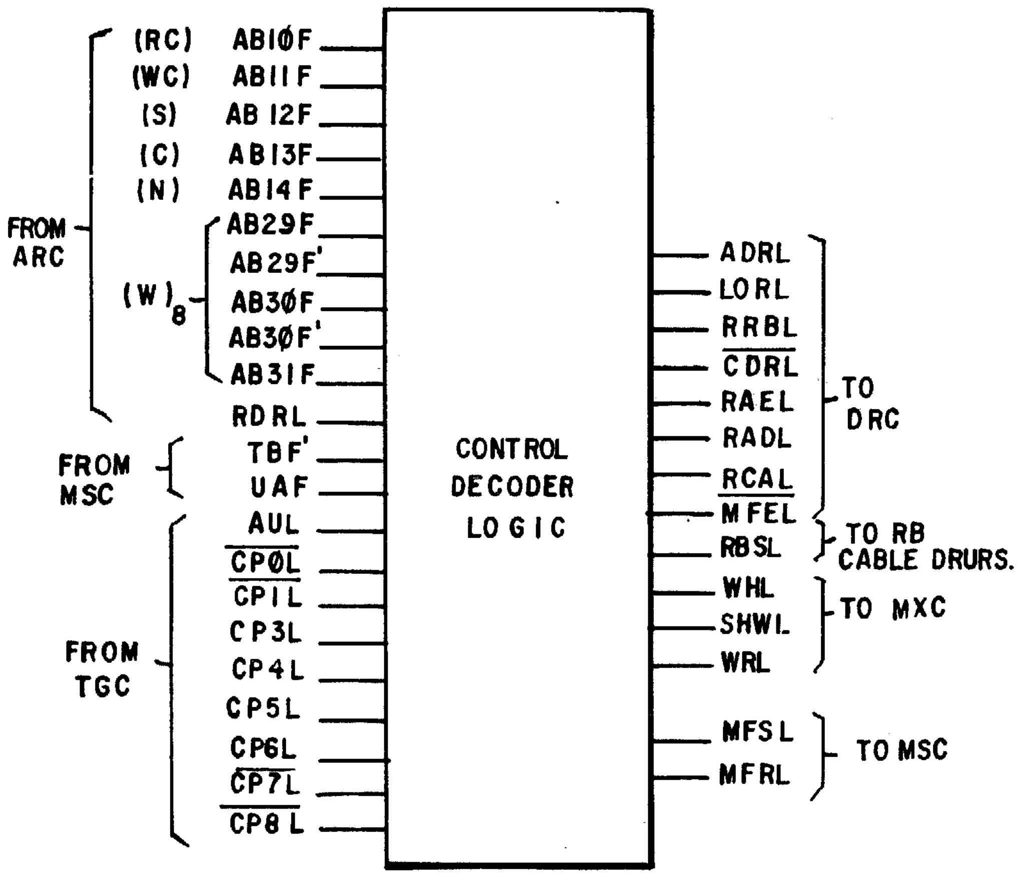
FIG. 30 is a block diagram of a control decoder circuit of the peripheral controller.
Figure 31:
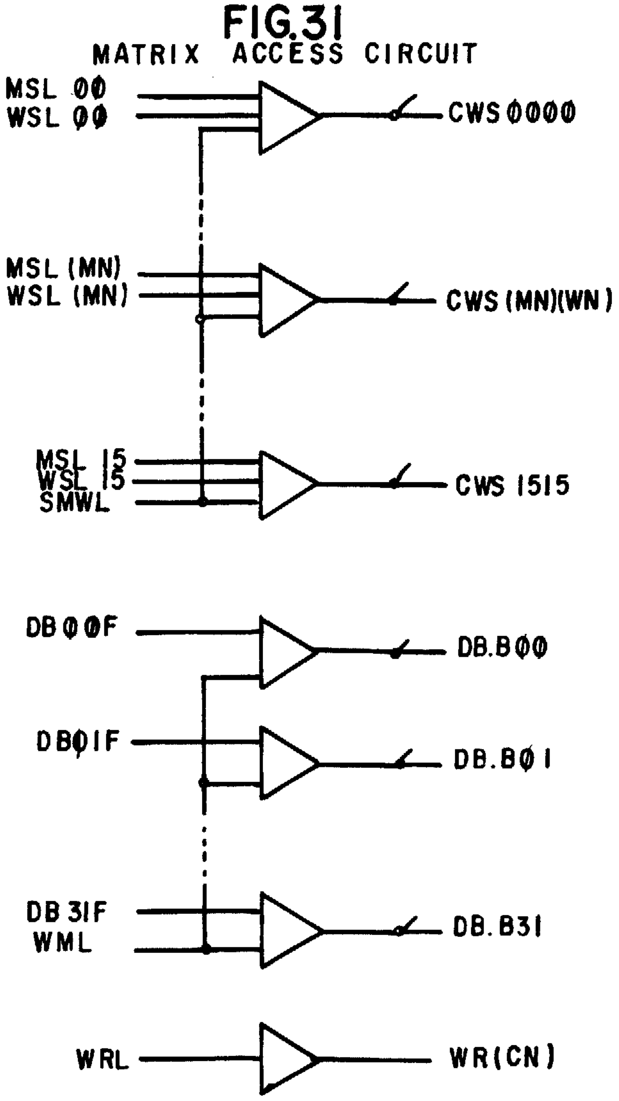

Referring to FIG. 30, the inputs to the decorder CDC are from the circuits ARC, MSC, and TGC. The inputs from the circuit ARC are the following levels of the register circuit ARC:

AB10F and AB11F - Read/Write bits
AB12F - AB14F - Mode bits
AB29F, $\overline{AB29F}$, AB3ØF
$\overline{AB3\emptyset F}$, and AB31F - Work No. bits
RDRL - Reset Data Register Level Inputs from the circuit MSC are the following maintenance flip-flop states:

$\overline{TBF}$ - The complement output of the Trouble Flip-flop.
UAF - The true output of the Active Unit Flip-flop.

Inputs to the decoder CDC from the generator TGC are the following signals:

CPØL
CP1L
CP3L
CP4L
CP5L
CP6L
CP7L
CP8L
AUL - (Addressed Unit Level) indicates that the instruction is to be executed by this PCU number.

Thirteen output levels of the decoder CDC are inputs to three other PC circuits as follows:

a. Address Data Register Level (ADRL) - an input to the register DRC which allows the contents of the register DR to be gated out to the return bus.

(RPU, WPU, WPUN, and RPUN (W) $\text{mod}_8 = 5$ instructions)

b. Load Data Register Level (LDRL) - an input to the DRC which allows data from the PC(CN).DB to be loaded into the DR.(WPU and WPUN (W) $\text{mod}_8 = 5$ instructions).

c. Read Return Bus Level (RRBL) - an input to the register DRC which allows data from matrix words to be loaded into the DR.(RPU instruction).

d. Clear Data Register Level (CDRL) - an input to the register DRC which precedes LDRL and RRBL for the purpose of resetting the register DR. (RPU, WPU, WPUN (W) $\text{mod}_8 = 5$ instructions).

e. Return Address Echo Level (RAEL) - an input to the register DRC which allows the register AR contents to be gated out to the return bus. (Appears during CP0L for all instructions and during CP6L for a RPUA instruction.)

f. Read Address Decoder Level (RADL) - an input to the register DRC which allows the decoded addresses of the circuit ADC to be gated out to the return bus. (RPUT instruction)

g. Read Control Address Level (RCAL) and Maintenance Flip-Flop Enable Level (MFEL) - used in conjunction to read out the state of the maintenance flip-flops of the circuit MSC, the check flip-flops of the circuit MXC, and the PWF of the generator TGC, onto the return bus. (RPUN (W) $\text{mod}_8 = 0, 1, 2, 4, 6,$ and 7 instructions.

h. Return Bus Strobe level (RBSL) - an input to the PC(CN).RB cable drivers used to strobe out data to the CP (all instructions).

i. Write Matrix Level (WML) - an input to the circuit MXC which allows data in the register DR to be strobed out on the PU.DB to the Matrices. (WPU instruction)

j. Select Matrix Word Level (SMWL) - an input to the circuit MXC which allows the output of the circuit ADC to be gated to a Matrix word. (RPU and WPU instructions)

k. Write Level (WRL) - an input to the circuit MXC which allows the WR(CN) level to be gated to all COM and HYM matrices. (WPU and RPU instructions)

l. Maintenance Flip-Flop Set Level (MFSL) and Maintenance Flip-Flop Reset Level (MFRL) - used in conjunction with data present on the PC(CN).DB to either set or reset the maintenance flip-flops in the circuit MSC. (WPUN (W) $\text{mod}_8 = 0, 1, 2, 4, 6,$ or 7 instructions)

The Boolean equations governing the operation of the decoder CDC are as follows:

a. ADRL = (AB13F.AB29F.$\overline{\text{AB30F}}$.AB31F + AB14F) CP6L b. LDRL = AUL.AB11F(AB–F + AB13F.AB29-F.$\overline{\text{AB30F}}$.AB31F)

c. RRBL = AB10F.AB14F.CP5L d. CDRL = RDRL.AUL(AB11F.AB13F.AB29-F.$\overline{\text{AB30F}}$.AB31F + AB14F)

e. RAEL = CP0L + AB11F.AB12F.CP6L f. RADL = AB10F.AB12F.CP6L g. RCAL = AB10F.AB13F.CP6L h. $\overline{\text{MFEL}}$ = ($\overline{\text{AB29F}}$.$\overline{\text{AB30F}}$ + AB29F.AB30F) + $\overline{\text{AB31F}}$ i. RBSL = (CP1L + CP7L).$\overline{\text{TBF}}$ j. SMWL = AB14F.UAF.$\overline{\text{TBF}}$.CP3L k. WML = AB11F.AB14F.UAF.$\overline{\text{TBF}}$.CP4L l. WRL = UAF.$\overline{\text{TBF}}$.AB14F(AB11F.CP3L + CP8L)

m. MFSL = MFRL = AB11F.AB13F.AUL

Note that the RBSL always appears after, by 250 ns (nom.), all other decoder CDC outputs. This masking insures that all data are placed on the PC(CN).RB simultaneously, by waiting an interval for a steady state to exist in the circuit DRC.

THE MATRIX ACCESS CIRCUIT MXC - DETAILED DESCRIPTION

Referring to FIGS. 31–36, the function of the Matrix Access Circuit MXC is to act as the PC Controller output port to the Matrices. The circuit MXC contains a set of 256 AC cable drivers for accessing the 256 Matrix words. In addition to the CWS (Control Word Select) cable drivers, there are 33 cable drivers for 32 bits of data and a Write, WR(CN), signal per PC in order for the PC to write into a COM or HYM matrix word.

An auxiliary function of the circuit MXC is to verify, that when the circuit is accessed, one and only one word of the 256 Matrix words was addressed. This function is achieved by the use of current sensor circuits and logic functions. The output of this check circuit is used to create the ASW signal used in the follow through cycle.

The MXC access circuit cable driver circuit is duplicated per PC, each circuit driving the same bus, (PU.BS - Peripheral Unit Bus System), in parallel. The combination of AC driver, in the PC copy, and AC receiver in the Matrix performs the logic "and" function of three driver inputs.

The outputs of the 289 Cable Drivers in the MXC are divided into two groups. One group is the 256 cable drivers which drive the Matrix words and is termed Controller Word Select (CWS) level group and are numbered as follows:

CWS0000, CSW0001, ...., CWS(MN)(WN), ...., CWS1515 where;

MN = Matrix Number (0-15)

WN = Word Number (0-15)

The ohter group of 33 cable drivers consist of 32 data bits termed Peripheral Unit Data Bus Bits, numbered (PU.DB.B00-PU.DB.B31). In addition there is the single Write signal bearing its PC copy number (CN), termed WR(CN), which feeds all COM and HYM Matrices.

The Boolean equation for any CWS(MN)(WN) is:

CWS(MN)(WN) = MSL(MN).WSL(WN).SMWL where MSL and WSL are outputs of the decoder ADC and SMWL is the strobed output of the decoder CDC.

The Boolean equation for any PU.DB.B(BN), where BN = Bit Number (00-31), is:

PU.DB.B(BN) = DB(BN)F. WML wherein DB(BN)F is output of the Data Register flip-flop and WML is the strobed output of the decoder CDC.

From equations *j*, *k*, and *l* in the description of the decoder CDC, a timing skew is apparent. Data is strobed out during CP4L, whereas the CWS level and WR level appear during CP3L. This delay of 750 ns (nom.) between the data and CWS level is required by the COM hardward. A second WR level is generated during CP8L in order to satisfy a maintenance requirement of the COM.

The decoder CDC outputs, SMWL, WML, and WRL determine which, if any, of the MXC cable drivers are to be selected, i.e. Read or Write a Matrix word.

CABLE RECEIVER CIRCUIT - DETAILED DESCRIPTION

Figure 41:
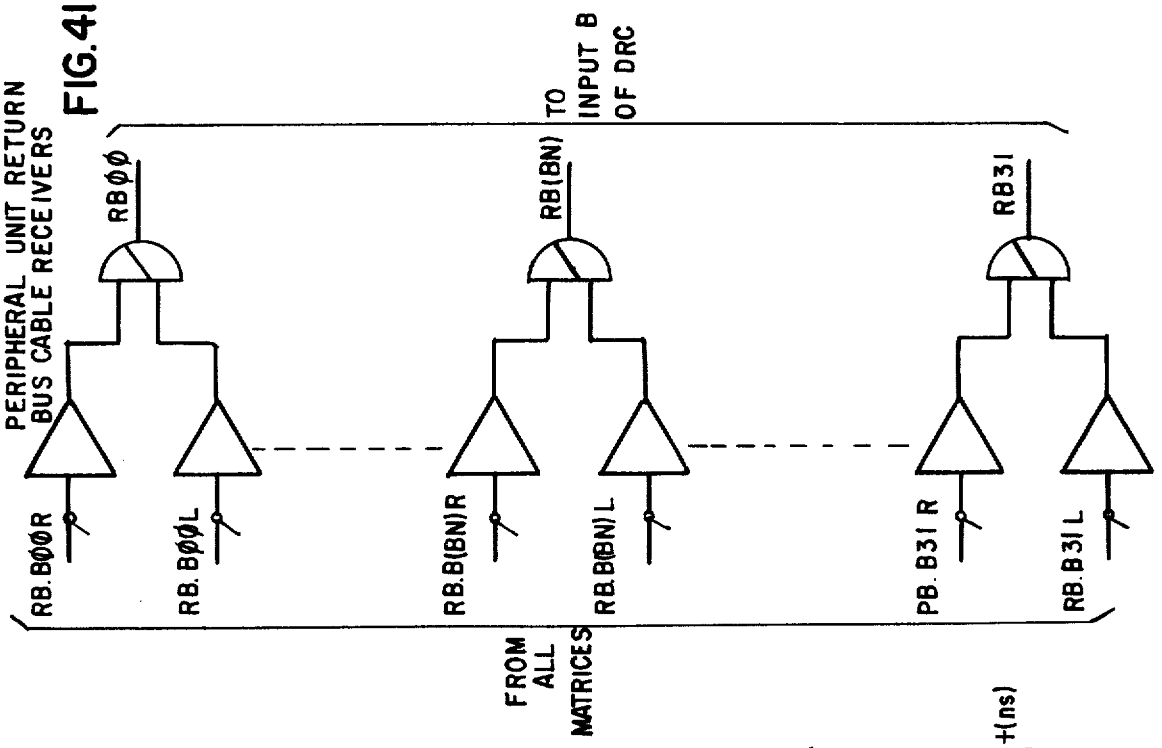
FIG. 41 is a schematic representation of the peripheral unit return bus cable receivers.

Referring to FIG. 41, since matrices may be situated physically on both sides of a PC copy and due to the restriction that an AC bus can feed a receiver from one direction, the return bus is split into two components. PU.RB.B00R-B31R will be associated with all matrices located to the right of the PC copy. PU.RB.B00L-B31L will be associated with all matrices located to the left of the PC copy.

The logic equation for any bit number (BN) of a return bus cable receiver pair output, Return Bit (BN)(RB(BN)), is:

$$RB(BN) = RB.B(BN)R + RB.B(BN)L$$

If matrices are not located on both sides of a particular PC copy, then only one set of cable receivers need be implemented.

ONE-OUT-OF-256 CHECK CIRCUITS

The verification that only one out of the 256 Matrix words is accessed when a WPU or RPU instruction is executed is achieved by combining the results of two separate tests. The first test verifies that only one out of sixteen words was accessed, and the second test verifies that only one out of the sixteen Matrices was accessed by this one word. Logically "Anding" these two results verifies that only one word in one matrix was accessed by the PC. THe construction of these tests is done by dividing the 256 outputs of the MXC into sixteen groups of sixteen each, each group representing a given word of all Matrices. THe first test is to logically check a one out of sixteen select of the cable driver boards in the PC copy. The second test is a one out of sixteen logic check on response signals from the sixteen matrices.

ONE-OUT-OF-SIXTEEN WORD NUMBER CHECK

The cable driver boards used in the circuit MXC of the controllers PC contain eight cable drivers and one current sensor circuit. The inputs to the cable drivers are wired to the ADC outputs such that a cable driver board contains a particular word number (WN) for the first eight Matrices and another cable driver board contains the same WN output for the remaining eight Matrices. These two cable driver boards have their current sensor outputs tied together constituting an output termed Test Word (WN) Level (TW(WN)L). See FIG. 9. There are sixteen groups of two cable driver boards, one for each word number; hence, there are sixteen TW(WN)L outputs numbered TW00L-TW15L.

A "zero" logic level on a $\overline{\text{TW(WN)L}}$ indicates that at least one of the 16 associated cable drivers has produced a logic "one" output. A normal response from the sixteen $\overline{\text{TWL}}$ outputs is only one "zero" level should appear when a WPU or RPU instruction is executed.

Figure 33:
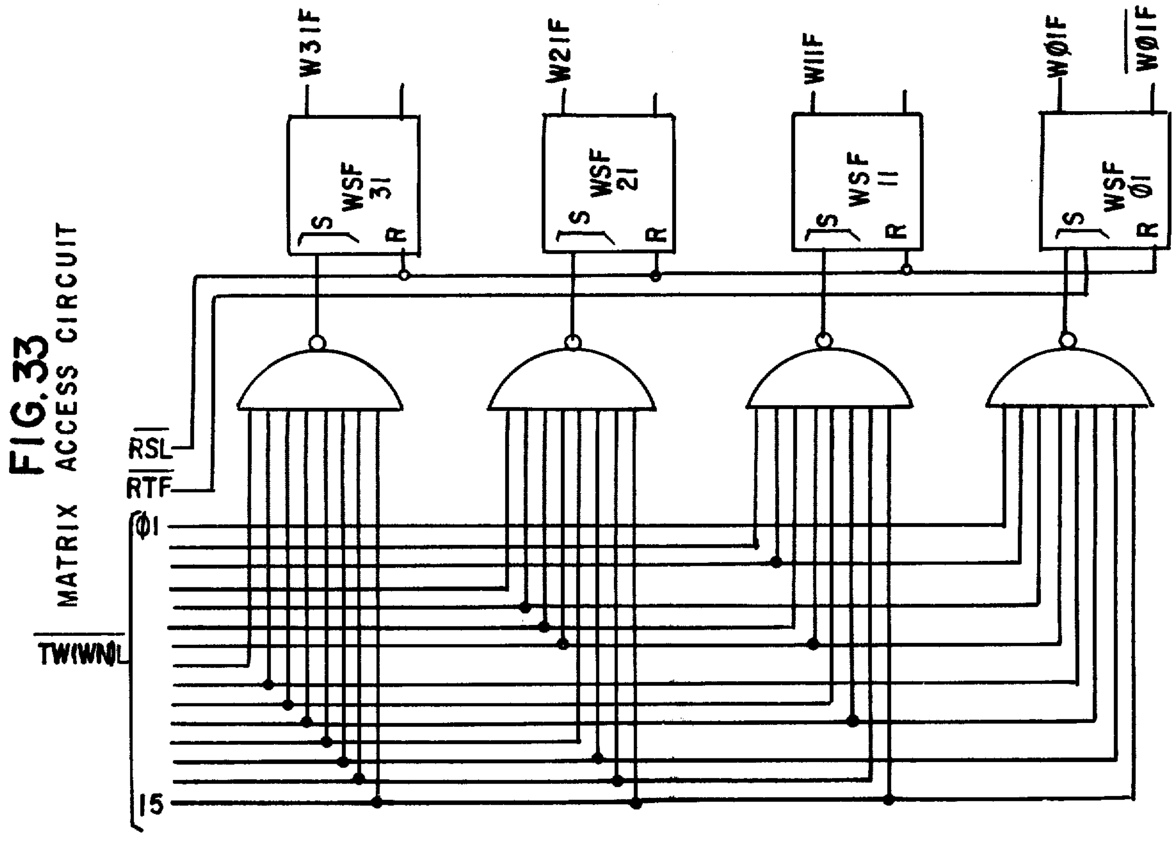
Figure 32:
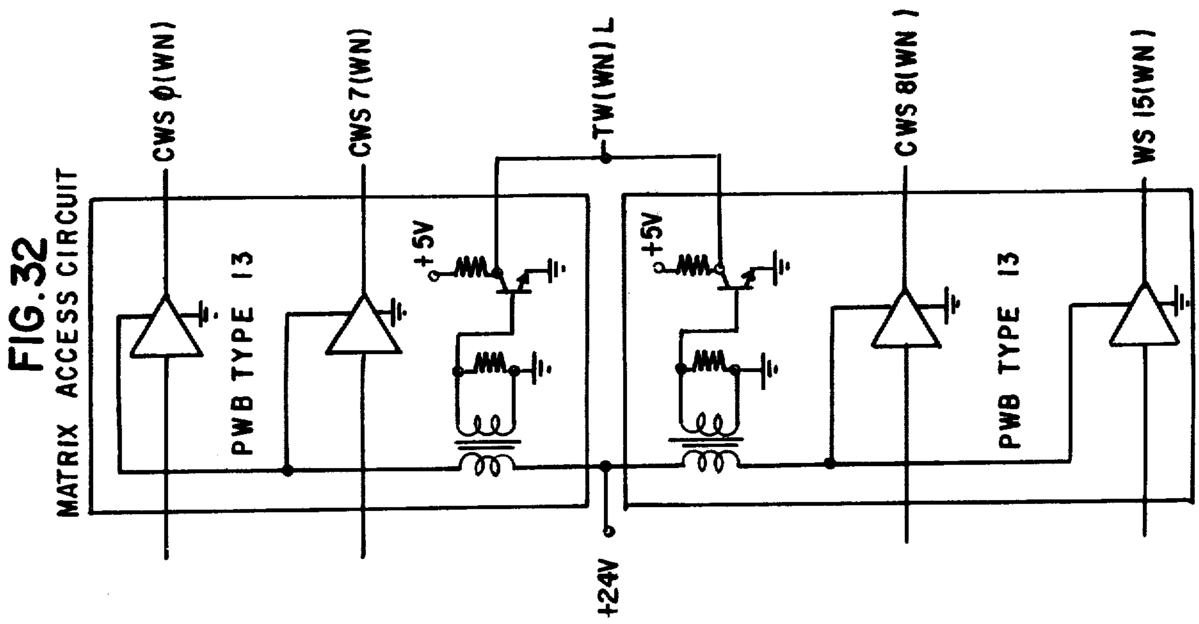
Figure 34:
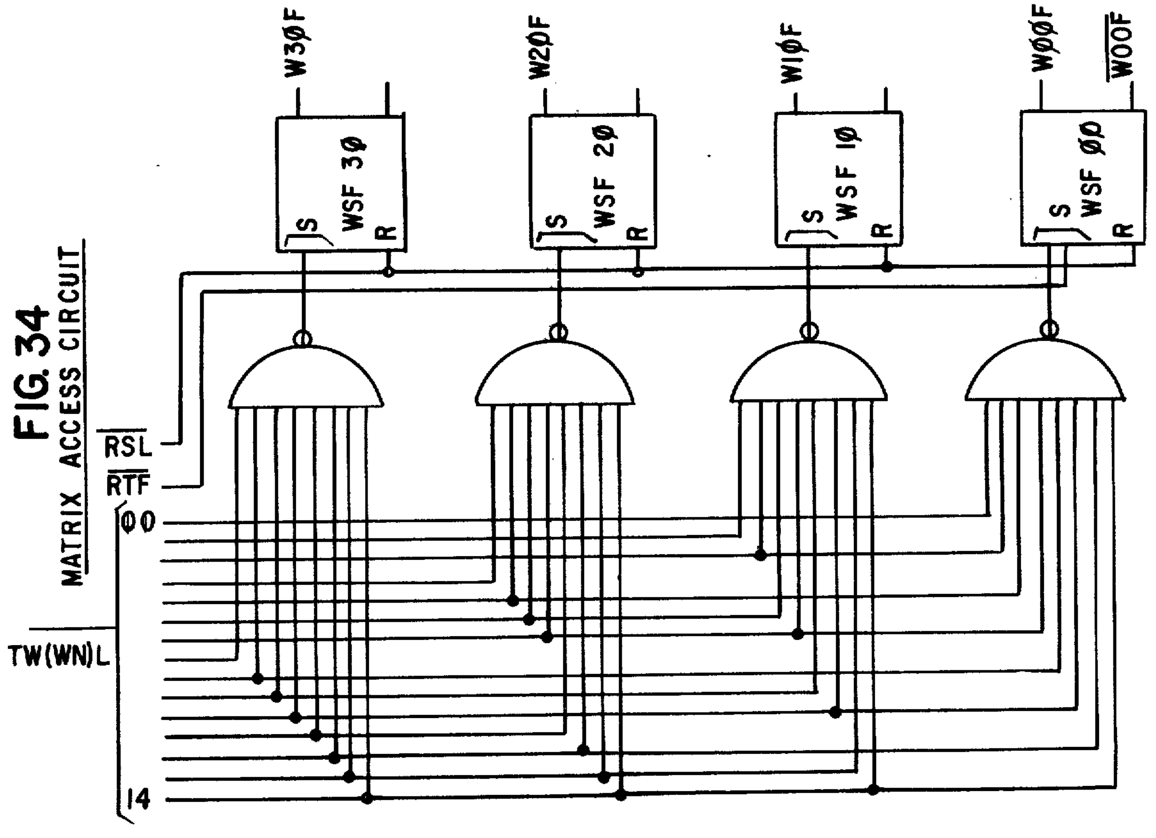

Referring to FIGS. 33 and 34, a logic check is made on the 16 TWL signals to verify that only one "zero" level appeared. The logic used to make this test consists of two sets of four Word Select Flip-Flops (WSF). One set numbered WSF01-WSF31 is used to store the binary encoded TWL number (0-15). The other set numbered WSF00-SWF30 is used to store the "one's" complement of the binary encoded TWL number (0-15). The two sets of four, eight input Nand gates perform the encoding function, whose outpus set the associated WSF's. The flip-flops are reset by the ReSet Level (RSL) input prior to the execution of a WPU or RPU instruction.

Referring to FIG. 36, the true outputs of the WSF00 and WSF01 through WSF30 and WSF31 are logically compared. These pairs of outputs should always be complementary. Any two both being "one" indicates that more than one TWL occurred, and the Select Error Level (SEL) will indicate a failure by becoming true.

The complement outputs of WSFØØ and WSFØ1 are likewise compared and should normally be inverse. If no TWL occurs, this will cause $\overline{\text{WSFØØ}}$ and $\overline{\text{WSFØ1}}$ to remain "one," making SEL become true.

By comparing the binary encoded TWL number and its "ones" complement, a SEL is generated when either no TWL signal or more than one TWL signal occurs in executing a WPU or RPU instruction.

THE ONE-OUT-OF-SIXTEEN MATRIX CHECK

Figure 35:
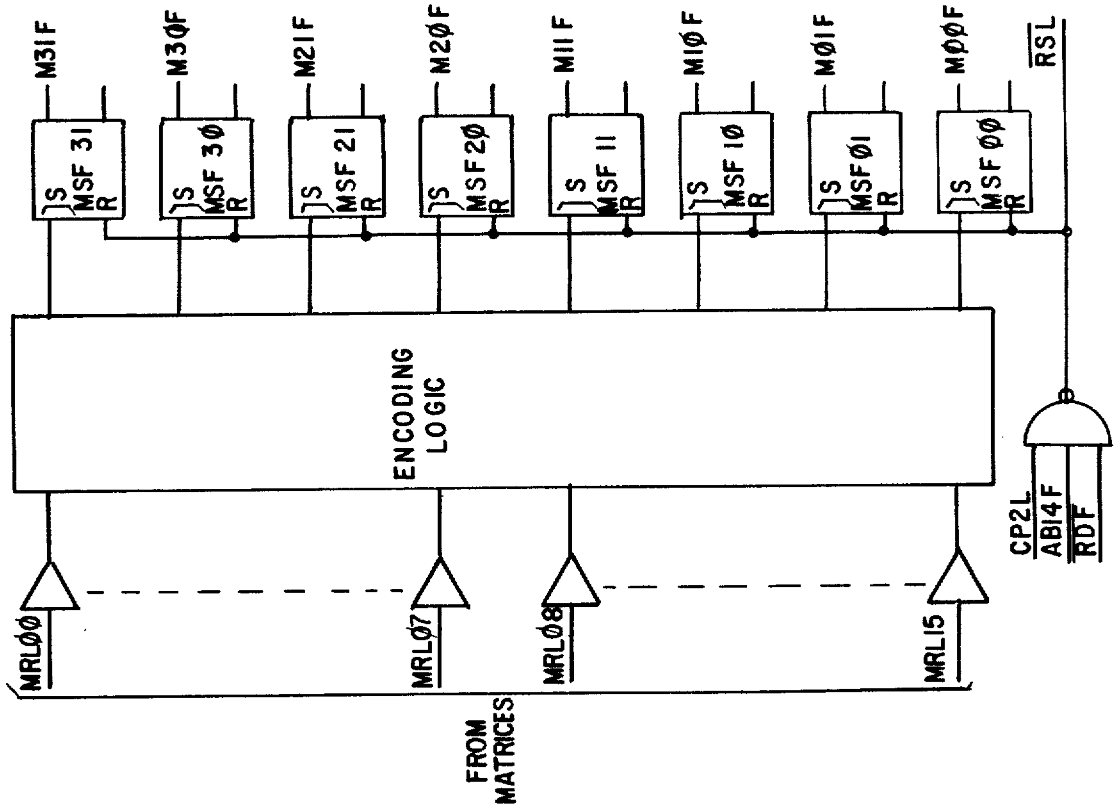

Referring to FIG. 35, each Matrix associated with a controller PC contains a cable driver and private bus back to both PC copies. These buses from the Matrices are termed the Matrix Response Levels (MRL), numbered MRL00 -MRL15. Under normal operation only one of 16 Matrices should be accessed. The matrix which is assessed by the PC copy will generate a logic "one" signal on its MRL (MN) in both copies of the PC. Normal responses require that only one MRL be true during an instruction execution. An identical method to logically checking the TWL signals is implemented to verify the correct code on the MRL signals. Two banks of flip-flops, Matrix Select Flip-flops (MSF), numbered 01-31 and 00-30, store the binary encoded MRL number and its "ones" complement, respectively.

Since a failure in a Matrix should not influence the ASW sent to the CP, the case where no MRL is a logic "one" can be ignored. If the SEL shows a normal condition, and no MRL goest to "one," the error must be due to a matrix fault. The Select Error Level (SEL) becomes true if two or more MRL signals become a logic "one," indicating two or more matrices have responded to an instruction. The SEL is used in generating the follow through cycle ASW.

Referring to FIGS. 10 and 11, these two banks of eight flip-flops are reset by a common signal termed ReSet Level (RSL). These flip-flops are reset by RSL prior to the accessing of a matrix word, provided the maintenance flip-flop RDF is reset, i.e. RDF = 0. The Boolean equation for RSL is:

$$RSL = CP2L.\overline{RDF}.AB14F$$

These flip-flops are set by the output of the encoding logic gates (see FIGS. 10 and 11) provided that the maintenance flip-flop RTF is reset, i.e. RTF = 0.

Two maintenance flip-flops in the MSC, the Reset Disable Flip-flops (RDF) and the Routine Test Flip-Flop (RTF), are used to routine the check circuit by forcing failures to occur in the circuit and observing the results in the ASW. This software routine maintenance must be periodically performed in order to locate failures in the check circuit which otherwise could not be detected.

The two flip-flops, RDF and RTF, are normally in the reset state. They can be set and reset by a WPUN(W) $mod_8 = 0$, 1, 2, 4, 6, or 7 instruction. By setting RDF, the MSF and WSF reset signal is inhibited. (See FIG. 12) If two normal read instructions of different word addresses follow, the result simulates a response on two TWL leads which should cause an ASW failure. Setting the RTF inhibits the set inputs to WSF00 and WSF01 which followed by a normal read simulates no response on the TWL leads, which should also cause a failure of the ASW. By using several combinations of matrix and word numbers in normal read instructions with the above tests, a fault in the check circuit can be identified and localized.

As an aid in localizing faults, the MSF's and WSF's can be read by the CP with a RPUN(W) $mod_8 = 0$, 1, 2, 4, 6, or 7 instruction. Faults in the flip-flops or in the encoding logic can be quickly identified by reading the state of these flip-flops.

THE MAINTENANCE STATUS CIRCUIT MSC - DETAILED DESCRIPTION

The Maintenance Status Circuit, FIG. 37, is a five bit buffer which can be written into by the CP via the PC(CN).DB. The state of the five flip-flops may also be relayed on the CP via the PC(CN).RB. The five maintenance flip-flops are:

a. Active Unit Flip-flop (UAF)
b. Trouble Flip-Flop TBF
c. Window Inhibit Flip-flop WIF
d. Routine Test Flip-flop RTF
e. Reset Disable Flip-flop RDF The flip-flops UAF and TBF are used to define an active controller PC and faulty controller PC, respectively. The flip-flops WIF, RTF, and RDF are used to aid in routining the circuits ARC, MXC, and TGC.

Referring to FIG. 37, the data input to the MSC Maintenance Status Circuit are bits 22, 24, 26, 28 and 30 of the PC(CN).DB direct from the cable receivers. The control level inputs are Reset Data Register Level (RDRL) and Data Register Window LEvel (DRWL) from the circuit ARC and Maintenance Flip-flop Set Level (MFSL), Maintenance Flip-Flop Reset Level (MFRL), and Maintenance Flip-flop Enable Level ($\overline{MFEL}$) from the circuit CDC.

All five flip-flops can be set or reset via the unit CP. A "one" in the respective data bit sets the flip-flop while a "zero" resets the flip during a WPUN(W) $mod_8 = 0$, 1, 2, 4, 6, or 7 instruction. MFSL and MFRL are redundant signals which become true for any WPUN instruction. $\overline{MFEL}$ becomes true whenever (W) $mod_8 = 0$, 1, 2, 4, 6, and 7. The redundancy of MFSL and MFRL is necessary to always be able to take bad copy out of service under fault conditions, i.e. either set flip-flop TBF and set flip-flop UAF or vice-versa. $\overline{MFEL}$ was chosen to become true for all values of W other than 3 and 5 so that no single AB bit failure would make the Maintenance flip-flop inaccessible.

The flip-flops UAF and TBF must be jammed reset and set, respectively, when power is turned on. The Power On Level (POL) accomplishes this requirement. The +24 Volt power appears 30–40 milliseconds after the +5 Volt power. This delay is used to generate a "zero" going logic pulse, POL, which resets the flip-flop USF and sets the flip-flop TBF.

CIRCUIT OUTPUTS

The outputs of the circuit MSC are the true and complement outputs of the five maintenance flip-flops. Both outputs of the flip-flops TBF, UAF, WIF, RTF, and RDF go the register DRC for strobing onto the bus PC(CN).RB. The UAF and $\overline{TBF}$ levels are used in the CDC to inhibit the access to the Matrices and the CP. The WIF level is used in the circuit ARC to inhibit the ARWL and DRWL signals in the routining of the circuit ARC. The $\overline{RTF}$ and $\overline{RDF}$ levels are used for the routining of the check circuits of the circuits MXC and TGC.

THE TIMING GENERATOR CIRCUIT TGC - DETAILED DESCRIPTION

The Timing Generator Circuit, FIG. 38, has three functions which it performs. First, upon receipt of an address in the register AR, the generator TGC decodes the unit number field and checks the pre-determined codes of other fields of the address. If the unit number equals that of the particular controller PC and the other fields of the address are in the proper code, the generator TGC generates a Timing Generator Initiate Level (TGIL). Secondly, this level is used to trigger a delay line circuit that generates a series of nine sequential pulse outputs termed Clock Pulse Levels (CPL) and numbered CP0L through CP8L. The third function of the generator TGC is to monitor the CPL outputs and detect faults in the generator TGC which would either invert or change the widths of the CPL outputs.

Referring to FIG. 38, the Timing Generator Circuit TGC should not generate any outputs unless the instruction in the register AR contains the unit number of the associated controller PC and the predetermined codes in certain bit fields are correct. The start circuit makes these checks and generates the TGIL which starts the CPL generation.

The Boolean equation for TGIL is:

$$\overline{TGIL} = U(N)L.TGSL.(AB1\emptyset F.\overline{AB11F} + \overline{AB1\emptyset F}.AB11F).(\overline{AB12F}.\overline{AB13F}.AB14F + \overline{AB12F}.AB13F.\overline{AB14F} + AB12F.\overline{AB13F}.\overline{AB14F})$$

U(N)L is derived from the three bit unit number field of the instruction, i.e. AB21F-AB23F and is obtained by a plug-in option in each controller PC to yield U(N)L = 1 when its unit number appears in the AR. U(N)L is also used as an input to the circuit DRC to be included in the unit responding field of the address "echo."

The TGSL Timing Generator Strobe Level, output of the circuit ARC is used as a strobe for TGIL. TGSL appears 400 ns (nom.) after the DO signal and has a 2.75 microsecond duration.

One other output, termed Addressed Unit Level (AUL) is brought out to the decoder CDC. AUL is logically equal to TGIL without the TGSL strobe. This signal is required by all CDC outputs which are not strobed by CPL's.

Figure 40:
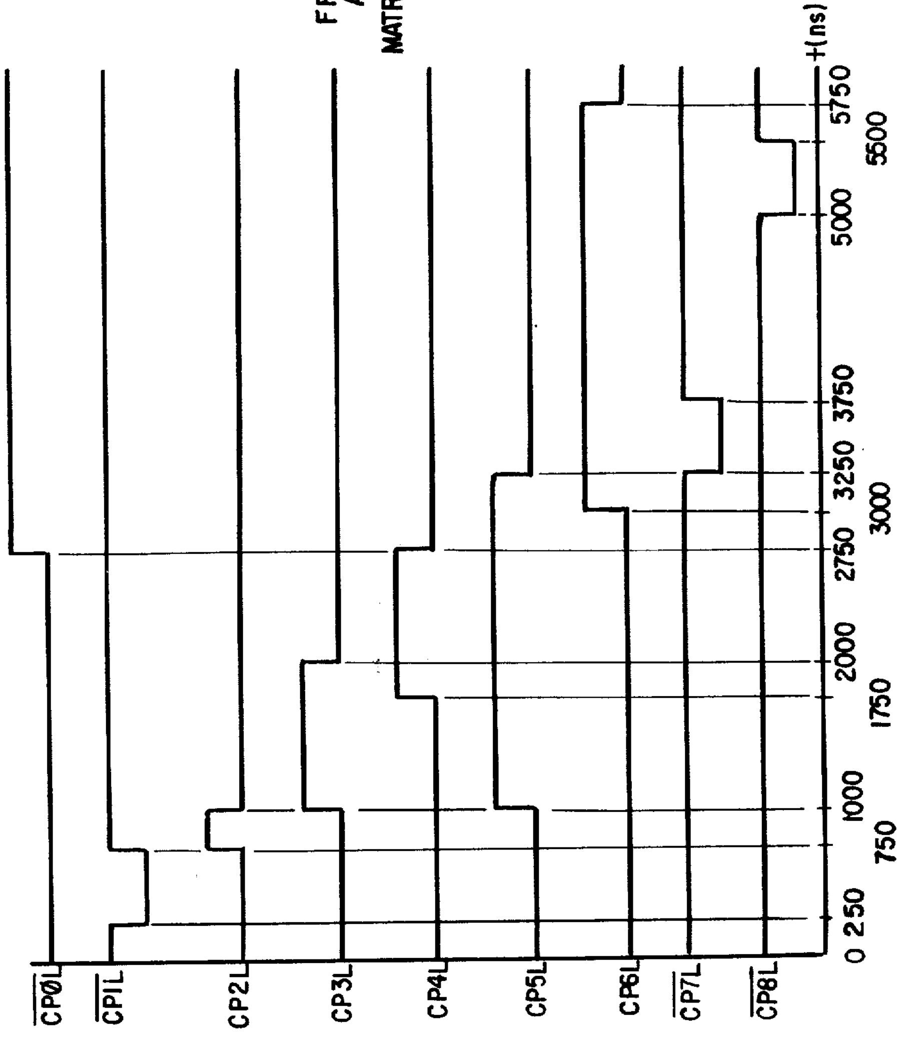
FIG. 40 is a timing chart showing output levels of the timing generator circuit.

Referring to FIG. 39, the generator TGC includes a delay line circuit which provides a "zero" going pulse on TGIL of 2.75 μs (nom.) width which propagates down a delay line with a total delay of 5.5 μs (nom.). The delay line is tapped at 250 ns (nom.) intervals. Twelve taps from the delay line are inputs to a combinational logic circuit which convert these 2.75 μs pulses into the sequential chain of Clock Pulse Levels (CPL) shown in FIG. 40.

The nine CPL outputs are used to control the timing of all circuits in the PC copy. Briefly, the CPL outputs and their primary functions are:

CPoL - Gate the contents of the register AR into the register circuit DRC to construct the address "echo".

CP1L - Strode address "echo" onto bus PC(CN).RB.

CP2L - Reset Flip-Flops WSF and MSF in the circuit MXC.

CP3L - Read or Write a Matrix word.

CP4L - Strobe contents of register DR out to a Control or Hybrid Matrix.

CP5L - Data window for data from a Matrix word to be loaded into register DR.

CP6L - Activates data source to be sent to the circuit CP.

CP7L - Strobe data onto bus PC(CN).RB.

CP8L - Send a second WR(CN) signal to all COM and HYM matrices.

Certain faults within the combination logic of FIG. 16 could change the width or invert the CPL signals. Under these fault conditions the PC would still logically be operative; however, the increased width of $\overline{CP1L}$, CP3L, CP4L, $\overline{CP7L}$, and $\overline{CP8L}$ could damage the AC cable drivers by exceeding their rated duty cycle.

Referring to FIg. 38, the Pulse Width Flip-Flop PWF detects these dynamic CPL faults and if one occurs during a Normal mode instruction the Flip-Flop PWF is set. The Flip-Flop PWF is reset by $\overline{RSL}$ only during Normal mode instructions. The state of this flip-flop can be read out by a RPUN instruction and must be read out on a routine basis to insure that the CPL outputs are not in error. Hard faults, i.e. CPL's stuck at 0 or 1 can be detected by normal circuit routining.

COMMUNICATION WITH THE CENTRAL PROCESSOR

Communication between the unit CP and the Peripheral Control Units PC0, PC1 serves four purposes which are:

a. To address one of the 8 Peripheral Units which is to be operated upon.

b. To relay data from one or both of the unit CP copies to the addressed PU (write function).

c. To relay data from the addressed unit PU to one or both CP copies (read function).

d. To control, via the address function, the activity and state of repair of all PC units.

Figure 3:
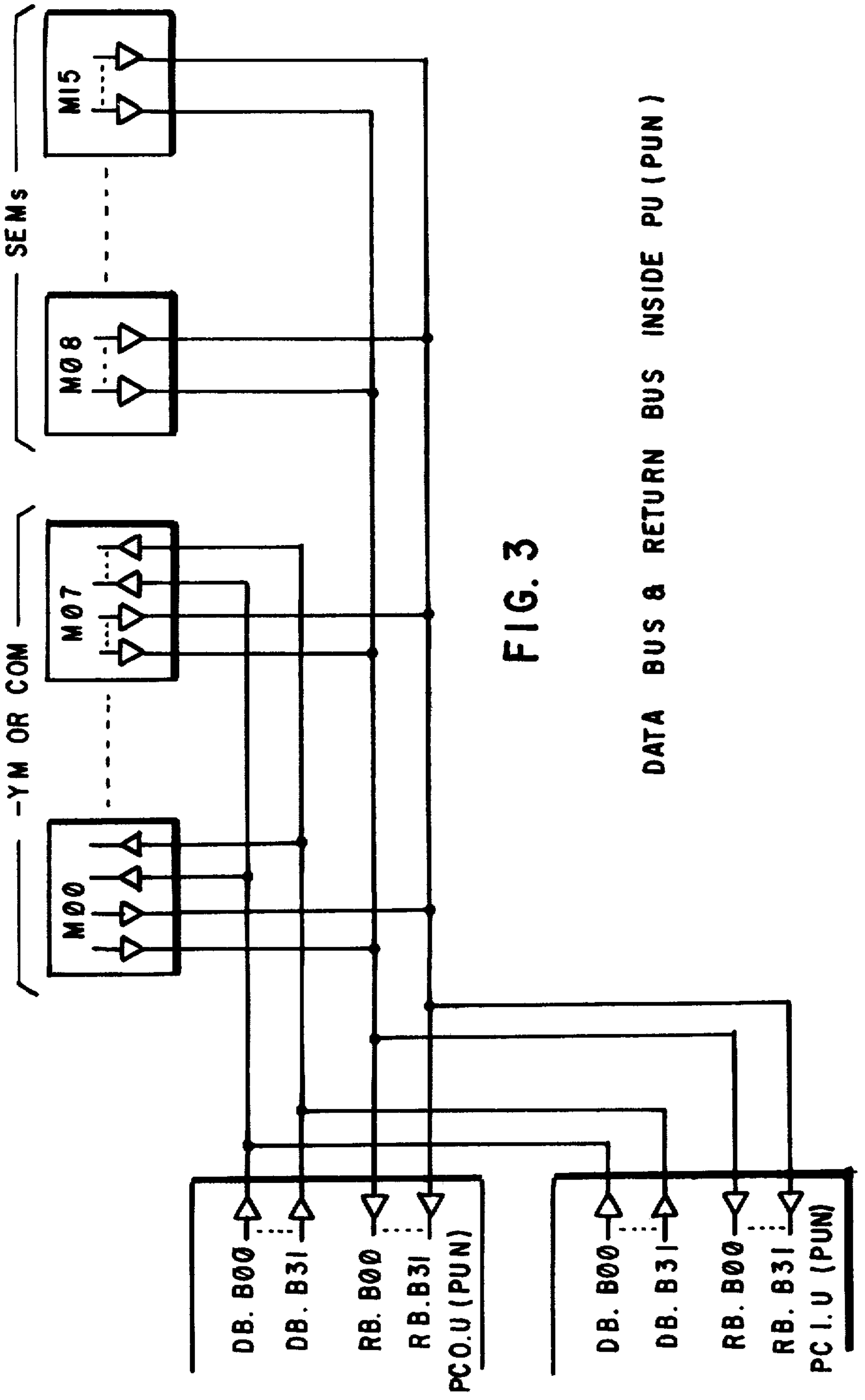
FIG. 3 shows a portion of the data bus and return lines for a peripheral controller.

Three duplicated AC buses are required to perform all the communication functions. These buses are the 23 bit Peripheral Control Address Bus (PC(CN).AB)-(FIG. 4), the 32 bit Peripheral Control Data Bus (PC(CN).DB) (FIG. 3), and the 33 bit Peripheral Control Return Bus (PC(CN).RB) (FIG. 3). The group of these 3 buses is termed the Peripheral Control Bus System (PC(CN).BS).

PERIPHERAL CONTROL CONFIGURATIONS

Since the Peripheral Controller PC is duplicated per Peripheral Unit, a means of identifying an active or standby copy and identifying a copy found faulty is required. Two of the Maintenance Flip-Flops, the Active Unit Flip-Flop UAF and the Trouble Flip-Flop TBF are implemented for this purpose in each PC.

The purpose of the Flip-Flop UAF is to identify the state of a PC, i.e. active or standby as follows:

a. UAF = 1 (set)

PC is active and performs all of its functions completely.

b. UAF = 0 (Reset)

PC is in standby state and performs all of its normal functions with the exception that addressing of the Matrices is inhibited.

The purpose of the Flip-Flop TBF is to take a faulty controller PC out of service, by isolating it from its Matrices and PC(CN).RB.

a. TBF = 1 (Set) indicates controller PC is faulty and out of service and does not execute Normal mode instructions, i.e. reading or writing of the Matrices. It does accept all addresses but does not return any information over the RB to the CP.

b. TBF = 0 (Reset) indicates controller PC is not faulty and performs all of its normal functions completely.

It should be noted that both a Flip-Flop UAF and TBF are located in each copy of each unit PCU and all are independent of each other. Their states are under program control; therefore all combinations are possible. One combination, the flip-flop UAF in both copies being set, should be avoided because timing differences between Controllers could cause invalid matrix responses.

The flip-flops UAF and TBF are only two of a set of flip-flops defined as the Maintenance Flip-Flops. The state of all maintenance flip-flops can be read out by the CP. They also can be written into by the CP.

PERIPHERAL UNIT OPERATIONS

The Unit PU can perform "sense" and "control" functions in three different modes, a total of six different operations.

The normal mode operations allow reading or writing of points in the Matrices COM and HYM and reading of points in the sense Matrices SEM. The normal mode operations are the only unit PU operations that can be used in the call processing programs.

The control mode and special mode operations are used only in diagnostic and recovery programs. These operations allow the reading or writing of points within the Peripheral Control Units and do not penetrate beyond the PC.

Control mode operations allow access to points without the PC designated by the address part of the operation.

PC(CN).AB Format

Figure 42:
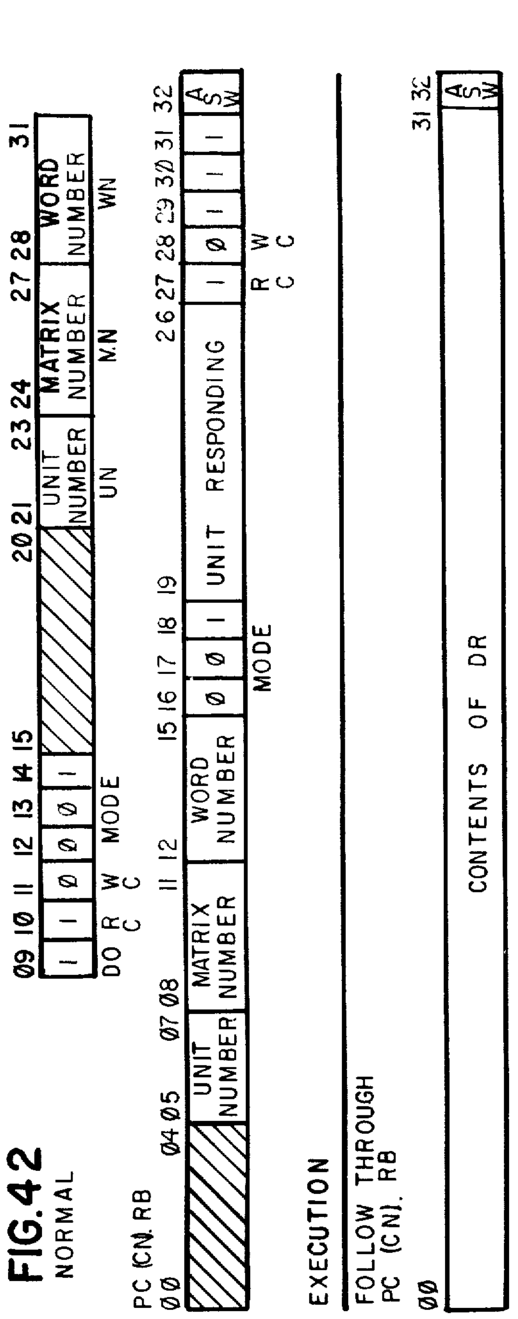
FIGS. 42–47 show word formats for the address bus, return bus, and data bus of the peripheral controller and, FIG. 48 is a timing chart illustrating timing relationships for the central processor and the peripheral unit.

Referring to FIG. 42a, the Peripheral Control Address bus, PC(CN).AB.B31.

Bits 09 through 14 specify the operation to be performed:

B09 - "Do" signal, alerts all units on the bus that some operation is requested of one of them.

B10, B11 - Read Control (RC) and Write Control (WC), respectively. Information is in a 1 out of 2 code.

B12, B13, - Mode control bits B14 B12 - Special Mode (S) B13 - Control Mode (C) B14 - Normal Mode (N) Information is in a 1 out of 3 code.

B15 - Spare bit

Bits 16 through 13 specify the address at which the operation is to be performed, i.e. the effective address (EA).

B16 through B20 - spare bits

B21 through B23 - Unit Address Field is interpreted as the PU number UN.(UN=0, 1, 2, ..., 7) The PC unit which recognizes its unit number, UN, executes the instruction.

B24 through B27 - Matrix Address specifies the matrix number MN.(MN=00 - 15).

B28 through B31 - Word Address specifies one of the sixteen words of the selected matrix WN.(WN=00 - 15).

RETURN BUS DATA FORMAT

Referring to FIG. 42b, on every operation, regardless of mode, the addressed PC returns the "echo" of the address back to the unit CP via the PC(CN).RB. The "echo" format is:

PC(CN).RB.B00-15 - Physically transfers the Address Field of the PC(CN).AB.B16-31 respectively to the PC(CN).RB.B00-15.

PC(CN).RB.B16-18 - Mode bits as received from CP in one out of three code.

PC(CN).RB16 - Special (S)

PC(CN).RB17 - Control (C)

PC(CN).RB18 - Normal (N)

PC(CN).RB.B19-26 - Responding Unit in one out of eight code.

PC(CN).RB.B19 - Unit 0

PC(CN).RB.B20 - Unit 1

PC(CN).RB.B26 - Unit 7

PC(CN).RB.B27 - Read Command

PC(CN).RB.B28 - Write Command

PC(CN).RB.B29-31 - Spare bits set equal to 1

Each PC unit indicated that its internal checks on the execution of an instruction have passed by transmitting the All Seems Well signal on the PC(CN).RB.B32 at the same time that data is read out and the address echo is transmitted on PC(CN).RB.B00-31.

For all instructions ASW = 1 indicates:

a. Mode bits S, C, N were received in one out of three code.

b. Read-write bits RC, WC were received in one out of two code.

c. Appropriate internal PC(CN) checks have passed for Normal Mode instructions only.

Failure of the ASW will be an indication to the CP unit that a controller PC is faulty in one of the areas mentioned above.

Six distinct instructions make up the PU units instruction set. All instruction descriptions assume neither flip-flop TBF is set. These six instructions are categorized in three mode groups, i.e. Normal, Control, and Special Modes. Each mode group consists of a Write and Read instruction.

An instruction takes two machine cycles to complete. The first cycle is called the execution cycle, and the second cycle is called the follow through cycle. In each case when a PC unit responds to an instruction an ASW signal is sent to the CP unit along with the data on the PC(CN).RB.

The normal mode instructions for the Read Peripheral Unit are:

| | |
|---|---|
| Command on PC(CN).AB | - read "normal" at address UN.MN.WN (unit no., matrix no., and word no.). |
| Addressed PC | - a) the addressed PC unit return address echo in execution cycle. |

-Continued

Figure 43:
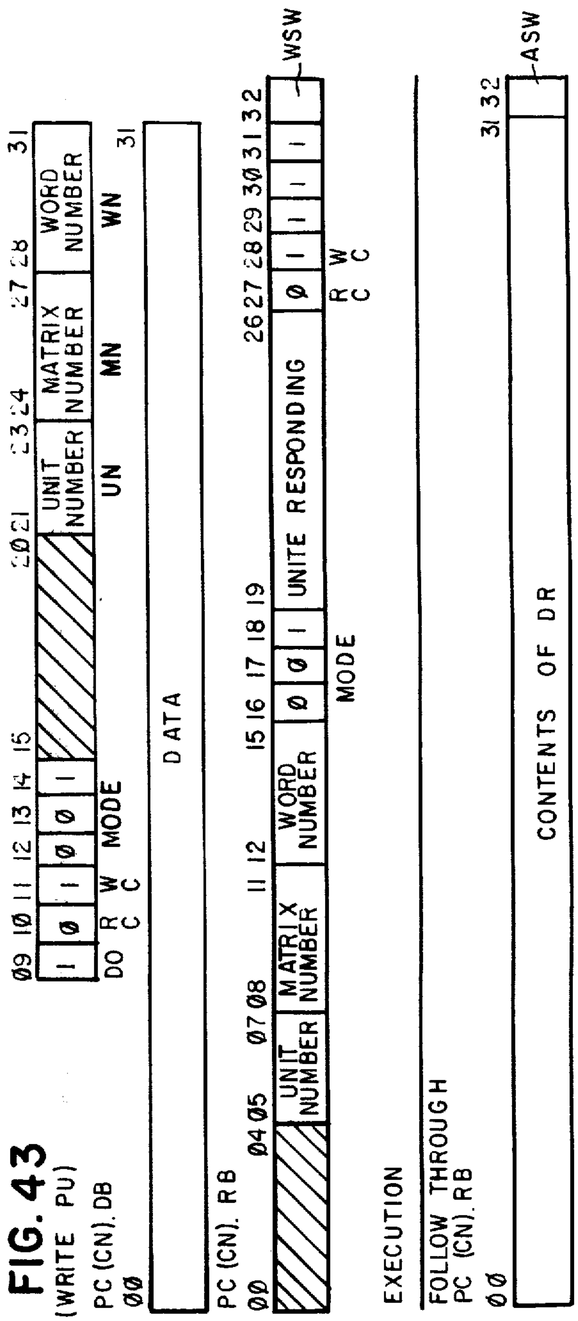

| | |
|---|---|
| | b) active addressed copy reads data at matrix word selected and addressed PC's load data into both PC Data Registers DR. |
| | c) addressed copies transmit contents of register DR on the PC(CN).RB to the CP unit in the follow through cycle. |
| WPU | Write Peripheral Unit (FIG. 43) |
| Command on PC(CN).AB | - write into UN.MN.WN (unit no., matrix no., and word no.). |
| Data on PC(CN).DB | - 32 bit word from CP. |
| Addressed PC | - a) addressed PC's accept 32 bit word into DR. |
| | b) addressed PC's return address echo in execution cycle. |
| | c) active PC writes contents of DR into addressed matrix word. |
| | d) addressed PC's echo contents of DR to CP in the follow through cycle. |

Control mode instructions are used to test individual PC controllers while only one PC controller in a pair is accessed.

Figure 44:
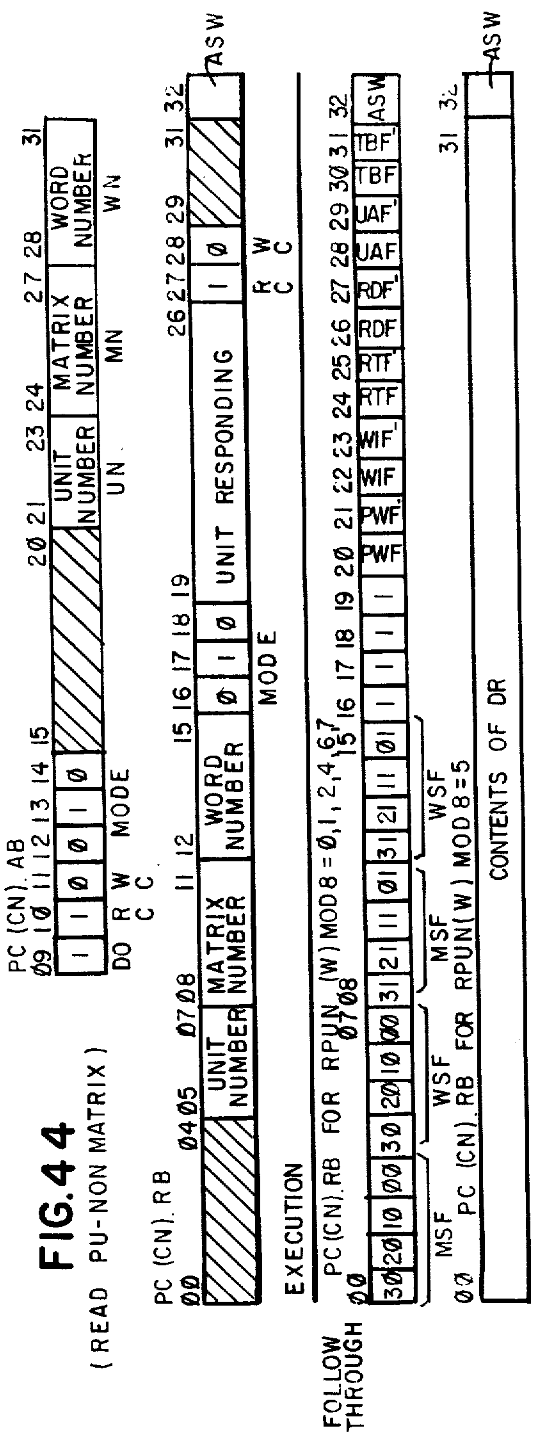

RPUN - Read Peripheral Unit Non Matrix (FIG. 44)

| | |
|---|---|
| Command on PC(CN).AB | - read contents of PC hardware given in address field of PC(CN).AB, (EA). |
| Addressed PC | - a) addressed PC returns address echo on PC(CN).RB in the execution cycle. |
| | b) transmits the state of the addressed PC (active copy) hardware over the RB in the follow through cycle. |

Of the 16 bits of the EA field, the last three bits B29, B30 and B31 will identify 3 PC addresses as follows:

| | |
|---|---|
| mod 8 = 3: | Not allocated. |
| mod 8 = 0, 1, 2, 4, 6, 7: | Maintenance Flip-Flops. |
| mod 8 = 5: | Contents of PC DR (bits 00–31). |

WPUN - Write Peripheral Unit Non Matrix (See FIG. 4)

| | |
|---|---|
| Command on PC(CN).AB | - write into PC hardware whose address is given in EA. |
| Addressed PC | - a) addressed PC places data on PC(CN).DB into hardware addressed in EA. |
| | b) addressed PC returns address on PC(CN).RB in the execution cycle. |
| | c) addressed PC returns ASW in follow through cycle. |

As with the RPUN instruction PC addresses will be used as follows:

| | |
|---|---|
| mod 8 = 3: | Not allocated. |
| mod 8 = 0, 1, 2, 4, 6, 7: | Changes the state of Maintenance Flip-Flops. The changes to be effected should be indicated by "1" or "0" in the corresponding bit positions on PC(CN).DB. (See F.4) |
| mod 8 = 5: | PC DR accepts 32 bit pattern from PC(CN).DB. |

Special Mode instructions are used to test individual PC copies.

Figure 46:
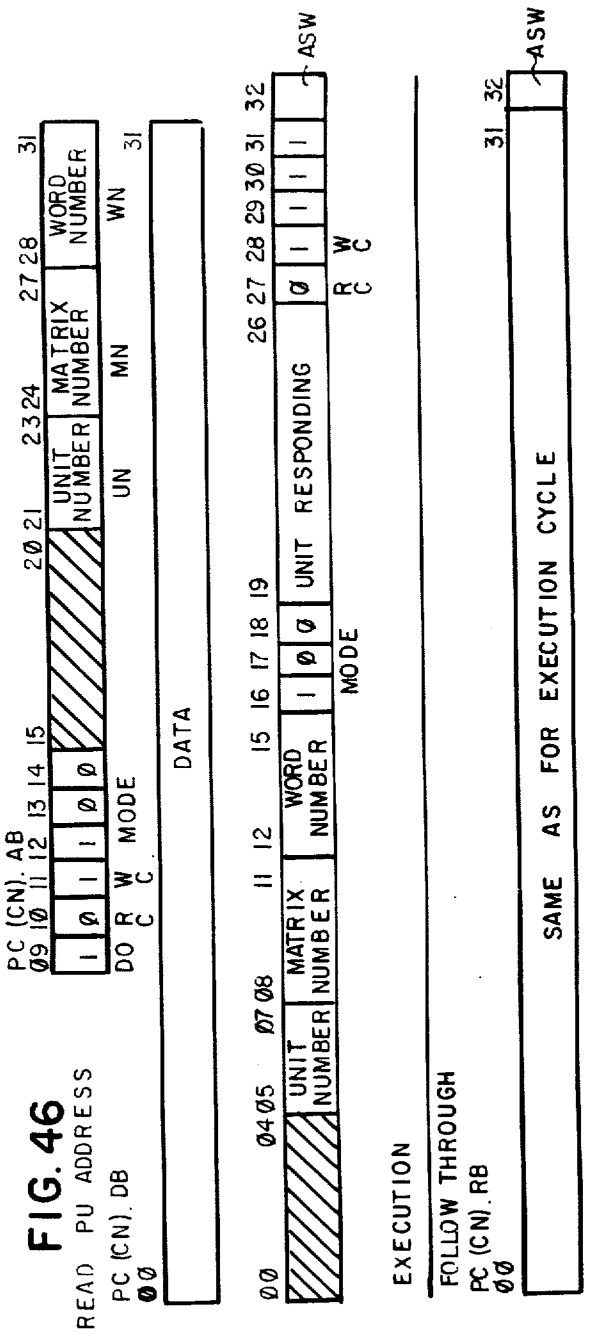
Figure 45:
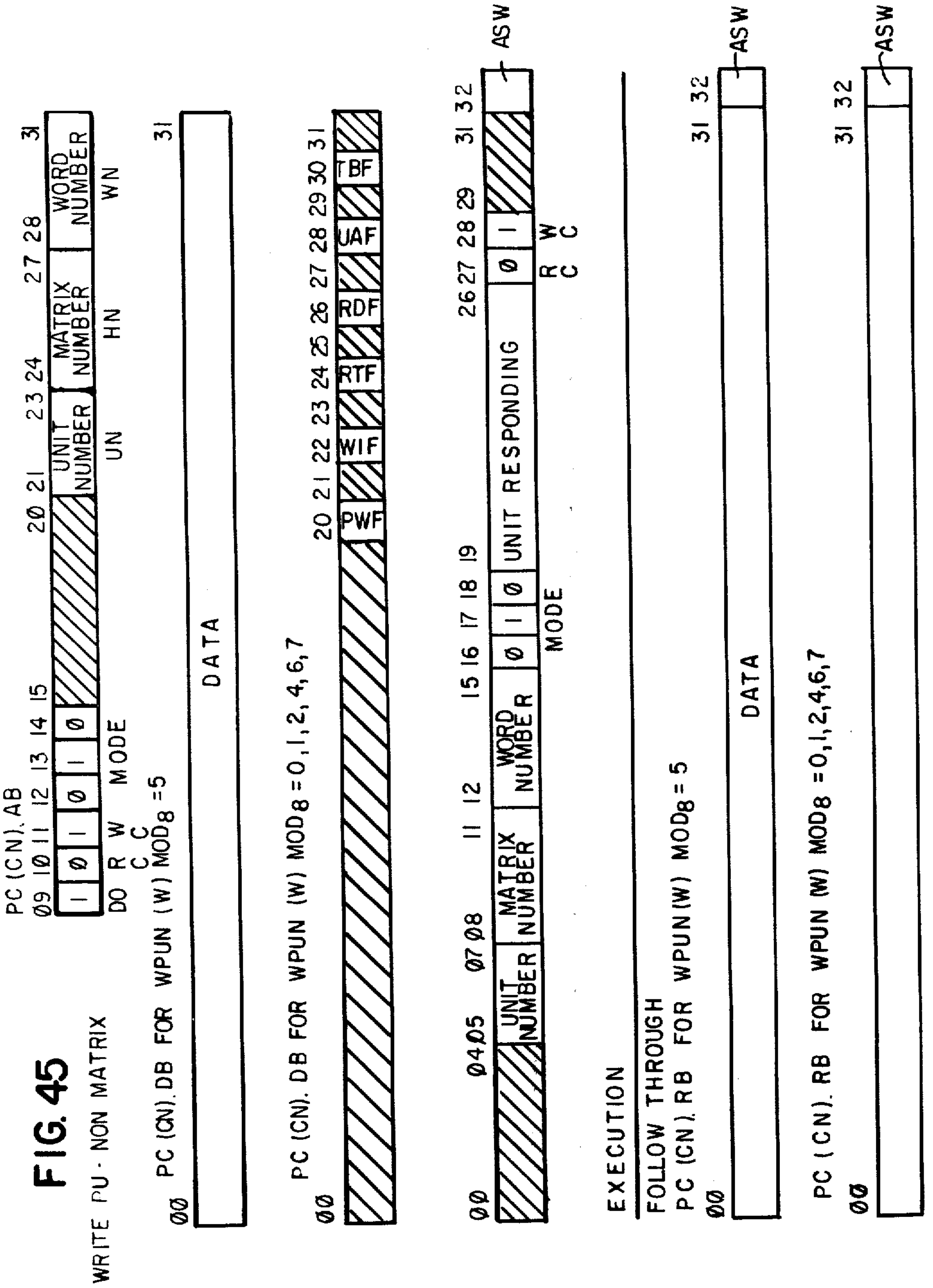

RPUA - Read Peripheral Unit Address (FIG. 46):

| | |
|---|---|
| Command on PC(CN).AB | - write "special" at PC unit ($\overline{UN}$) as specified in EA. |
| Data on PC(CN).DB | - 32 bit word from CP. |
| Addressed PC | - a) data on PC(CN).DB is not loaded into DR, nor does any matrix action occur. |
| | b) addressed PC returns address echo in the execution cycle on the PC(CN).RB. |
| | c) addressed PC returns address echo on PC(CN).RB in the follow through cycle. |

Figure 47:
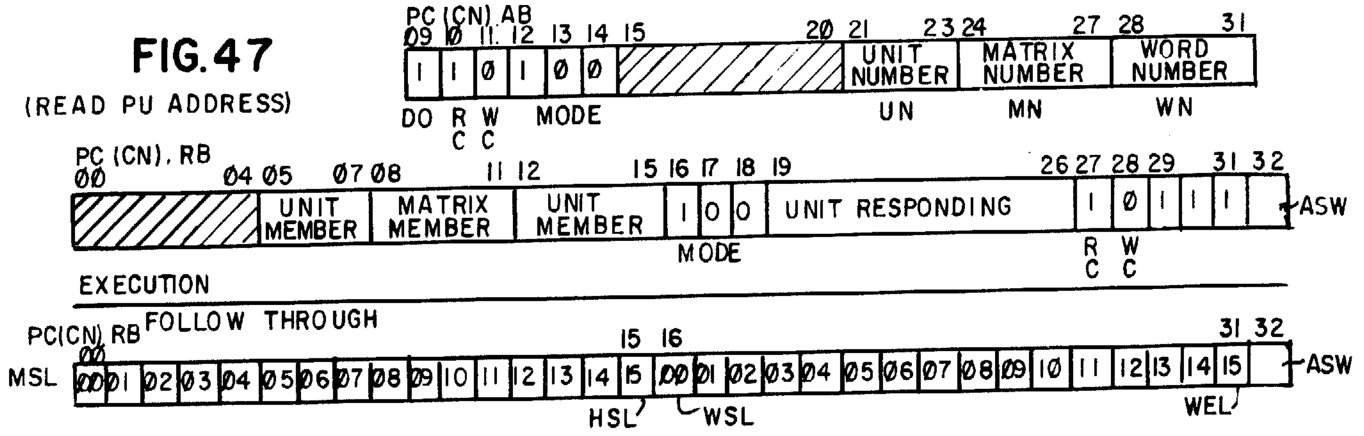

RPUT - Read Peripheral Unit Special Test (FIG. 47)

| | |
|---|---|
| Command on PC(CN).AB | - read "special" at PC unit (UN) as specified in EA. |
| Addressed PC | - a) addressed PC returns address echo in the execution cycle on PC(CN).RB. |
| | b) addressed PC gates the output of its address decoder, whose state is determined by the MN.WN field of the EA, onto the PC(CN).RB in the follow through cycle. The exact format of this data on the RB is as shown in FIG. 6. |

In calculating the time requirements described above, the following assumptions were made:

a. Maximum cable length between PC unit and CP unit of 125 feet.

b. Total delay of driver, cable, and receiver ranges from 250 ns. $\leq$ td $\leq$ 400 ns.

c. Pulse shrinkage maximum of 6 percent.

d. Pulse lengthening maximum of 4 percent.

CP UNIT TIMING (FIG. 48)

The CP unit outpulses on PC(CN.AB during T3PL, and on "write" instructions outpulses on PC(CN).DB during T4PL.

Information sent from PC unit to CP unit during the execution cycle, i.e. address echo, must be at the output of the CP unit cable receivers 100 ns. before the end of T6PL.

Information sent from the PC unit to the CP unit during the follow through cycle must be at the output of the CP unit cable receivers no sooner than the beginning T1PL and no later than 100 ns. before the end of T4PL.

PERIPHERAL CONTROLLER ACCESS TIME

Access time is measured from the time that the PC(CN.AR (PC Address Register) is latched up to the time the data word from the Matrices reaches the inputs of the AC cable drivers on the PC(CN).RB.

Figure 48:
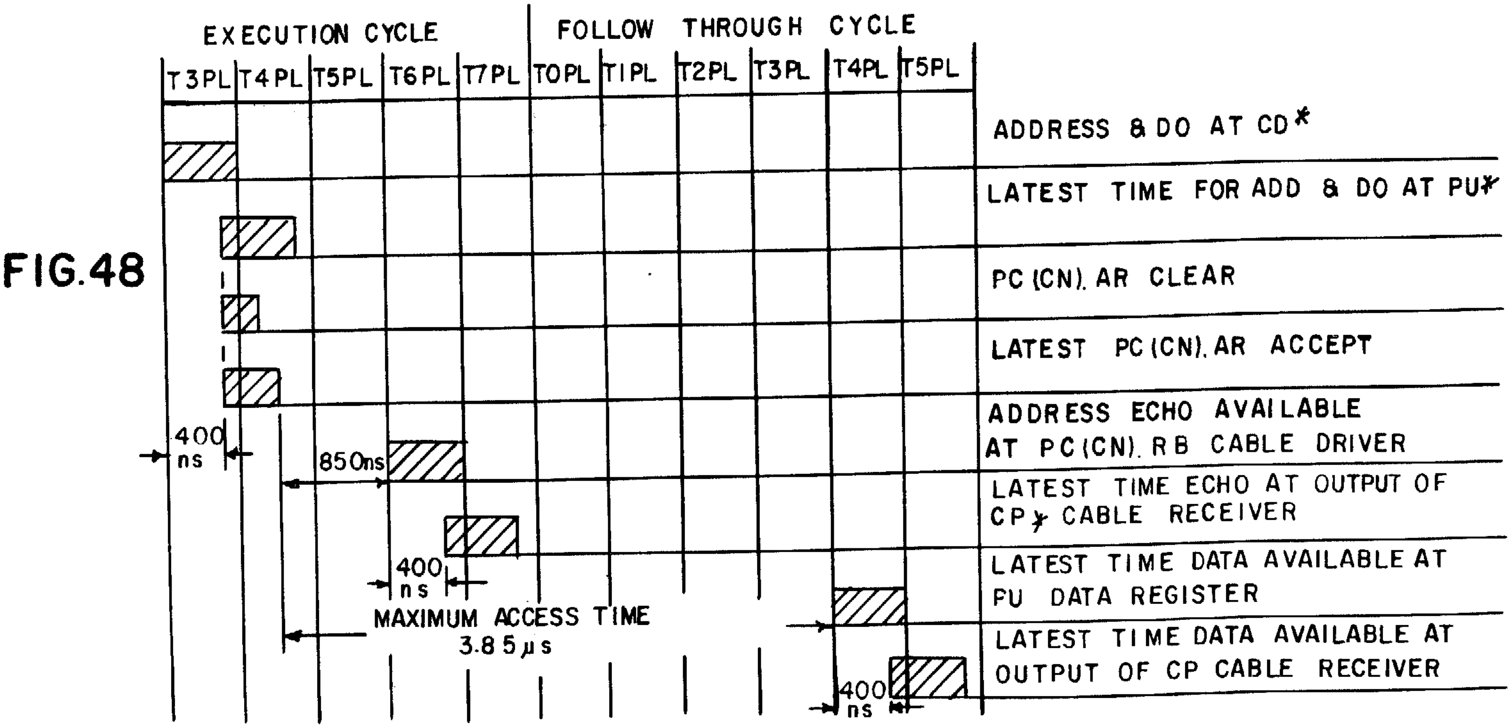

From FIG. 48 it can be seen that the PC unit access time should not exceed 3.85 $\mu$s. This value meets the CP unit timing requirements for worst case assumptions.

The return address echo is always returned to the CP unit on the PC(CN).RB during the execution cycle. From FIG. 48, it can be seen that the echo must be at the input of the PC(CN).RB cable drivers no later than 850 ns. after latching the address register in order to meet the worst case timing requirements.

All write instructions with the exception of a WPUN instruction require a data echo in the follow through cycle. As with data return for read instructions the echo must be at the output of the PC(CN).RB cable receivers in the CP unit no later than T4PL of the follow through cycle.

What is claimed is:

1. In a communication switching system including a common control apparatus having a central processing means for providing read and write instructions for controlling the operation of equipment of said system, a peripheral control unit means comprising:

a plurality of control matrices each having a plurality of groups of bistable control devices, each control device being connected to a different control point of said system, a plurality of sense matrices each having a plurality of groups of sensing devices, each sensing device being connected to a different sense point of said system;

at least one peripheral controller means associated with at least certain ones of said matrices, said peripheral control means including first access means responsive to a write instruction provided by said central processing means to select a group of control devices in one of said control matrices and second access means to selectively modify the states of the selected control devices in accordance with the write instruction to thereby selectively modify the conditions at predetermined ones of said control points; and timing generator means for synchronizing the operation of said peripheral controller means.

2. A peripheral control unit means as set forth in claim 1 wherein said peripheral controller means includes data register means, and third access means being responsive to a read instruction provided by said central processor means to select a group of sensing devices in one of said sense matrices and fourth access means to enable data representing the status of the corresponding sense points to be loaded into said data register means.

3. A peripheral control unit as set forth in claim 2 wherein said peripheral controller means includes read means responsive to a further read instruction provided by said central processor means to select a group of said control devices in one of said matrices and enable means to enable data representing the states of the selected control devices to be loaded into said data register means.

4. A peripheral control unit as set forth in claim 2 wherein each of said sense elements includes capacitor means and has means connected to a corresponding sense point for establishing bias levels for controlling the charging of said capacitor means in accordance with the condition of the corresponding sense point.

5. A peripheral control unit as set forth in claim 4 wherein at least certain ones of said sense points are connected to a pair of normally open relay contacts, said sense elements being operable to provide an output whenever an associated pair of contacts is open.

6. A peripheral control unit as set forth in claim 1 wherein each instruction provided by said central processor means includes address data for designating a group of control devices and wherein said peripheral controller means includes address register means for receiving said address data and address decoder means responsive to said address data to select the designated matrix and the group of control devices of said matrix.

7. A peripheral control unit as set forth in claim 6 wherein said peripheral controller means includes matrix access means including first means for verifying that only one of said groups of control devices has been addressed by a given instruction provided by said central processor means.

8. A peripheral control unit as set forth in claim 7 wherein said matrix access means includes matrix response means for providing an indication whenever more than one matrix is accessed at a given time.

9. A peripheral control unit as set forth in claim 8 wherein said matrix response means includes select indicator means for a group of said matrices including first storage means for each matrix for normally storing a first bit whenever the corresponding matrix is not being accessed and a second storage means for storing the complement of said first bit, and Exclusive OR gating means connected to outputs of said first and second storage means and enabled whenever two or more of said matrices are accessed simultaneously.

10. A peripheral control unit as set forth in claim 6 wherein said peripheral controller means further includes control decoder means controlled by said address decoder means to provide write pulses of a predetermined width for a selected one of said control matrices in response to a write instruction provided by said central processor means and pulse width detector means for monitoring said write pulses and providing an error output whenever the width of a write pulse exceeds a predetermined value.

11. A peripheral control unit as set forth in claim 2 wherein said data register means includes enable means to store a plurality of data bits representing the desired states for control devices of a selected group in response to a write instruction provided by said central processor means and wherein said peripheral controller means includes fifth access means for providing a first write signal to enable said data bits to modify the states of the selected devices and sixth access means for providing a second write signal at the end of the write instruction to enable faulty control devices which respond to said first write signal to be reset to a predetermined state.

12. A peripheral control unit means as set forth in claim 1 wherein said peripheral controller means comprises first and second duplicated peripheral controllers, one of said peripheral controllers being normally operable in an active status and the other of said peripheral controllers being normally operable in a standby status, each of said peripheral controllers including bistable active unit means for defining the active peripheral controller and a bistable trouble means for indicating the standby peripheral controller, and maintenance status means including first means operable when power is initially applied to said peripheral control unit means to control setting said active unit means and second means to set said trouble means to predetermined states.

13. A peripheral control unit means as set forth in claim 1 wherein at least certain ones of said control devices are operable to provide an electronic logic level output.

14. A peripheral control unit as set forth in claim 13 wherein each of said control devices includes a latch circuit means.

15. A peripheral control unit means as set forth in claim 1 wherein at least certain ones of said control devices include electromechanical switching means operable to provide a mechanical output.

* * * * *